US005577028A

United States Patent [19]

Chugo et al.

[11] Patent Number: 5,577,028

[45] Date of Patent: Nov. 19, 1996

[54] ROUTING SYSTEM USING A NEURAL NETWORK

[75] Inventors: Akira Chugo; Ichiro Iida, both of Yokohama; Toshihiko Kurita, Kawasaki, all of Japan

[73] Assignee: Fujitsu Limited, Kawasaki, Japan

[21] Appl. No.: 166,152

[22] Filed: Dec. 14, 1993

Related U.S. Application Data

[63] Continuation of Ser. No. 754,445, Sep. 3, 1991, abandoned.

[30] Foreign Application Priority Data

Aug. 31, 1990 [JP] Japan .................................... 2-228428

[51] Int. Cl.[6] .................................................. H04L 12/56

[52] U.S. Cl. ............................ 370/54; 370/60; 370/94.2; 395/21

[58] Field of Search .......................... 370/54, 58.1, 58.2, 370/60, 94.1, 94.2, 85.14, 13, 16, 94.3, 60.1; 340/826, 827; 395/21, 22, 24; 379/271, 272, 273

[56] References Cited

U.S. PATENT DOCUMENTS

| | | | |
|---|---|---|---|
| 4,939,726 | 7/1990 | Flammer et al. | 370/94.1 |
| 4,972,363 | 11/1990 | Nguyen et al. | 395/24 |
| 4,983,962 | 1/1991 | Hammerstrom | 370/94.1 |
| 4,999,833 | 3/1991 | Lee | 370/94.3 |
| 5,088,032 | 2/1992 | Bosack | 370/94.1 |
| 5,089,983 | 2/1992 | Chiang | 364/844 |
| 5,105,424 | 4/1992 | Flaig et al. | 370/94.3 |
| 5,115,433 | 5/1992 | Baran et al. | 370/94.3 |
| 5,119,367 | 6/1992 | Kawakatsu et al. | 370/54 |
| 5,122,983 | 6/1992 | Massengill | 364/844 |
| 5,128,926 | 7/1992 | Perlman et al. | 370/54 |
| 5,159,590 | 10/1992 | Hamaguchi et al. | 370/58.2 |
| 5,166,927 | 11/1992 | Iida et al. | 370/54 |

FOREIGN PATENT DOCUMENTS 0373228 6/1990 European Pat. Off. .

OTHER PUBLICATIONS

Iida et al., "Autonomous Routing Scheme for Large Scale Network Based on Neural Processing", *IEEE International Conference on Systems, Man and Cybernetics,* vol. 1, Nov. 1989, pp. 194–199.

Jensen et al., "Neural Network Controller for Adaptive Routing in Survivable Communications Networks", *International Joint Conference on Neural Networks,* vol. 2, Jun. 1990, pp. 29–36.

*Primary Examiner*—Benedict V. Safourek
*Assistant Examiner*—Chau T. Nguyen
*Attorney, Agent, or Firm*—Staas & Halsey

[57] ABSTRACT

A routing system in a multimedia integrated network formed of nodes connected by links is provided for transmitting various media such as voice, image and data in a packet format. The respective nodes forming the integrated network output the packets in an optimum output direction so that conditions required by various media and reliability of communication are satisfied. Each node includes an interconnection type neural network for determining the packet output direction. An external stimulus input unit outputs an external stimulus to the neurons in the neural network in response to a present state of the integrated network, such as a packet delay time and a packet loss ratio for respective links, and a condition required by the media such as an allowable packet loss ratio. Therefore, the packet is output in an optimum direction which is adaptive to the present state of the integrated network and which satisfies a condition required by the media.

37 Claims, 52 Drawing Sheets

C1,C2, IS WEIGHT COEFFICIENT; OBTAINING VALUE OF "0" WHERE THERE IS NO CONNECTION DUE TO TOPOLOGY OF ACTUAL NETWORK

| IDENTIFIER (DATA) | SOURCE NODE NUMBER | DESTINATION NODE NUMBER | ALLOWABLE PACKET LOSS RATIO (L) | DATA UNIT |

| IDENTIFIER (STATE INFORMATION) | THE NODE NUMBER | SEQUENCE NUMBER | THE OUTPUT LINK NUMBER 11 | PACKET DELAY TIME 0 | LOSS RATIO 0 | THE OUTPUT LINK NUMBER 12 | PACKET DELAY TIME d12 | LOSS RATIO PL12 |

{ RESPECTIVE LINKS } { RESPECTIVE LINKS }

*FIG. 12*

| LINK NUMBER | PACKET DELAY TIME | LOSS RATIO |
|---|---|---|
| 11 | 0 | 0 |
| 12 | $d_{12}$ | $PL_{12}$ |
| 13 | $d_{13}$ | $PL_{13}$ |
| 14 | $d_{14}$ | $PL_{14}$ |
| 21 | $d_{21}$ | $PL_{21}$ |
| 22 | $d_{22}$ | $PL_{22}$ |
| 23 | $d_{23}$ | $PL_{23}$ |
| 24 | $d_{24}$ | $PL_{24}$ |
| - | - | - |
| - | - | - |
| - | - | - |
| nn | $d_{nn}$ | $PL_{nn}$ |

FIG. 16A

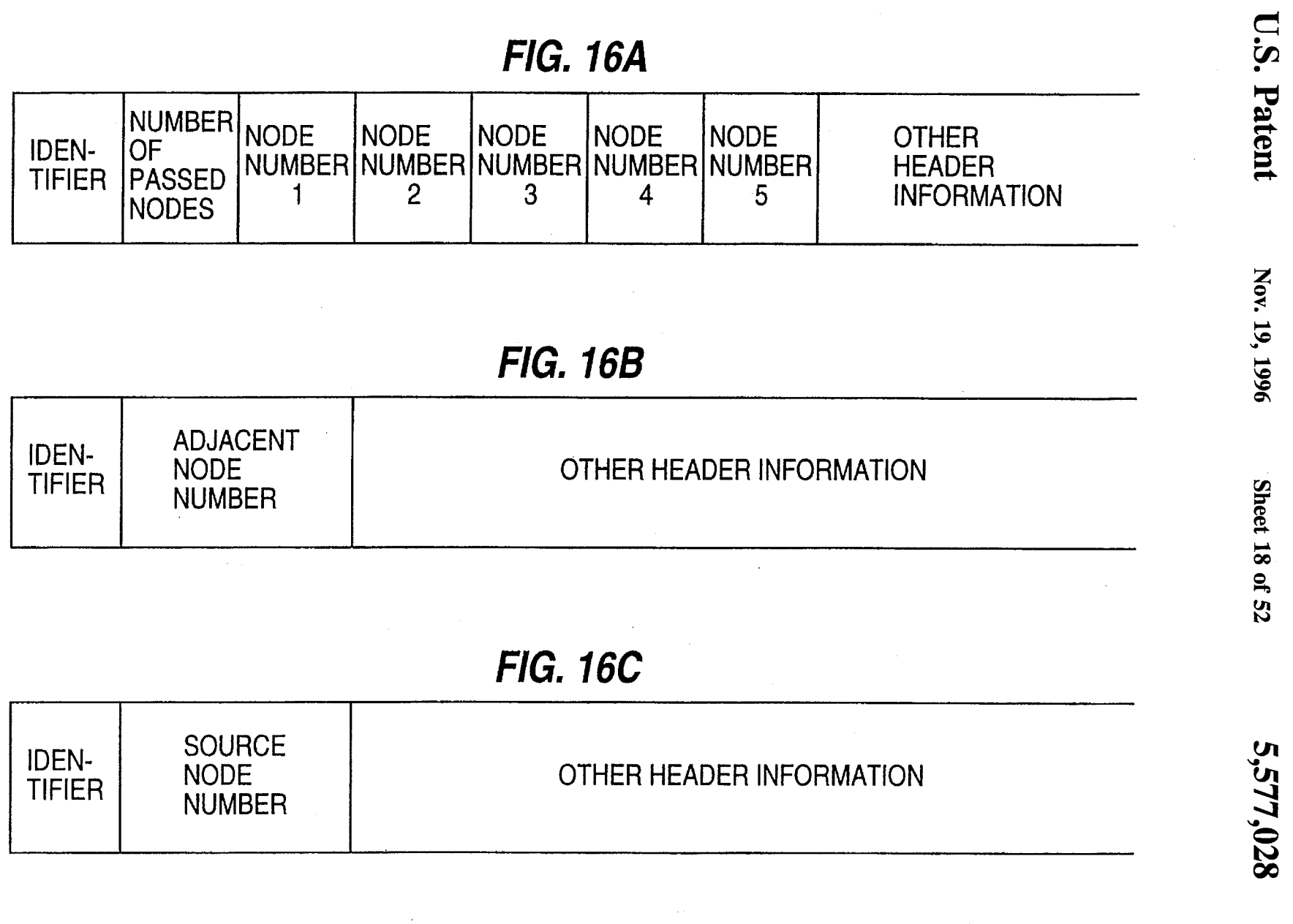

| | | | | | | | |
|---|---|---|---|---|---|---|---|
| IDEN-TIFIER | NUMBER OF PASSED NODES | NODE NUMBER 1 | NODE NUMBER 2 | NODE NUMBER 3 | NODE NUMBER 4 | NODE NUMBER 5 | OTHER HEADER INFORMATION |

FIG. 16B

| | | |
|---|---|---|
| IDEN-TIFIER | ADJACENT NODE NUMBER | OTHER HEADER INFORMATION |

FIG. 16C

| | | |
|---|---|---|
| IDEN-TIFIER | SOURCE NODE NUMBER | OTHER HEADER INFORMATION |

FIG. 23

| IDENTIFIER (STATE INFORMATION) | NODE NUMBER OF NODE | SEQUENCE NUMBER | NOTIFYING RANGE NUMBER-OF-HOP | OUTPUT LINK NUMBER | PACKET DELAY TIME | LOSS RATIO | OUTPUT LINK NUMBER | PACKET DELAY TIME | LOSS RATIO | |
|---|---|---|---|---|---|---|---|---|---|---|
| | ① | | H | 11 | 0 | 0 | 12 | $d_{12}$ | $PL_{12}$ | • • • |

FIG. 39

| LINK NUMBER | LINK CAPACITY c (bit/sec) | USE FREQUENCY BAND F (BIT/SEC) | PACKET DELAY TIME |
|---|---|---|---|
| 11 | 0 | 0 | 0 |
| 12 | $C_{12}$ | $F_{12}$ | $d_{12}$ |
| 13 | $C_{13}$ | $F_{13}$ | $d_{13}$ |
| 14 | $C_{14}$ | $F_{14}$ | $d_{14}$ |
| 21 | $C_{21}$ | $F_{21}$ | $d_{21}$ |
| 22 | 0 | 0 | 0 |
| 23 | $C_{23}$ | $F_{23}$ | $d_{23}$ |
| 24 | $C_{24}$ | $F_{24}$ | $d_{24}$ |
| - | - | - | - |
| - | - | - | - |
| - | - | - | - |
| nn | $C_{nn}$ | $F_{nn}$ | $d_{nn}$ |

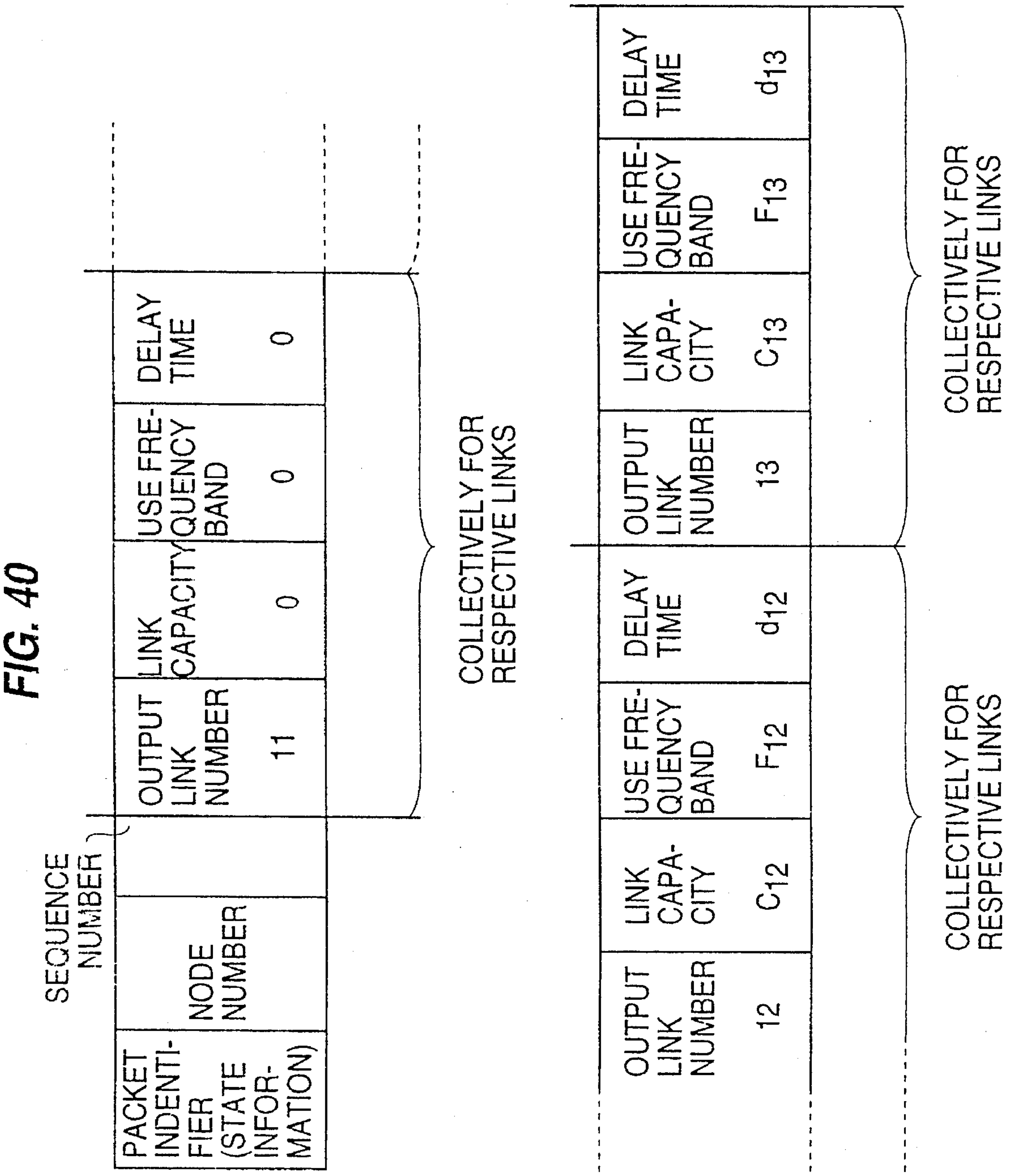

FIG. 40

| PACKET IDENTIFIER (STATE INFORMATION) | NODE NUMBER | SEQUENCE NUMBER | | | |
|---|---|---|---|---|---|

| OUTPUT LINK NUMBER | LINK CAPACITY | USE FREQUENCY BAND | DELAY TIME |
|---|---|---|---|
| 11 | 0 | 0 | 0 |

⎫ COLLECTIVELY FOR RESPECTIVE LINKS

| OUTPUT LINK NUMBER | LINK CAPACITY | USE FREQUENCY BAND | DELAY TIME |
|---|---|---|---|
| 12 | $C_{12}$ | $F_{12}$ | $d_{12}$ |

⎫ COLLECTIVELY FOR RESPECTIVE LINKS

| OUTPUT LINK NUMBER | LINK CAPACITY | USE FREQUENCY BAND | DELAY TIME |
|---|---|---|---|
| 13 | $C_{13}$ | $F_{13}$ | $d_{13}$ |

⎫ COLLECTIVELY FOR RESPECTIVE LINKS

| SOURCE NODE NUMBER | DESTINATION NODE NUMBER | OUTPUT ADJACENT NODE NUMBER | OUTPUT LINK NUMBER |
|---|---|---|---|
| 1 | 6 | 6 | 46 |
| ⋮ | ⋮ | ⋮ | ⋮ |
| S | d | i | ij |
| ⋮ | ⋮ | ⋮ | ⋮ |
| 6 | 1 | 2 | 42 |

( C: LINK CAPACITY, F: USE FREQUENCY BAND )

ROUTING SYSTEM USING A NEURAL NETWORK

This application is a continuation of application Ser. No. 07/754,445, filed Sep. 3, 1991, now abandoned.

BACKGROUND OF THE INVENTION

The present invention relates to an adaptive packet routing system in a packet network and more particularly to a routing system using a neural network in which respective nodes maintain a neural network and which determines an optimum output direction of a packet from the self node or source node by using the neural network.

A future communication network will require increased operation speed and capacity and is expected to develop into a multimedia integrated network in which various media can be installed in a mixed manner. In such an integrated network, the required performance such as a communication speed, reliability and a real time operation varies with time. Therefore, a routing technique is necessary which can set a flexible communication path in accordance with a variation of a state of a network and can set a detour path immediately upon an occurrence of a fault.

As a technology of realizing such communication, a packet exchange network has been considered. As an exchange method in a packet exchange network, a datagram method is provided which does not set a logical link between terminals, namely, which does not use a concept of a call, or a virtual call method which provides a logical channel between terminals. In a datagram system operated in such a packet exchange network, routing information up to the destination node is rewritten depending on the changes of the state of the network. This is because the traffic variation is relatively small and the optimum path is assumed not to frequently vary. In the routing of the virtual call method, the amount of traffic to be using a network is predicted upon designing the network and thus the optimum route is obtained so that the predicted traffic is not concentrated on a particular node between the sending and receiving node.

FIG. 1 shows a prior art example of the routing system in a packet exchange network. In FIG. 1, a packet is transmitted from a sending node (A) 1 to a receiving node (B) 2 and paths 1 to n exists between a sending node 1 and a receiving node 2. Routing tables for providing optimum path information are provided in respective nodes for each requested quality of the information such as the requested band of the media, and the path determination is made based on the content of these tables.

In the virtual call, a plurality of detour routes are provided between transmitting and receiving nodes so that a faulty portion can be avoided. When the fault occurs, a default path is provided between transmitting and receiving nodes, thereby re-opening communication in a virtual call.

FIG. 2 shows a prior art of establishing a fault detour route in a packet exchange network. In FIG. 2, between terminals A and B a route going through nodes 3, 4 and 5 are provided as an optimum route, and routes going through nodes 3, 6, 4 and 5 and going through nodes 3, 6, 7 and 5 are provided as a detour route. Between terminals C and D a route going through nodes 4, 6 and 8 are provided as an optimum route and a route going through nodes 4, 5, 7 and 8 are provided as a detour route.

As described above, in the prior art routing of a datagram method, it becomes necessary that a routing table from a source node to a destination node is periodically updated in accordance with the change of the state of the network as shown in FIG. 3. When the scale of the network becomes large and further the traffic variation is large, there is a problem that a time required for calculating an optimum path increases explosively and that an adaptive routing cannot be realized in accordance with the always changing state.

Even if an optimum path is obtained upon an input of the packet by using a virtual call system, a rate of a change of media kind & quantity installed therein with time becomes extremely large as compared with the prior art packet exchange network, it is impossible to obtain or determine an optimum path per the kind of media and the state of network by predicting such aspects of the network. In addition, there is a problem that a time for calculating an optimum path explosively increases with the scale of the network. There is also a problem that, if a detour path is again determined between a transmitting and receiving node when a link or node fault occurs, communication of a virtual call is interrupted during the period from the occurrence of the fault to the setting of the detour circuit, thereby reducing the reliability of a communication.

In the prior art, a single media is usually to be dealt with by a network and thus routing which satisfies different quality requests from various medias is not always carried out. In the multimedia integrated network it is necessary to realize a routing which satisfies a quality required by each of medias.

To realize such routing, we applied patent applications (Tokuganhei 01-507916 filed on Jul. 6, 1989 and U.S. application Ser. No. 455,323 filed on Jul. 6, 1989) in which a routing adaptive to a state of the network is realized by a control network interconnecting threshold elements.

In the above applications, a threshold element corresponding to a neuron is provided to each node, thereby forming a neural network in the whole actual network. In this case, a time required until the neural network becomes stable and the optimum path is obtained depends on the distance between the nodes and thus there is a problem that a network with a long distance between the nodes is not adaptive to the state variation.

SUMMARY OF THE INVENTION

An object of the present invention is to realize an adaptive routing which satisfies conditions required by various medias and reliability of communication.

According to the present invention, respective nodes include neural networks of the same structural characteristics. A calculation of each of the neural networks can be performed within the respective nodes. This structure of the present invention enables a routing to be adaptive to the variation of the state of the network independently from the distance between the nodes.

A feature of the present invention resides in a routing system for use in a multimedia integrated network for performing communication of various media in a packet format according to the datagram system, comprising: an interconnection type neural network for enabling respective nodes forming the multimedia integrated network to determine an output direction of a packet from the self-node; an external stimulus input unit for outputting an external stimulus to a neuron forming said neural network in accordance with the present state of the multimedia integrated network and a condition required by a media included in the integrated network; thereby enabling an optimum direction to be in a packet output direction in accordance with the present state of the multimedia integrated network and the condition required by the media.

BRIEF DESCRIPTION OF THE DRAWINGS

FIG. 12 is a table showing a first example of the content of the network state holding unit according to the invention;

FIGS. 16A–16C are formats for the header information in the data packet according to the invention;

FIG. 23 is a packet format of a third embodiment of the state notifying packet according to the invention;

FIG. 39 is a table showing a second example of the content of the network state holding unit according to the invention;

FIG. 40 is a packet format of a fifth embodiment of the state notifying packet according to the invention;

DESCRIPTION OF THE PREFERRED EMBODIMENTS

Figure 1:
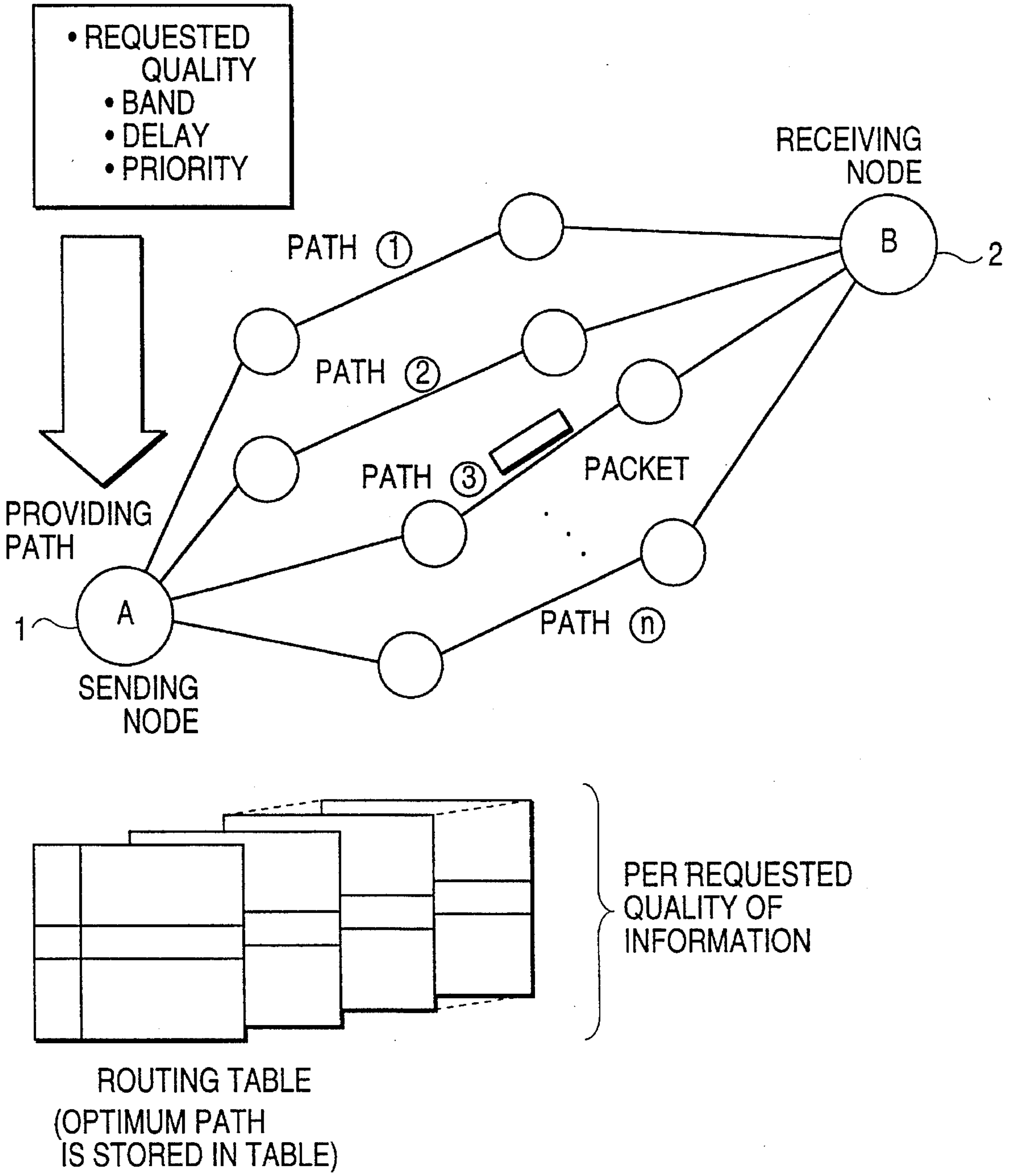
FIG. 1 shows a conventional example of a path setting method in the packet switching network.
Figure 2:
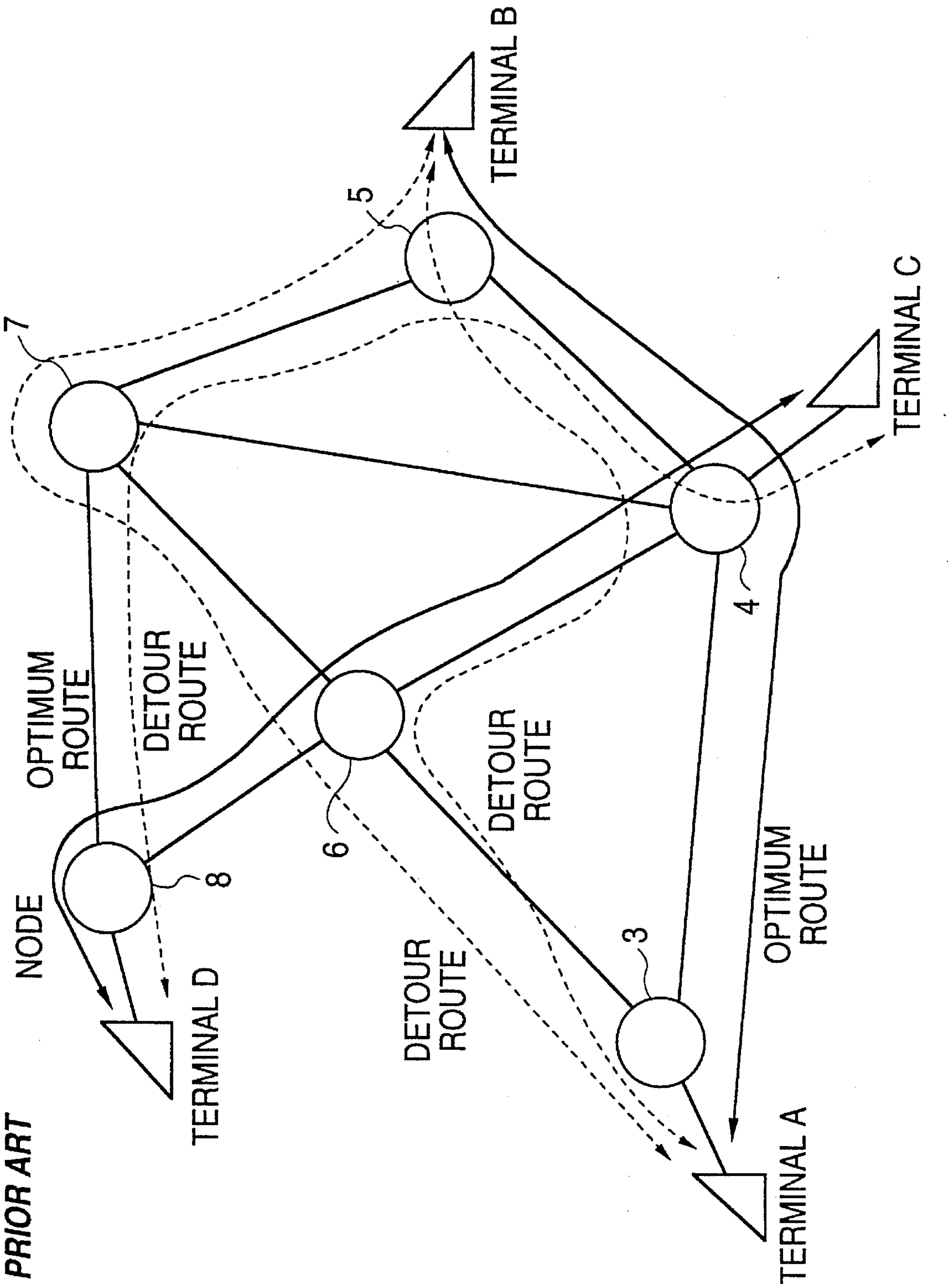
FIG. 2 shows a conventional example of fault detour route setting in the packet switching network.
Figure 3:
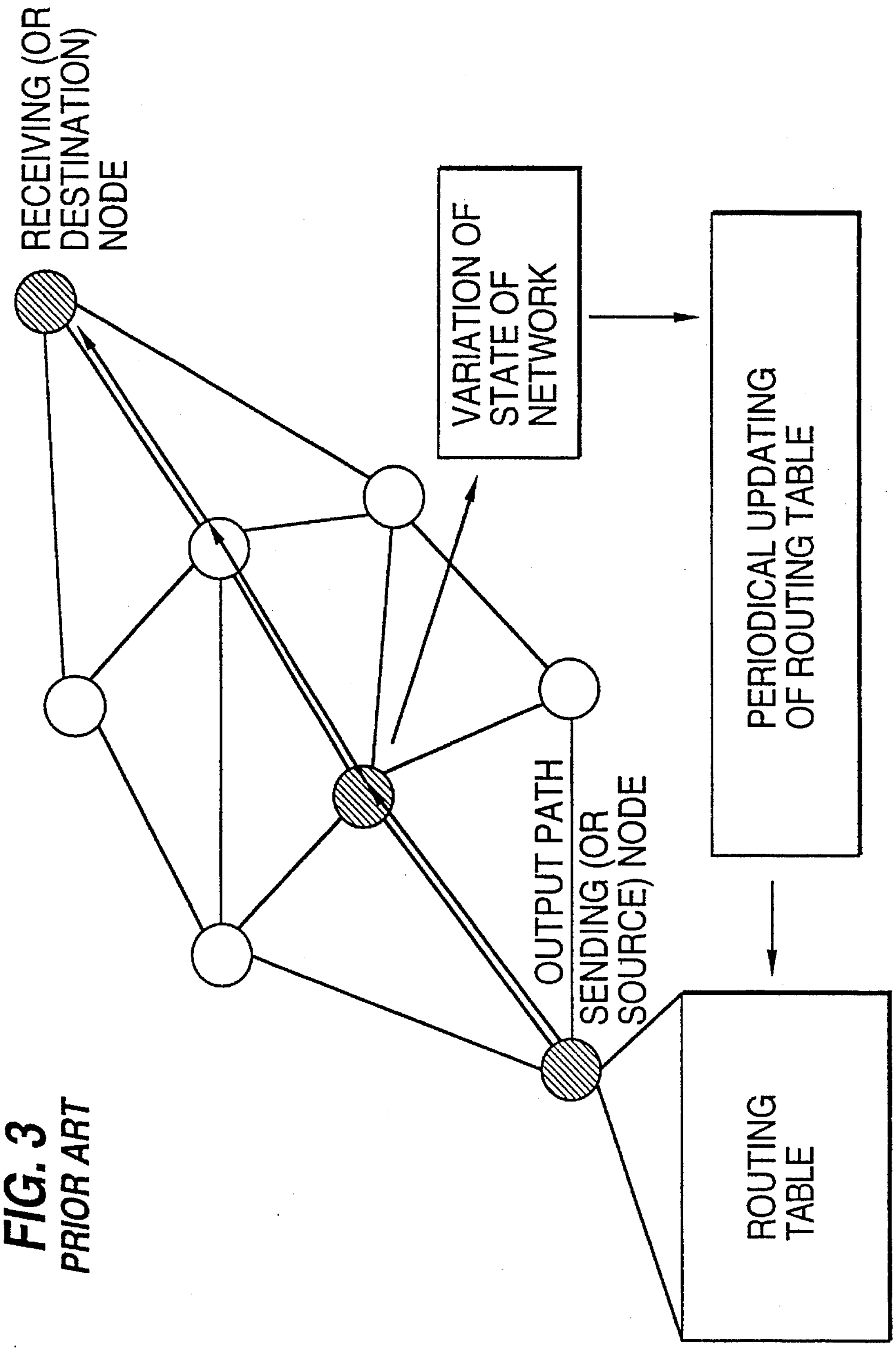
FIG. 3 is a view for explaining the problems in the conventional routing method.

FIGS. 4A to 4E are block diagrams of principles of the present invention. FIG. 4A to 4E are block diagrams of a routing system using a neural network in a multimedia integrated network 10 which transmits a various media such as voice, image and data in a packet format.

In FIGS. 4A to 4E, multimedia integrated network 10 is composed of a plurality of nodes 11 and links 14 connecting the nodes. Neural network 12 provided inside respective nodes 11 forming multimedia integrated network 10 determines an output direction of a packet from the self node and external stimulus input means 13 inputs external stimuli to a neuron in a neural network 12 in accordance with a present state of a multimedia integrated network 10 and a condition required by media transmitted in integrated network 10. A neuron designated by a black in neural network 12 in FIGS. 4A to 4E represents the node in neural network 12 in which a packet treated as a subject of the routing control exists (and which is called a routing node) and a source node and destination node of the packet exist.

Figure 4A:
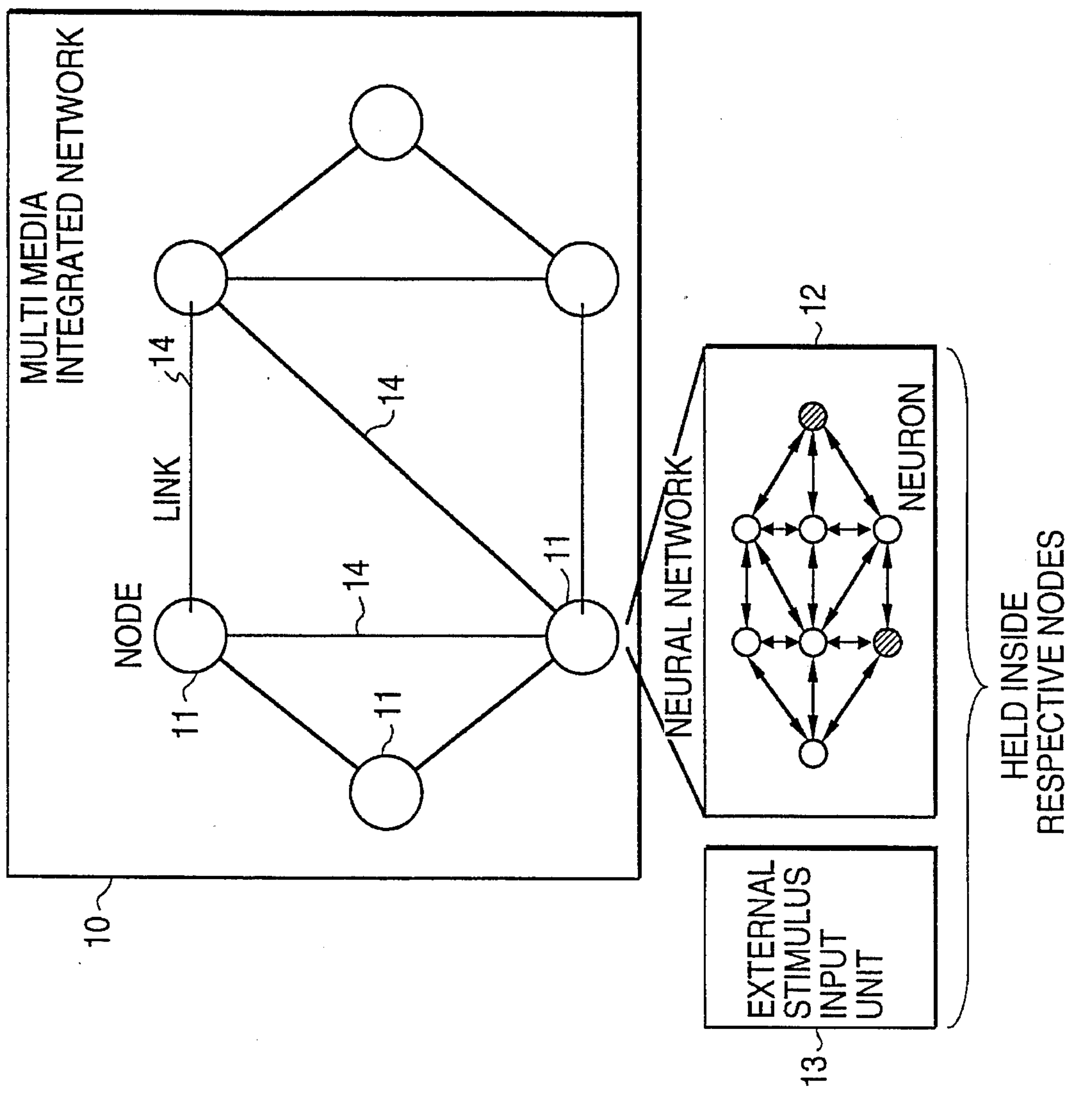
FIG. 4A is a block diagram of a first embodiment of the invention.

FIG. 4A is a block diagram of a first embodiment of the invention. The first embodiment is applied to a multimedia integrated network using the datagram system. A loss ratio of a packet and a delay time of a packet in respective links 14, for example, are used to indicate the present state of integrated network 10. The allowable packet loss ratio designating to what extent the packet can be lost in accordance with the designation by the terminal to which the packet is input is used as a condition required by media. Based on these values, that is the loss ratio of the packet and the allowable loss ratio of the packet, an optimum output direction of the packet from the node is determined based on neural network 12 by using an external stimulus provided by external stimulus input means 13.

Interconnected type neural network 12 shown in FIG. 4A comprises two kinds of neurons. A first kind of neuron corresponds to each respective node 11 on a one-to-one basis and the second kind of neuron corresponds to each respective link 14 on a one-to-one basis. External stimulus input means 13 provides an external stimulus to neurons corresponding one-to-one to the links 14 and respective neurons forming a neural network 12 and input from other neurons is added to the external stimulus. The result of the addition is subjected to threshold processing, thereby outputting 0 or 1. This operation is repeated. As a result, it is determined that a node corresponding to the node correspondence neuron whose output stabilizes at 1 is the node in the packet output direction and that the link corresponding to the link correspondence neuron whose output is stabilized at 1 is a link in a packet output direction.

As for a communication media using a datagram method, each time the packet is to move in the multimedia integrated network, the optimum output direction of the packet is obtained at a node to which the packet has been input. By repeating this operation, the packet reaches the destination node through an optimum path.

Figure 4B:
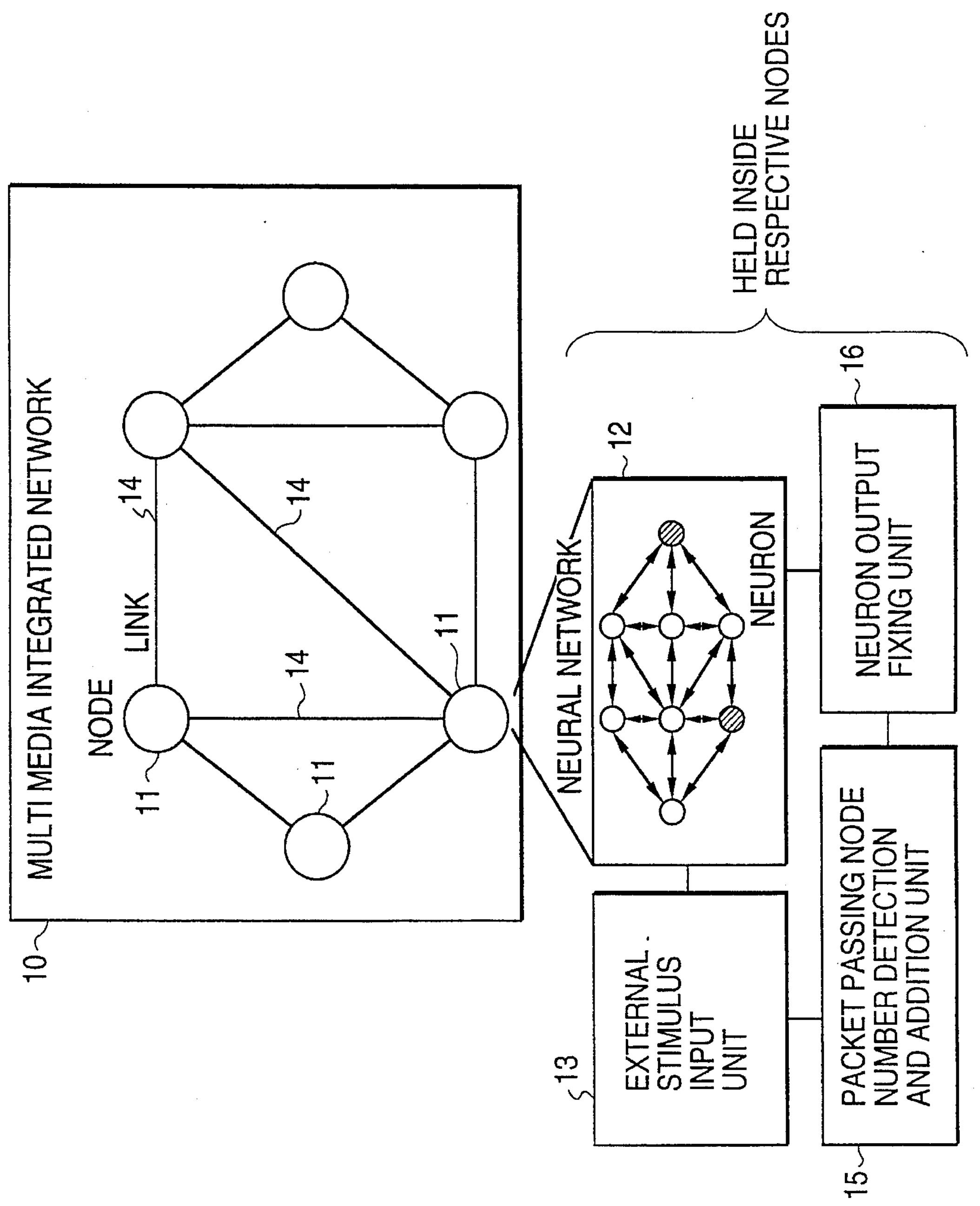
FIG. 4B is a block diagram of the second embodiment of the invention.

FIG. 4B is a block diagram of a second embodiment of the invention. The second embodiment is applied to the multimedia integrated network using the datagram method. When FIG. 4B is compared with FIG. 4A illustrating the first embodiment of the invention, FIG. 4B is different from FIG. 4A in that the packet passing node number detection and addition unit 15, and the neuron output fixing unit 16 are added.

Packet passing node number detection and addition (or insertion) unit 15 detects the number of the nodes to which the packet is transmitted, from the packet input to the self-node, i.e., the node in which these operations are performed, and adds the number of the self-node to the packet, thereon transmitting the packet to the adjacent node. Neuron output fixing unit 16 fixes the output of the neuron corresponding one-to-one to the node through which the input packet is transmitted, to be 0 neural network 12.

The second embodiment excludes the path going through the nodes through which the input packet has been transmitted, thereby performing a routing of the input packet, and thus decreasing a time required for the calculation by neural network 12 and thus avoiding the path in which a ping-pong phenomena or loop phenomena of the packet occurs.

Figure 4C:
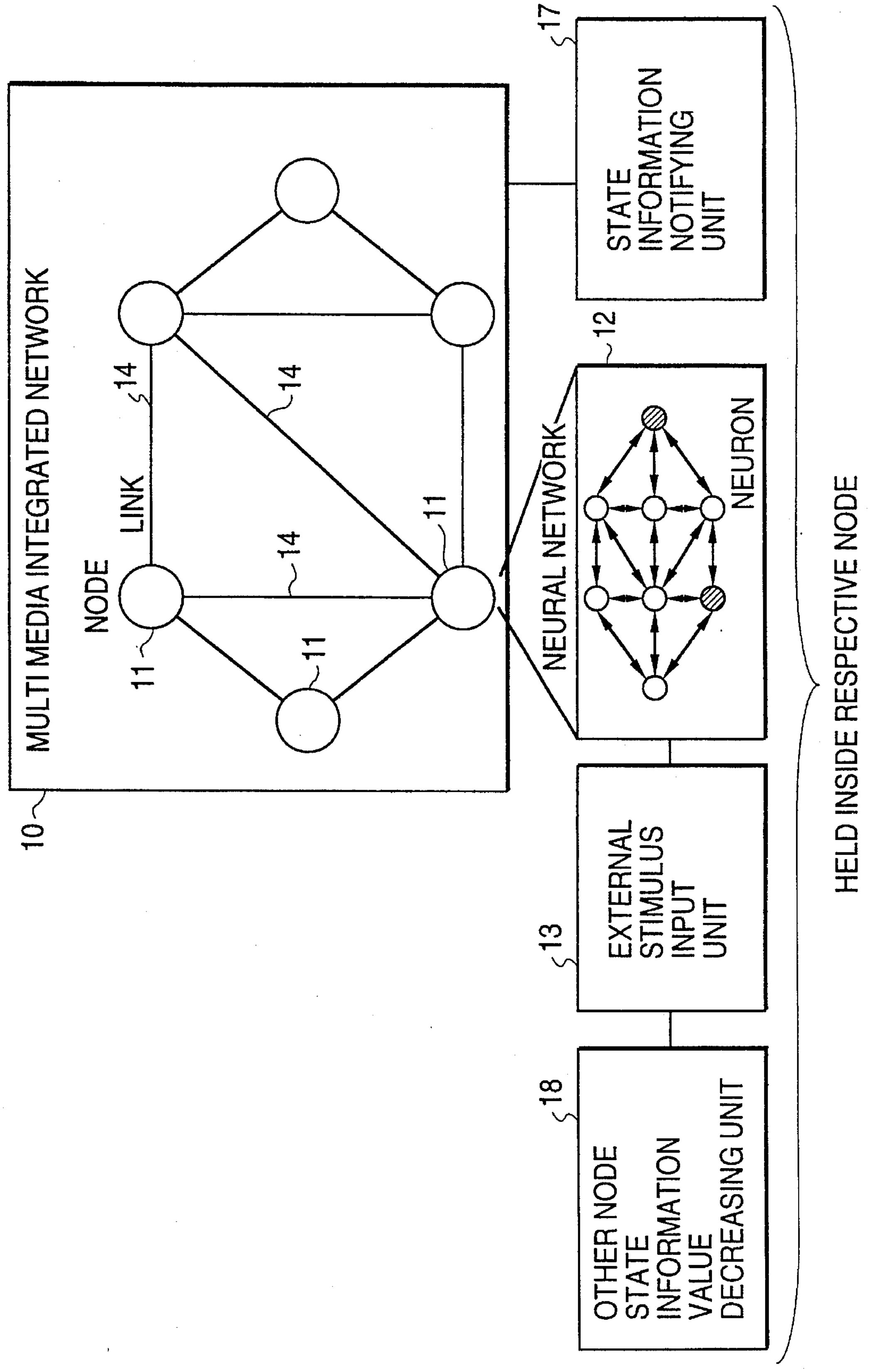
FIG. 4C is a block diagram of the third embodiment of the invention.

FIG. 4C is a block diagram of a third embodiment of the invention. In FIG. 4C, a state information notifying unit 17 and another node state information value decreasing unit 18 are added to FIG. 4A.

State information notifying unit 17 notifies all the nodes forming integrated network 10 of the information representing the state relating to the self-node out of the present states of multimedia integrating network 10. In the third embodiment, the notified state information comprises the packet loss ratio of respective links and the packet delay time which represent the state of the respective output link of the node. Other node state information value decreasing unit 18 decreases the value of the state information received from state information notifying unit 17 of another node in accordance with the distance from the self-node to the other node and the decreased result is output to external stimulus input unit 13, thereby being used for calculation of the external stimulus.

The third invention can obtain an optimum path without being affected by the state of the node which is distant from the routing node on the path, when the output direction of the packet is obtained in the routing node. Namely, with increase of the distance from the routing node, the received state information value is decreased and the influence of the state of the node which is distant from the routing node can be decreased.

Figure 4D:
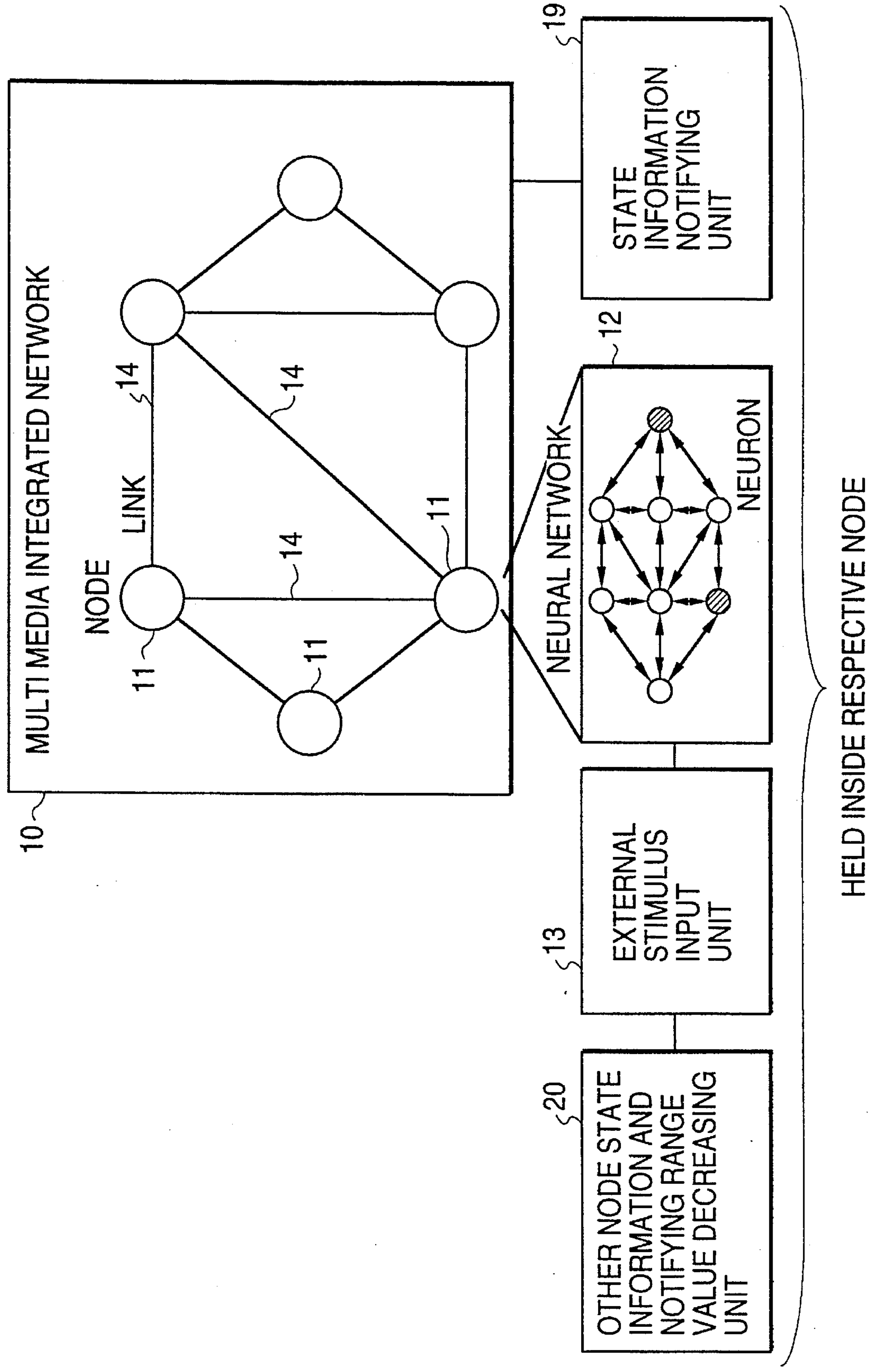
FIG. 4D is a block diagram of the fourth embodiment of the invention.

FIG. 4D is a block diagram of a fourth embodiment of the invention. When the FIG. 4D is compared with FIG. 4C illustrating the third embodiment, it will be noted that FIG. 4B is different from FIG. 4C only in that the other node state information and notifying range value decreasing unit 20 is provided.

However, state information notifying means is different from state information notifying unit 19 in the third invention in that the state relating to the self-node amongst the present states of multimedia integrated network 10, such as a range of notifying the state information within the integrated network 10 in addition to the state of the output links described above, is notified to all the other nodes.

Therefore, the other node state information and notifying range value decreasing unit 20 decreases the value of the state information provided by other nodes and the value of the notifying range in accordance with the distance up to the other nodes. When the result of decreasing the notifying range is not 0, the result of the decrease is notified to the adjacent node and is output to external stimulus input unit 13 in the self-node. When the result of decreasing the notifying range is 0, the decrease result is output to external stimulus input unit 13 without notifying the adjacent node of the decrease result.

Therefore, the fourth embodiment not only decreases the value of the state information in accordance with the distance as in the third embodiment, but also limits the range of notifying the state information, thereby further decreasing the volume of communication used for the state notification.

Figure 4E:
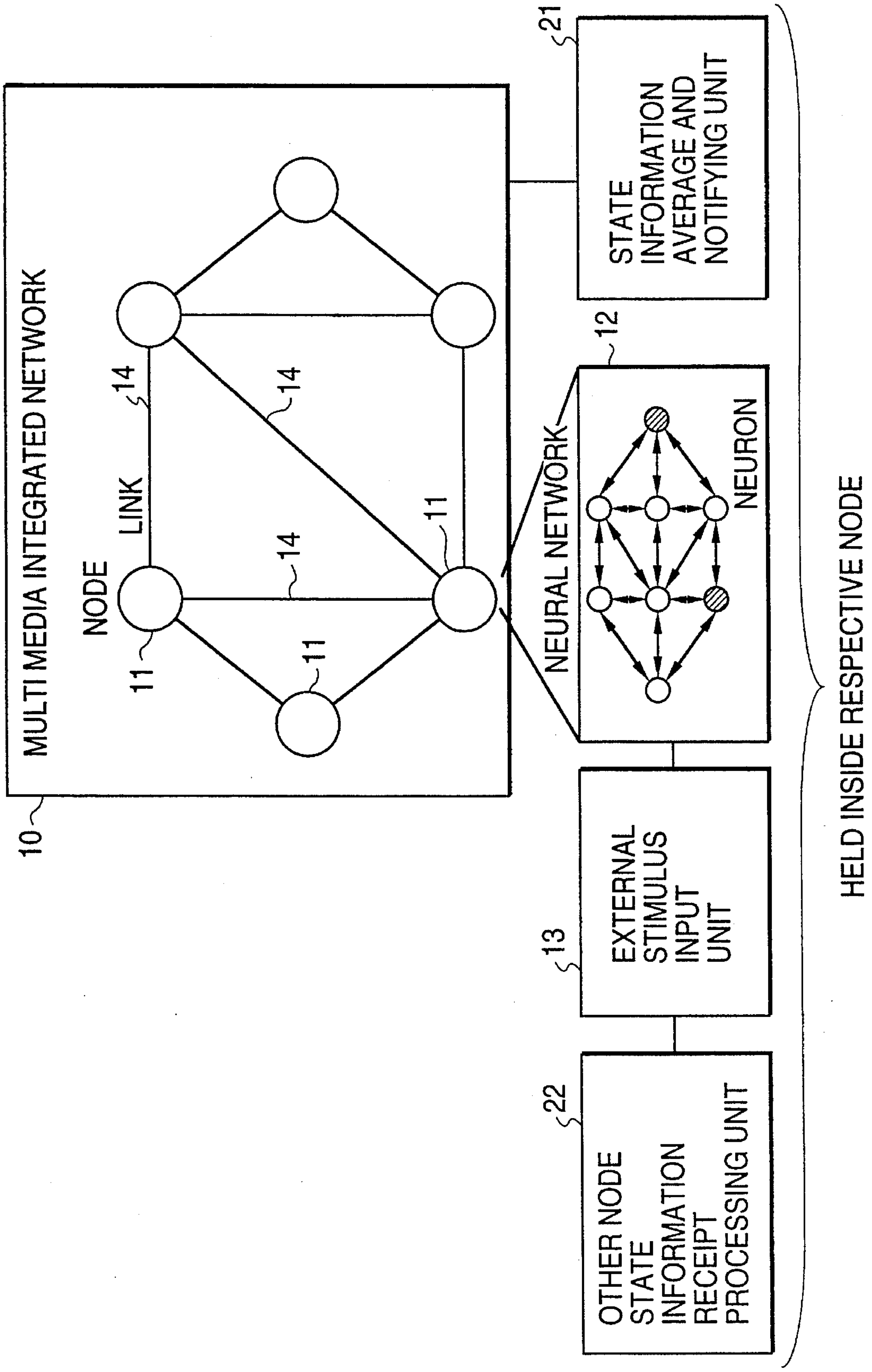
FIG. 4E is a block diagram of the fifth embodiment of the invention.

FIG. 4E shows a block diagram of the fifth embodiment. FIG. 4E is different from FIG. 4A illustrating the first embodiment in that state information average and notifying unit 21, and other node state information receipt processing unit 22 are added.

State information average and notifying unit 21 performs an averaging operation of the values representing the state of respective output links of the self-node out of states of the integrated network 10 in a plurality of kinds of periods and notifies respective nodes forming the integrated network of the scope of the notification of the average result in the integrated network and the average result, the notification scope being valuable in accordance with the period. Other node state information receiving processing unit 22 decreases the value designating the notification range received from other node state information average and notifying unit 21 by 1. When the decrease result is not 0, the received state information average value is output to external stimulus input unit 13 and the result of the decrease of notification range and the state information average value are output to all the adjacent nodes. When the decrease result of the notifying range is o, the state information average value is output to external stimulus input means 13 without being output to the adjacent node.

Therefore, the fifth embodiment provides a plurality of notification frequencies and notification ranges of the link state information which are notified from a respective nodes to other node. In the routing node, an optimum route can be calculated by using the instantaneous value which varies in a real-time manner in the state of a near node and using the average value for a long time period in the stake, of a remote node. Therefore, an increase of traffic caused by the state notification is prevented and the routing suitable for the network state can be realized.

The principle of the sixth embodiment is the same as that of the first embodiment as illustrated in FIG. 4A, as stated above. However, the state of the network and a condition required by the media which are used upon an input of the external stimulus by external stimulus input means 13 are different from the first embodiment. The sixth embodiment is directed to a multimedia integrated network using the virtual call method, and the usable frequency band of respective links, the frequency band being used, allowable utilizing ratio of the link, or a delay of the packet are used for the state of multimedia integrated network 10, and the frequency band required by the information input from the terminal is used for a condition required by the media.

The virtual call method uses an interconnected type neural network 12 maintained in the self-node upon setting the call in the source node of the packet, and determines the node corresponding to the node correspondence neuron whose output is stabilized at 1, as the node in the packet output direction, and further determines the link corresponding to the link correspondence neuron whose output is stabilized at 1, as the link in the packet direction. Based on this result, the whole path upto the destination node is provided. The following data packet is transmitted to the destination node through the above provided path.

Figure 5:
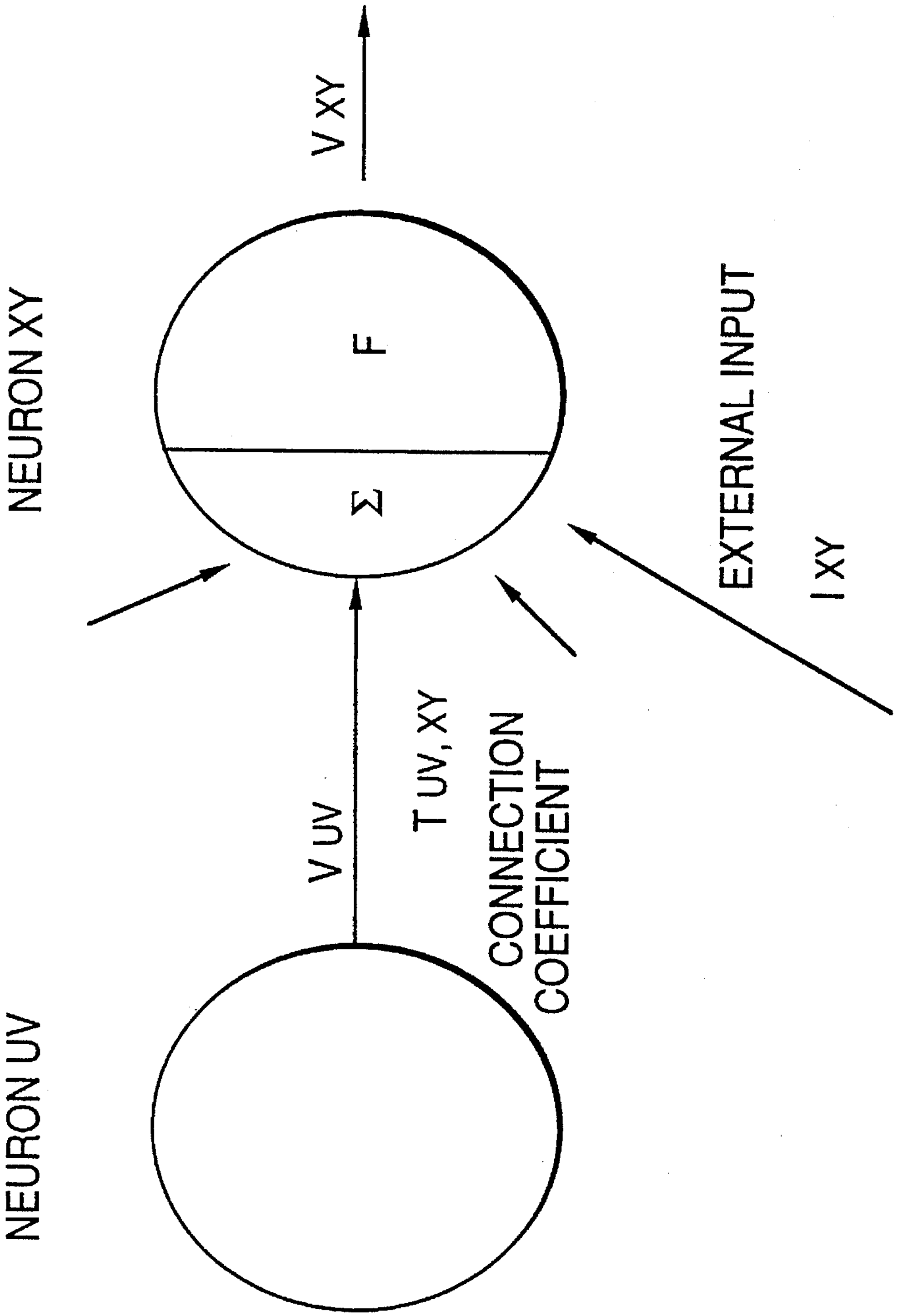
FIG. 5 depicts a connection relation between two neurons.

FIG. 5 depicts a connection relation of two neurons in neural network 12. In FIG. 5, connection of a neuron UV and neuron XY is represented by connection coefficient $T_{uv,\ xy}$. The product of the output $V_{uv}$ of neuron UV and the connection coefficient $t_{uv,xy}$ is input to neuron XY. The neuron XY receives the output of other adjacent neurons in neural network 12 and the output of the self-neuron XY after they are weighted by respective connection coefficients. Further, neuron XY receives external input $I_{xy}$, also. Neuron XY obtains the total sum of these inputs and performs a threshold processing of the result, thereby outputting output $V_{xy}$. The output value is either 0 or 1.

According to the present invention, respective nodes forming the multimedia integrated network maintain the neural network of the same structure and the outputs from neurons are processed within the node, with an object function satisfying the condition required by the media and minimizing the transmission delay of the packet corresponding to the energy function of the neural network on a one-to-one basis, and the energy function is minimized, thereby providing a direction of an optimum output of the packet to be obtained.

The operation of each node in the neural network is defined in the state equation shown by the following expression (1). The output state becomes stable when the energy function expressed by expression (3) defined by the whole neural network is minimized.

$$\frac{du_{XY}}{dt} = \sum_{X'}^{N}\sum_{Y'}^{N} T_{XY,X'Y'}V_{X'Y'} + I_{XY} \tag{1}$$

$$V_{XY} = f(U_{XY}) \tag{2}$$

$$E = -\frac{1}{2}\sum_{X}^{N}\sum_{Y}^{N}\sum_{X'}^{N}\sum_{Y'}^{N} T_{XY,X'Y'}V_{XY}V_{X'Y'} - \sum_{X}^{N}\sum_{Y}^{N} I_{XY}V_{XY} \tag{3}$$

$U_{xy}$ represents an internal state of neuron XY, $V_{xy}$ an output state of neuron XY, $T_{xy,\ x'y'}$ the connection coefficients between neuron XY and neuron X'Y', Ixy an external stimulus (external input) to neuron XY, and f(X) a threshold function.

In order to obtain the optimum output direction of the packet from the node in the multi-media integrated network by using the above-described neural network, these outputs $V_i$, $V_{ij}$ of the neurons corresponding to respective node i and link ij are represented by a variable which becomes "1" when the node and link are located on the route of the optimum path. In the neural network in which the output of the neuron corresponding to the source node and destination node is fixed to "1", the route minimizing the transmission delay of the packet between the source and destination nodes is determined by using the above-described energy minimizing principle. An object function for minimizing the transmission delay between the source and destination nodes is provided by the following expression.

$$\Phi = C_1 \sum_{i \neq d}\left( V_i - \sum_j V_{ij}\right)^2 + C_2 \sum_{i \neq s}\left( V_i - \sum_j V_{ji}\right)^2 + C_3 \sum_i\sum_j V_{ij}(V_{ij} - A_{ij}) + C_4 \sum_i\sum_j d_{ij}V_{ij} \tag{4}$$

where s is a suffix designating a source node and d is a suffix designating a destination node, $d_{ij}$ represents a delay time of a packet when the packet transmitted through the link ij and $A_{ij}$ is a variable which becomes "1" when the link ij is usable and becomes "0" when the link ij is not usable.

The first to third terms in the expression (4) are the restriction conditions required for the existence of only one optimum path. And the fourth term represents the transmission delay between the source and the destination nodes by making the object function correspond one-to-one to the above-described energy function of the neural network, namely, the expression (3). The connection function between respective neurons and an external stimulus to the neuron are obtained.

Figure 6:
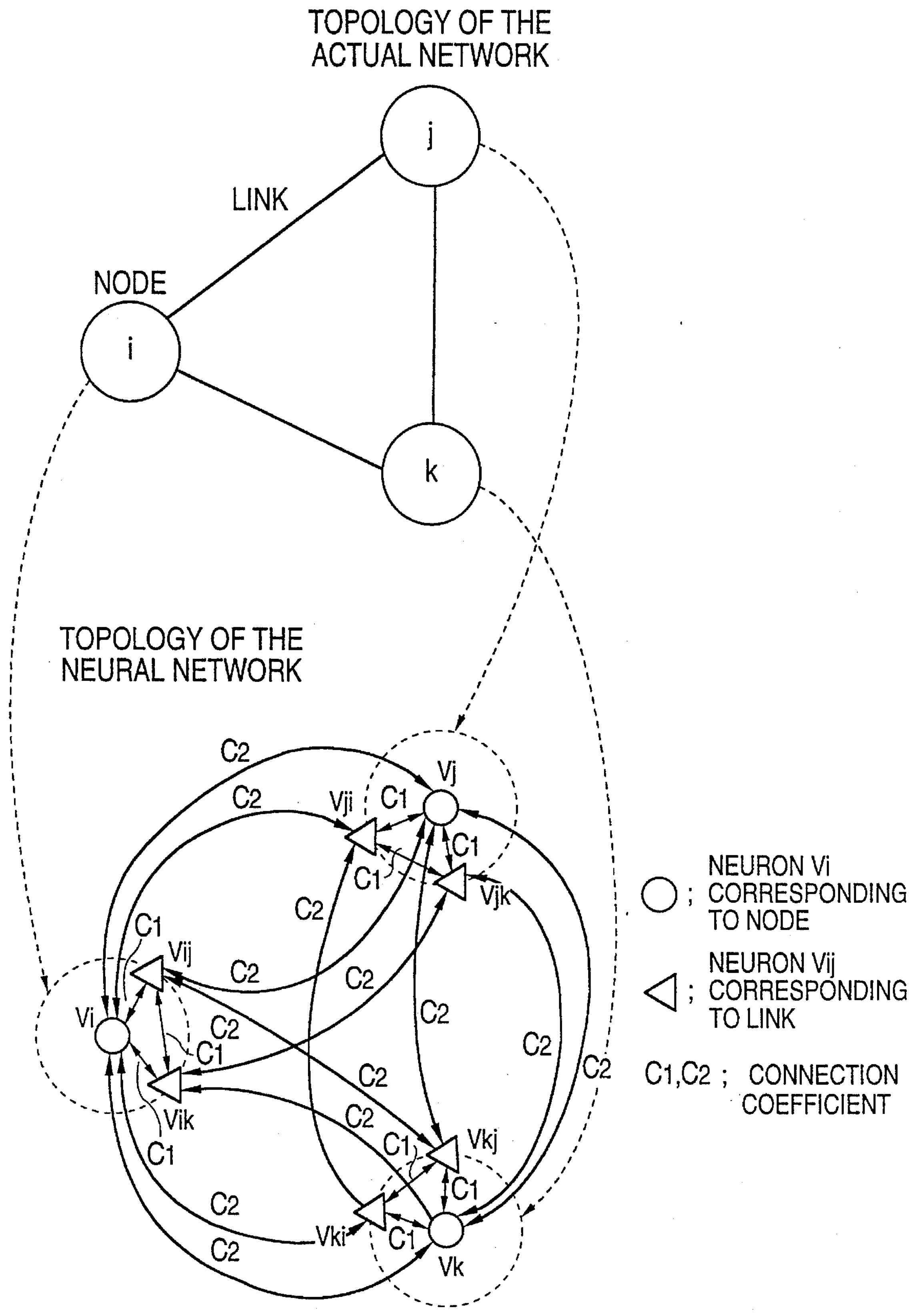
FIG. 6 is a structural diagram of an embodiment of a neural network in respective nodes.

FIG. 6 is a structural diagram of an embodiment of the connection relation of the neurons in the neural network, and the embodiment corresponds to the actual network in which the multimedia integration network is composed of three nodes i, j, and k. The same structure of the neural network shown in FIG. 6 is stored in each of the three nodes i, j, and k. The connection coefficients of the neurons in the neural network are made equal to coefficients $C_1$ and $C_2$ within the object function as the object function is made to correspond to the energy function.

The external stimulus to the link correspondence neuron ij is represented by the following expression by referring to a coefficient of variable $V_{ij}$ in each of expression (4).

$$C_3A_{ij}-C_4d_{ij} \quad (5)$$

The external stimulus represents the value input from external stimulus input unit 13 in FIG. 4, and particularly variable $A_{ij}$, representing whether the link corresponding to the link correspondence neuron ij is usable, can be expressed by a model using a different neuron in accordance with the following state equation.

$$A_{ij}=f[L-PL_{ij}] \quad (6)$$

In this model f(X) represents a threshold function, L represents an allowable packet loss ratio designated by an input terminal of the packet as a condition required by the media, and $PL_{ij}$ represents a packet loss ratio at link ij. When the allowable packet loss ratio (L) is larger than the packet loss ratio ($PL_{ij}$) of the link, the link can receive the packet, and therefore the variable $A_{ij}$ representing whether the link is usable or not becomes "1".

Figure 7:
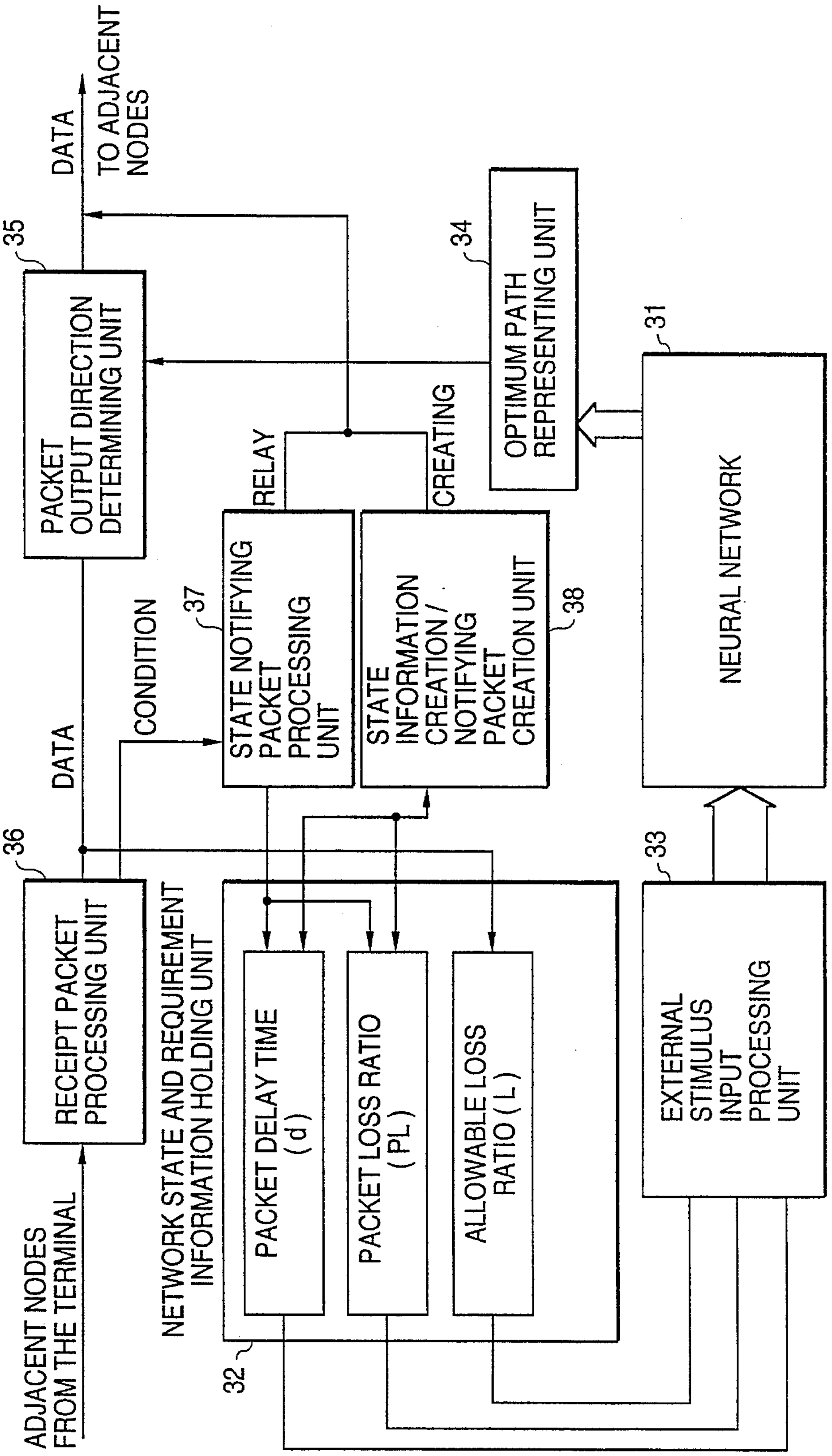
FIG. 7 is a block diagram of a first embodiment of a node according to the invention.

FIG. 7 is a block diagram of a first of an embodiment of the node according to the first invention. In FIG. 7, the node comprises neural network 31 for determining the output direction of the packet from the self-node, network state and requirement information holding unit 32 for holding the state of the multimedia integrated network and the condition required by the media, external stimulus input processing unit 33 for outputting the external stimulus to the neural network 31 by using the stored result in the network state and requirement information holding unit 32, optimum path representing unit 34 for holding the output result of neural network 31 and representing the optimum path, a packet output direction determining unit 35 for determining the output direction of the packet from the self-node, receipt packet processing unit 36 for receiving the input packet from-the terminal connected to the adjacent node or the self-node, state notifying packet processing unit 37 for processing the packet received by received packet processing unit 36 and for outputting the packet delay time of respective links of the other nodes and the packet loss ratio to network state and requirement information holding unit 32 when the packet received by receipt packet processing unit 36 is a state notifying packet, and state information creating and notifying packet creating unit 38 for creating the network state information relating to the self-node, outputting the network state information to network state and requirement information holding unit 32 and for creating the state notifying packet to be sent to the other nodes.

Figure 8:
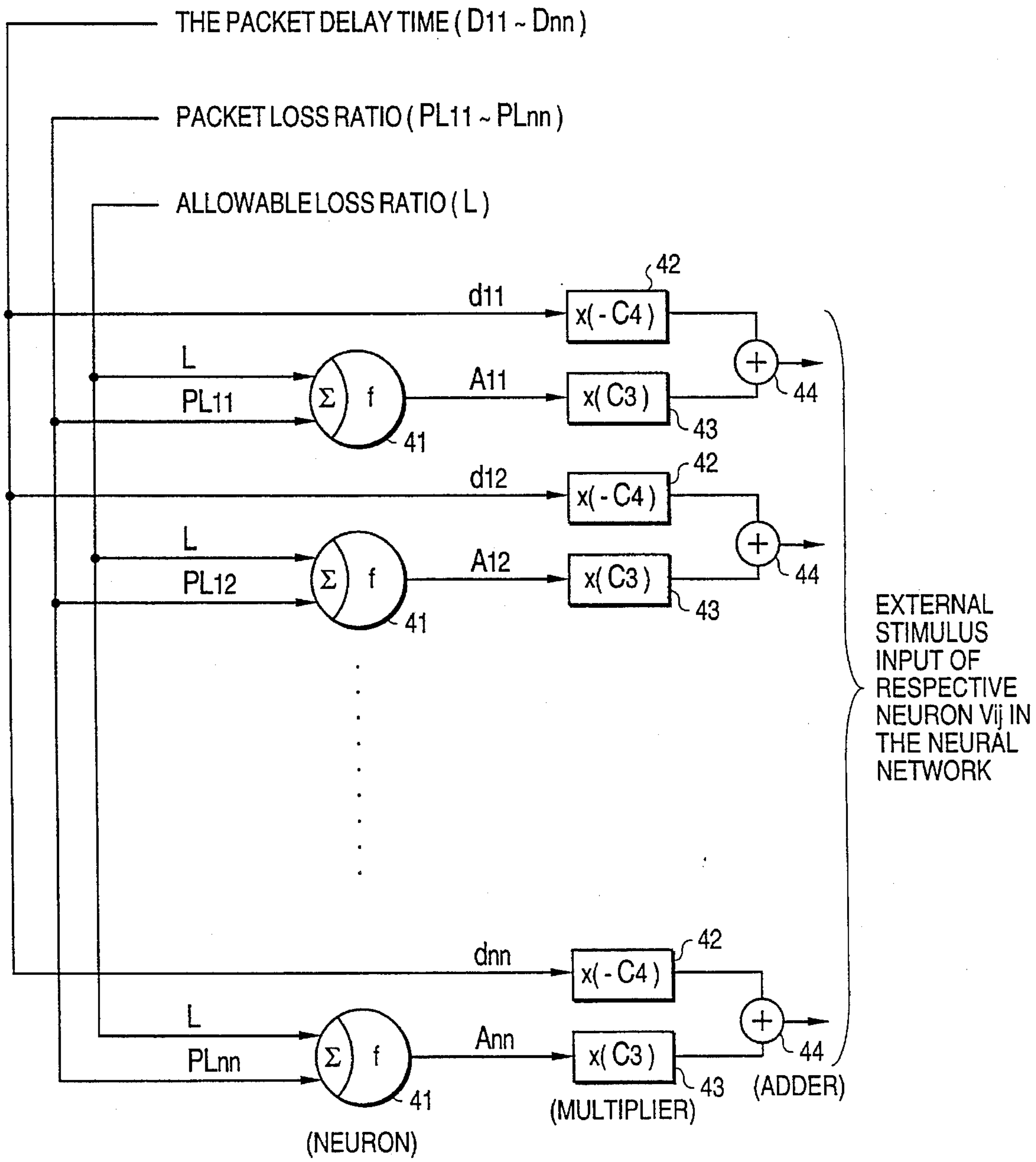
FIG. 8 is a block diagram of a first embodiment of external stimulus input processing unit according to the invention.

FIG. 8 is a block diagram of a first embodiment of t-he external stimulus input processing unit according to the invention. In FIG. 8, neurons 41 are provided for respective links corresponding to i=1 to n, j=1 to n in the external stimulus input processing unit, and the allowable packet loss ratio L and packet loss ratio $PI_{ij}$ of respective links are input to respective neurons. The value of $A_{ij}$ is obtained by expression (6), and by using the value of $A_{ij}$ and the packet delay time $d_{ij}$, the external stimulus is output to the neurons which correspond to the links in the neural network 31 shown in FIG. 7 on a one-to-one basis according to expression (5) through coefficient unit 42 and 43 and adder 44.

Figure 9:
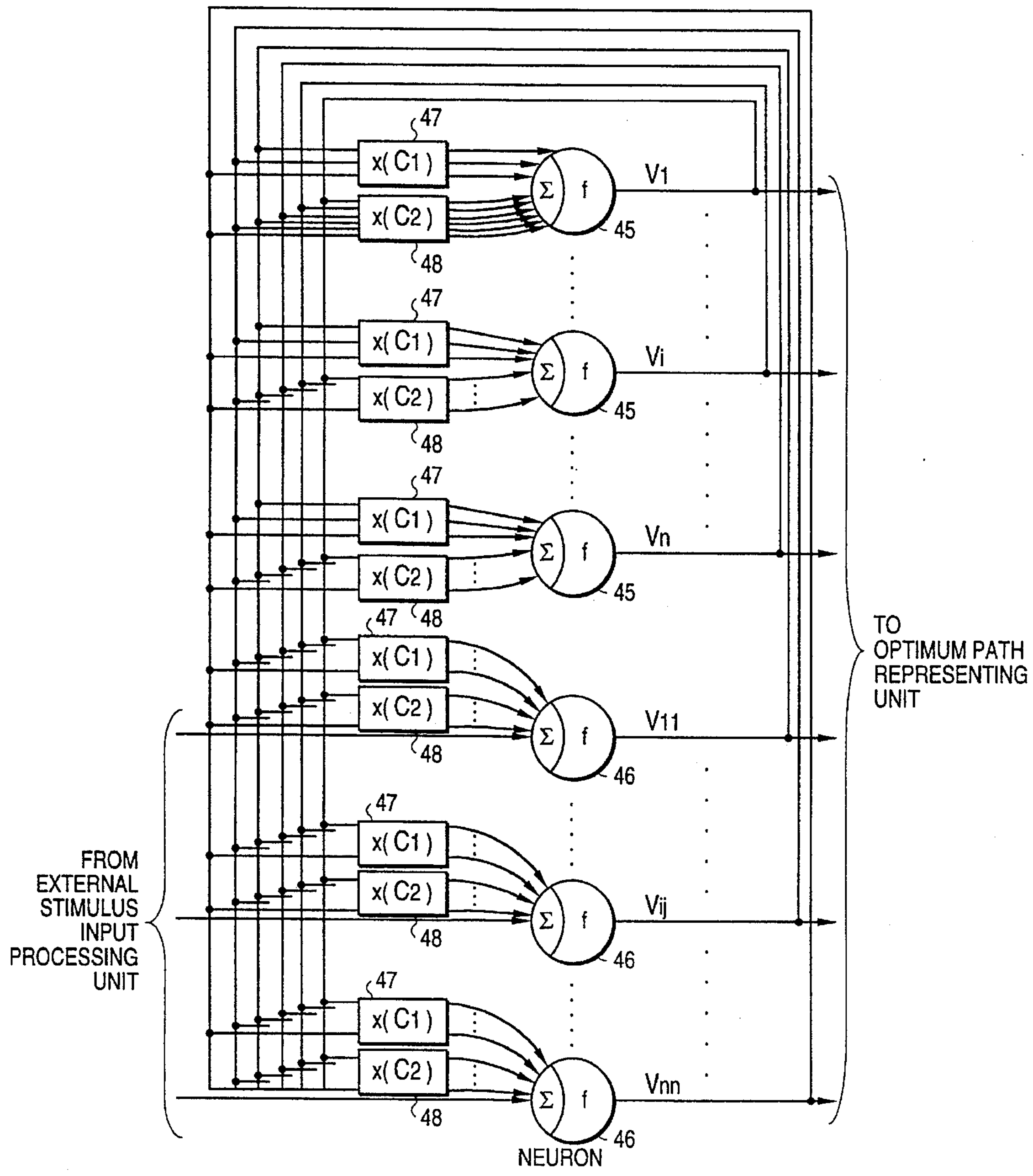
FIG. 9 is the structural diagram of an embodiment of a neural network according to the invention.

FIG. 9 is a structural view of an embodiment of a neural network according to the first embodiment of the invention. In FIG. 9, the neural network is provided with neurons 45 corresponding to the nodes on a by-one-by basis and neurons 46 corresponding to the links on a one-to-one basis. Respective neurons are connected by coefficient unit 47 and 48 representing connection coefficients $C_1$ and $C_2$ as explained with reference to FIG. 6, and the neurons corresponding to respective links receives the external stimulus from external stimulus input processing unit 33.

Figure 10:
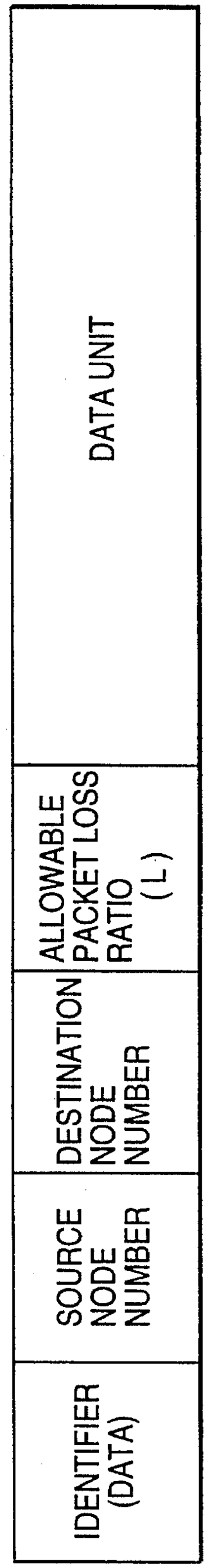
FIG. 10 designates a packet format of an embodiment of the data packet according to the invention.

FIG. 10 is an embodiment of the packet format of the data packet according to the invention. In FIG. 10, the data packet stores an identifier indicating that the packet is a data packet, the numbers of the source and destination nodes of the data packet, and the allowable packet loss ratio as the condition required by the media corresponding to the packet.

Figure 11:
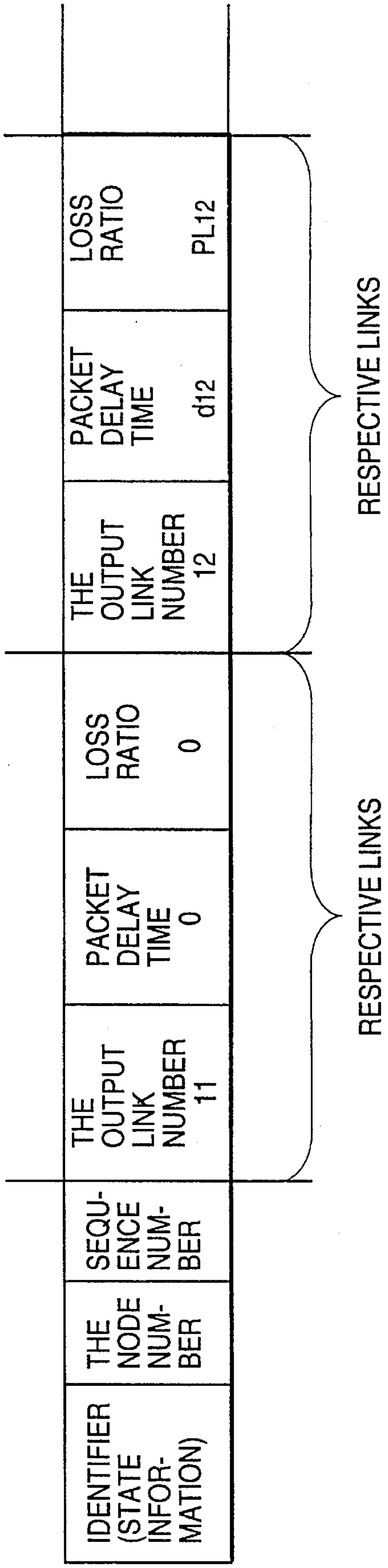
FIG. 11 is a packet format of a first embodiment of the state notifying packet according to the invention.

FIG. 11 shows a first embodiment of a packet format of the state notifying packet for notifying the other nodes of the state of the respective nodes. In FIG. 11, the state notifying packet stores an identifier indicating that the packet is a state notifying packet, the number of the node transmitting the packet, a sequence number of the transmitting node for the state notifying packet, and following the sequence number, the number of the links, the packet delay time in the link, and the packet loss ratio with regard to the respective output links of the nodes.

FIG. 12 is a table showing a first example of a content of the network state holding unit which holds a packet delay time and packet loss ratio, in the network state and requirement information holding unit 32 shown in FIG. 7. In FIG. 12, the number of output links from self-node 1 is determined as 4, for example, the link numbers are provided as 11 to 14. The number of output finks of another node, such as node 2, are provided as 21 to 24, and the packet delay time and packet loss ratio are stored for respective links. The allowable packet loss ratio is determined as the only one value for the packet of the object of the routing in the network state and requirement information holding unit 32, as explained in FIG. 10. The value of the ratio is held in a buffer.

Figure 13:
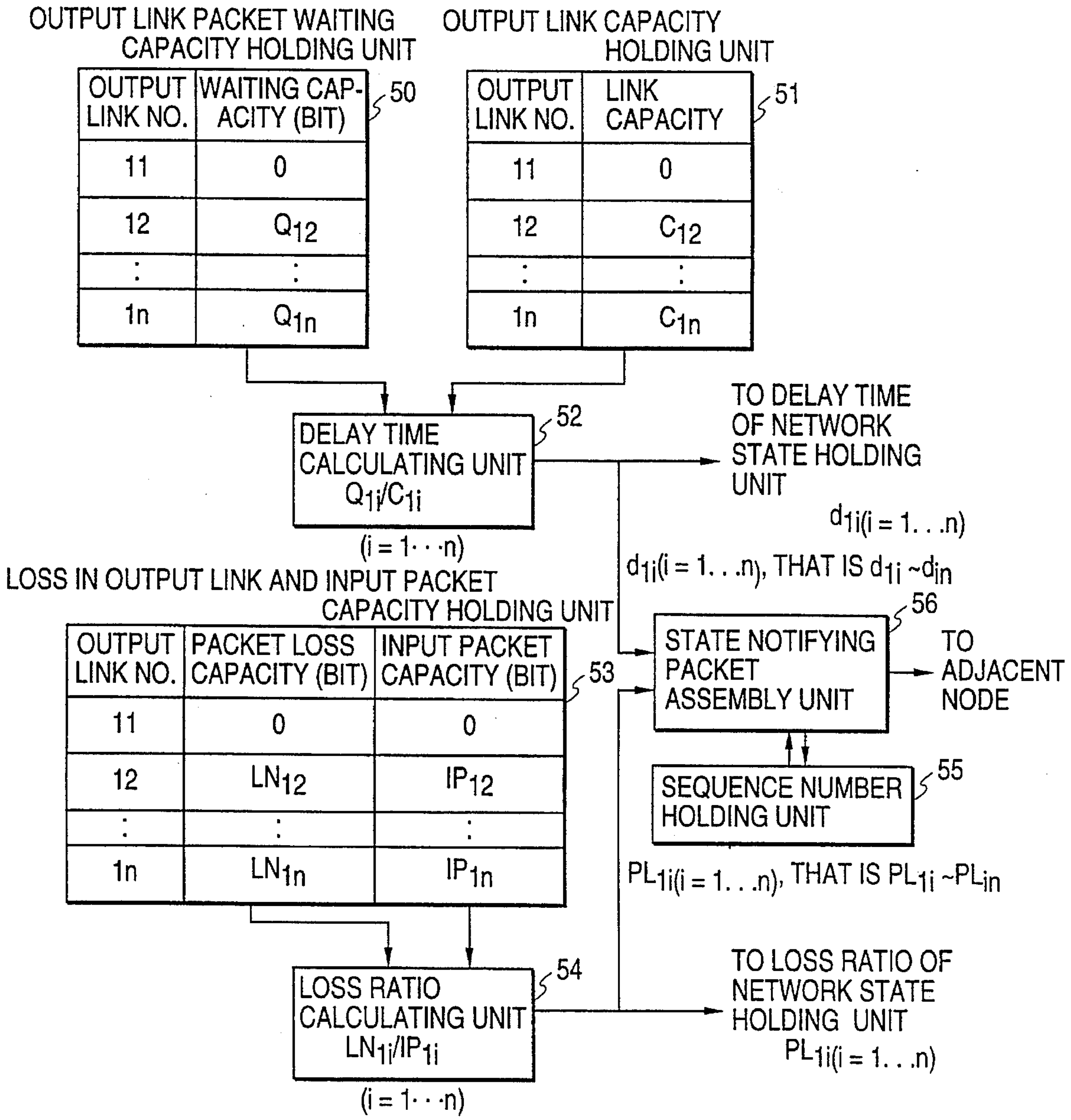
FIG. 13 is a block diagram of an embodiment of the state information creation notifying packet creation unit.

FIG. 13 is a block diagram of a structure of the embodiment of state information creation/notifying packet creation unit 38 in FIG. 7. In FIG. 13, the state information creation/notifying packet creation unit 38 comprises output link packet waiting capacity holding unit 50 for holding a packet waiting capacity, i.e., the number of packets waiting for transmission in correspondence with the respective output links from the self-node, output link capacity holding unit 51 for holding the capacity of the respective output links from the self-node, delay time calculating unit 52 for computing the delay time of the packet per link by using the contents of the two holding units 50 and 51, a loss and input packet capacity holding unit 53 for holding the capacity of lost packets and the capacity of input packets in correspondence with respective output links, loss ratio calculating unit 54 for computing the packet loss ratio by using the content of the holding unit 53, sequence number holding unit 55 for holding the sequence number for the state notifying packet, and state notifying packet assembly unit 56 for assembling the state notifying packet to be sent to the other nodes by using the output of the delay time calculating unit 52 and loss ratio calculating unit 54 and by adding the sequence number outputted from the sequence number holding unit 55 and for outputting the assembled packet to the adjacent node.

The packet delay time is obtained by dividing the packet waiting capacity at the output link by the capacity of the corresponding output link, and the result of the division is input to state notifying packet assembly unit 56 and is also input to the network state and requirement information holding unit 32 shown in FIG. 7 as the delay time for the output link of the self-node. Similarly, the packet loss ratio is obtained by dividing the packet loss capacity at respective links by the input packet capacity and the result of the division is input to the state notifying packet assembly unit 56 and the network state and the requirement information holding unit 32.

Figure 14:
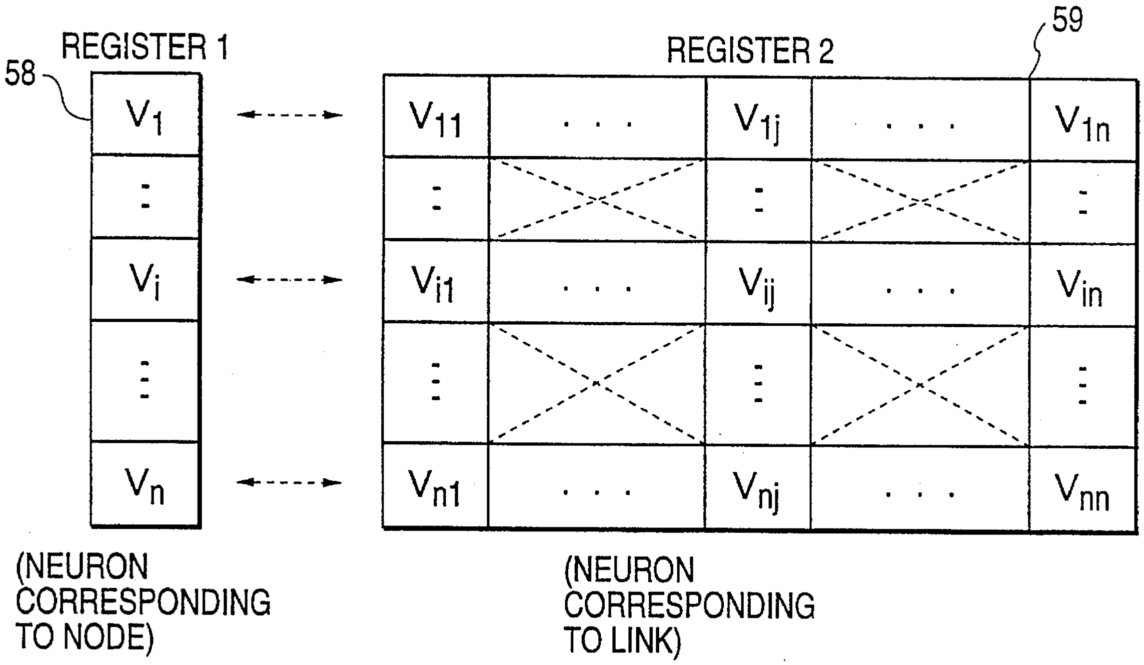
FIG. 14 is a structural diagram of an embodiment of the optimum path representing unit.

FIG. 14 is a structural diagram of an embodiment of the optimum path representing unit 34 shown in FIG. 7. In FIG. 14, the optimum path representing unit comprises a first register (Reg 1) 58 storing the output of the neurons corresponding one-to-one to the nodes in the neural network 31, and the second register (Reg 2) 59 for storing the output of the neurons corresponding one-to-one to the links. In FIG. 14, an arrow shown by the dashed line represents the correspondence between the node and the output link from the node.

Figure 15:
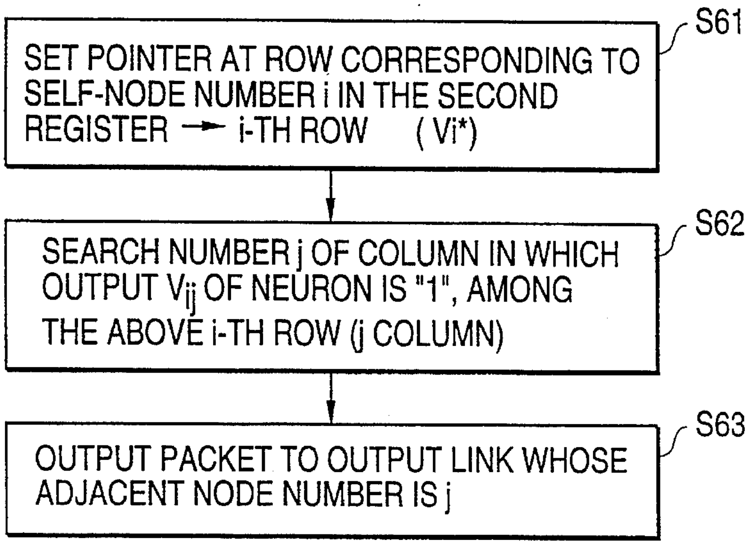
FIG. 15 is a flowchart of an embodiment of the packet output direction determining processes.

FIG. 15 is a flowchart of an embodiment of the packet output direction determining processing performed by packet output direction determining unit 35 shown in FIG. 7. In FIG. 15, step S61 sets a pointer at a row corresponding to the number i in the self-node in the second register 59 shown in FIG. 14 and step S62 searches the number j of the column in which the output $V_{ij}$ of the neuron is "1" out of the outputs $V_{ij}$ of the neuron corresponding one-to-one to the output link in the row pointed out by step S62, and the step S63 outputs the packet to the output link whose adjacent node number is j.

Next, a second embodiment of the invention will be explained. As described above, the second embodiment is applied to a multimedia integrated network using the datagram method. In order to avoid the ping-pong phenomena in which the packet is repeatedly transmitted and received between two nodes, and the loop phenomena in which the packet is repeatedly transmitted on the same path, the number of the node through which the packet passes is added to the header of the packet and the output of the neuron corresponding to the node number on a one-to-one basis is fixed to "0" thereby excluding the path going through the node through which the packet has passed and thereby decreasing a calculation time for the neural network. The recording of the node numbers through which the packet has passed may be limited to 5, or the recording may be limited to the adjacent node outputting the packet to the self-node, or is limited to the source node of the packet.

The second embodiment of the invention is almost similar to the first embodiment of the first invention in respect to the configuration of the node shown in FIG. 7 and the portion different from the first invention will be explained.

FIGS. 16A–16C are formats for the header information within the data packet according to the invention. In FIG. 16A, the head (next to the identifier) of the header stores the numbers (with a maximum of 5) of the nodes through which the packet passes and thereafter the other header information, such as the source/destination node number shown in FIG. 10.

In FIG. 16B, the header maintains only the number of the node whose number is equivalent to that of the adjacent node. The number is hereafter called an adjacent number. The other header information is stored following the adjacent node number.

In FIG. 16C, the head of the header holds only the source node number of the packet and the remaining header stores the other header information.

Figure 17:
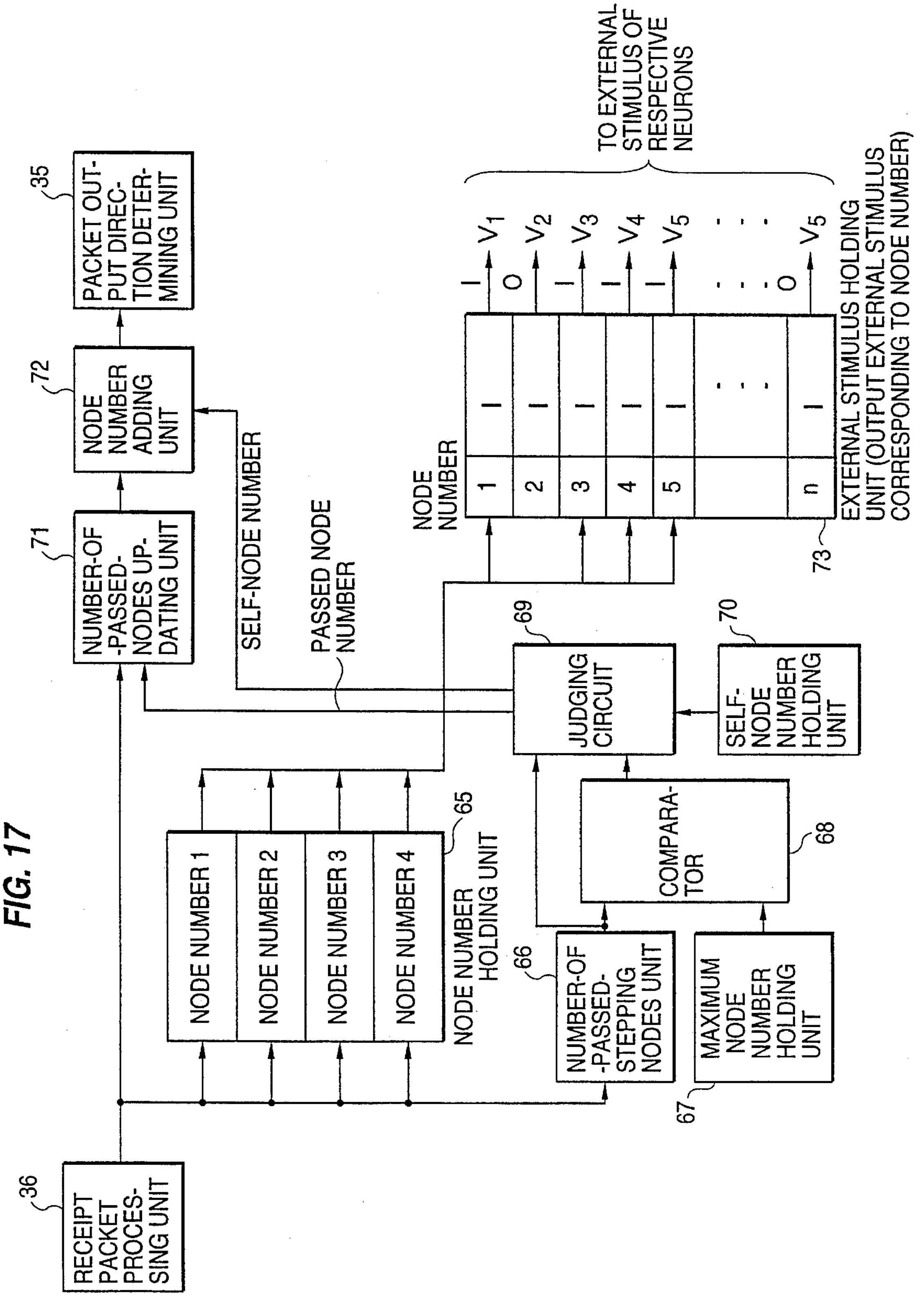
FIG. 17 is a block diagram of a structure of a first embodiment of the node number detection and neuron output fixing unit according to the invention.

FIG. 17 is a block diagram of the structure of the first embodiment of the node number detecting and neuron output fixing unit according to the invention. The components of the node number detecting and neuron output fixing unit shown in FIG. 17 is provided between receiving packet processing unit 36 and packet output direction determining unit 35 in the node shown in FIG. 7.

In FIG. 17, the node number detecting and neuron output fixing unit comprises node number holding unit 65 for holding the node number(s) of the passed node(s) maintained in the received packet, the passed node number setting unit 66 for adding "1" to the number of passed nodes maintained in the packet, the maximum node number holding unit 67 for holding the maximum number of nodes, for example, "5" in this embodiment, in the packet, comparator for comparing the content of the passed node number setting unit 66 and the maximum node number holding unit 67, deciding circuit 69 for deciding the output result of the comparator 68, a self-node number holding unit 70 for outputting the self-node number to the deciding circuit 69, a passed node number updating unit 71 for updating the passed node number stored in the packet based on the output of the deciding circuit 69, a node number adding unit 72 for adding the number of the self-node to the packet based on the output from the deciding circuit 69, and an external stimulus holding unit 73 for inputting the external stimulus for making the output of the neuron(s) corresponding to passed node number(s) "0" based on the output of the node number holding unit 65.

The external stimulus output to the neuron corresponding to the respective node on a one-to-one basis from external stimulus holding unit 73 is made "0" as for the node through which the packet does not pass. The external stimulus is made to be the negative number "1" whose absolute value is large and which makes the output of the neuron corresponding to the node through which the packet passes, to be "0", as for the node through which the packet has passed.

In FIG. 17, the comparator 68 calculates the difference between the result of the addition of the number of passed nodes and "1", and the maximum node number such as "5" in this embodiment and when the difference is positive, not including "0", "1" is output to the deciding circuit 69 and when the difference is negative or "0", "0" is output to the deciding circuit 69.

When the output from comparator 68 is "1", the number of passed nodes held in the packet is the maximum value, such as "5" in this embodiment, and it is not necessary to update the number of the passed nodes. Therefore, the deciding circuit 69 does not output the result of the addition of the number of the passed nodes input from the number-of-passed-nodes stepping unit 66 and "1" to the number-of-passed-nodes updating unit 71, and the self-node number from self-node number holding unit 70 is output to the node number adding unit 72, thereby performing the addition or insertion of the self-node number.

In this case, the number-of-passed-nodes updating unit 71 shifts five node numbers shown in FIG. 16A to the left one-by-one and provides an empty region on the right most side. Node number adding unit 72 sets the self-node number in the empty region and the packet is input to packet output direction determining unit 35.

On the other hand, when the output from comparator 68 is "0", the region storing the node number includes an empty region and the number of passed nodes plus "1" is output from the deciding circuit 69 to the number-of-passed-nodes updating unit 71 in order to update the number of passed nodes, thereby updating the number of passed nodes in the packet. The stored node number is not shifted and the packet is output to the node number adding unit 72, thereby adding the self-node number at a position for the value of the number of updated passed nodes.

Figure 18:
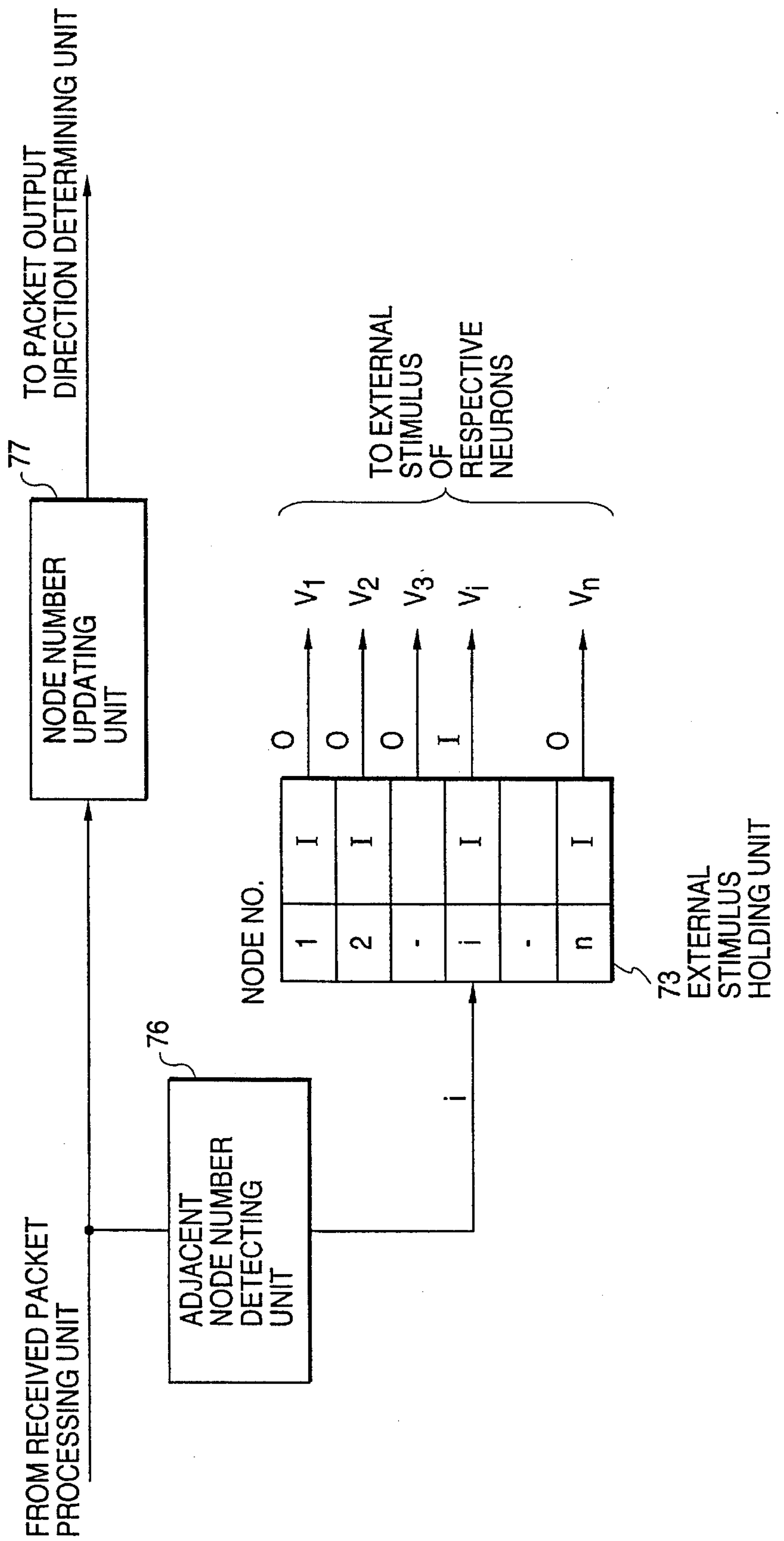
FIG. 18 is a block diagram of a structure of the second embodiment of the node number detection and neuron output fixing unit.

FIG. 18 is a block diagram of a structure of the second embodiment of the node number detecting and neuron output fixing unit. In FIG. 18, as is similar to the first embodiment shown in FIG. 17, the second embodiment comprises an external stimulus holding unit 73 for outputting the external stimuli to the neurons which correspond to the nodes on a one-to-one basis, adjacent node number detecting unit 76 for detecting the adjacent node number held in the input packet from the received packet processing unit 36 and the node number updating unit 77 for updating the passed node number stored in the packet.

The adjacent node number detecting unit 76 detects the adjacent node number of the adjacent node outputting the packet to the self-node and in accordance with the result of the detection by adjacent node number detecting unit 76, the negative value "1" with a large absolute value is output to the neuron corresponding to the adjacent node, thereby fixing the output of the neuron to be "0".

After the node number updating unit 77 stores the self-node number in the input packet as the adjacent node number, the packet is input to the adjacent node through the packet output direction determining unit 35.

Figure 19:
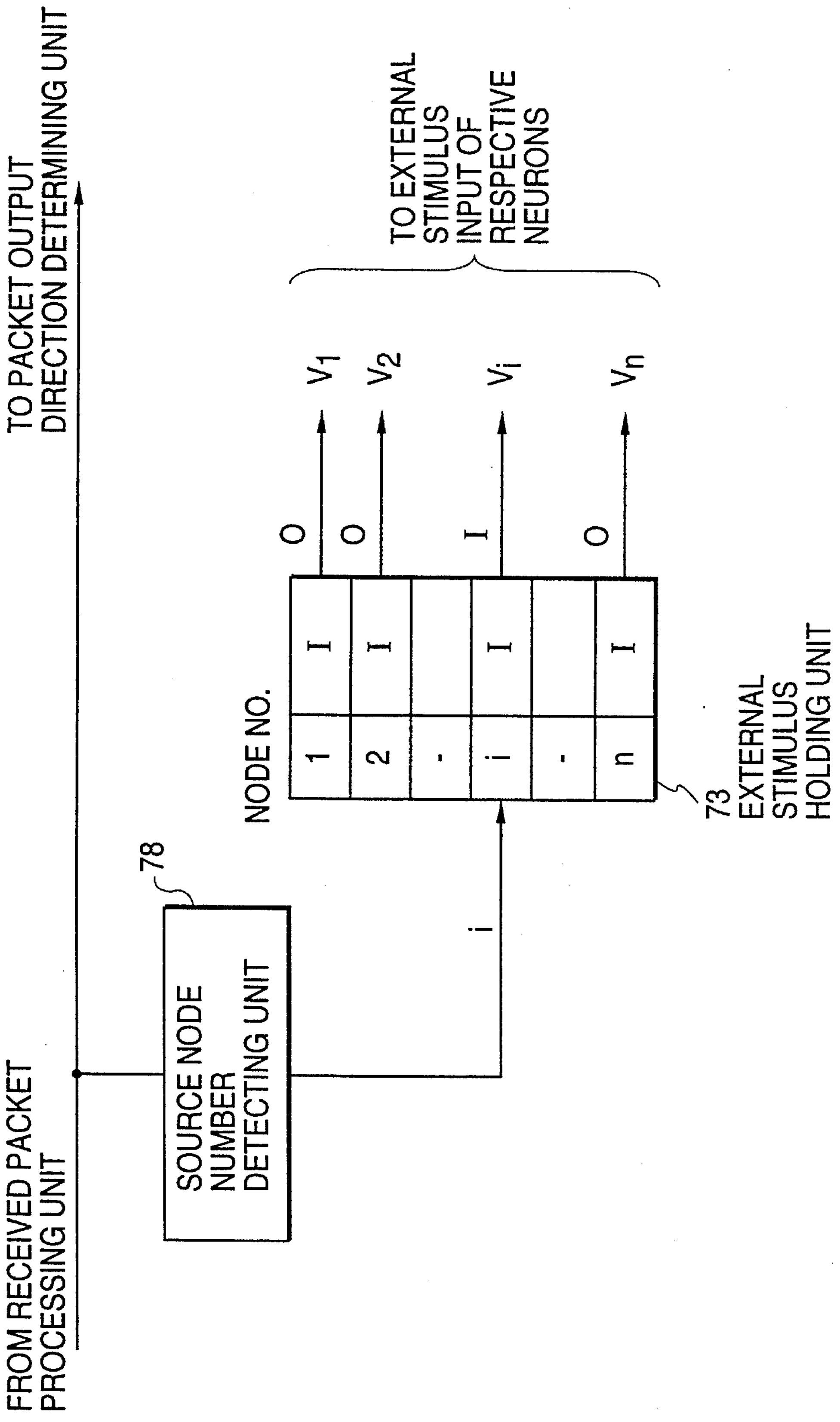
FIG. 19 is a block diagram of the third embodiment of the node number detection and neuron output fixing unit.

FIG. 19 is a block diagram of a structure of the third embodiment of the node number detecting and neuron output fixing unit. FIG. 19 shows an embodiment where only the source node number is held in the packet, as shown in FIG. 16C. In FIG. 19, the source node number detecting unit 78 detects the source node number from the input packet outputted from the received packet processing unit and external stimulus holding unit 73 outputs the external stimulus I fixing the output of the neuron to be 0 to the neuron which corresponds to the detected node.

Next, the third embodiment of the invention shown in principle in FIG. 4C, is explained. When the output direction of the packet is determined in the routing node, the third embodiment uses a method of decreasing the value of state information notified by another node in accordance with the distance from the other node to the self-node in order to obtain an optimum path without being affected by the state of the other node.

The third embodiment is similar to the first embodiment of the invention which was explained by referring to FIGS. 7 to 15, including the structure of the node. Only the part which is different from the embodiment of the first invention is explained.

Figure 20:
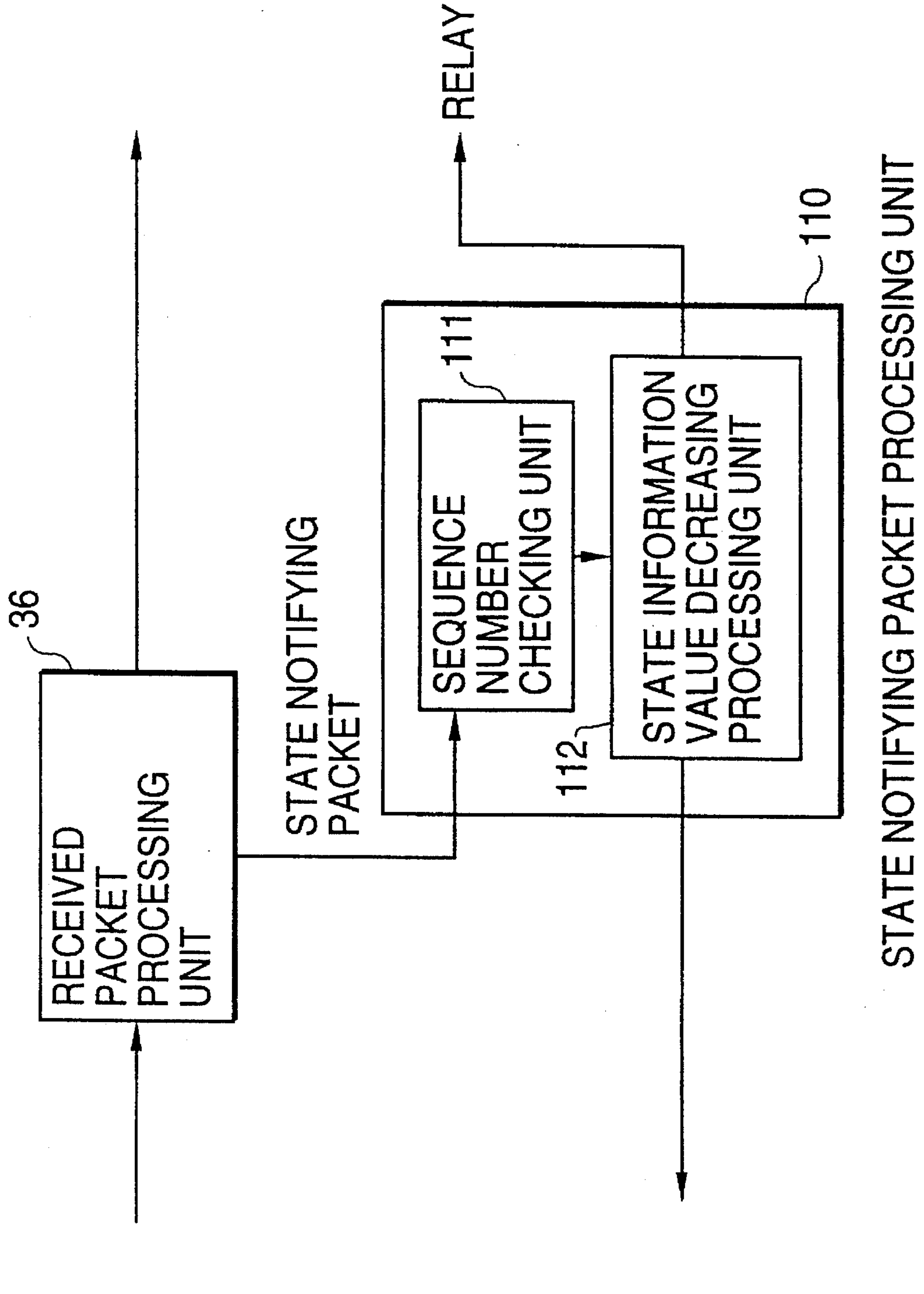
FIG. 20 is a block diagram of a second embodiment of the state notifying packet processing unit according to the invention.

FIG. 20 shows a block diagram of a structure of a state notifying packet processing unit in the third embodiment, namely, block 37 in FIG. 7. In FIG. 20, the state notifying packet processing unit 110 is provided with a sequence number checking unit 111 for checking the sequence number that was added to the received packet based on the received packet output from the received packet processing unit 36 in FIG. 7 and a state information value decreasing processing unit 112 for decreasing the value of the state information of the other node stored in the received state notifying packet in accordance with the distance from the self-node to the other node.

Figure 21:
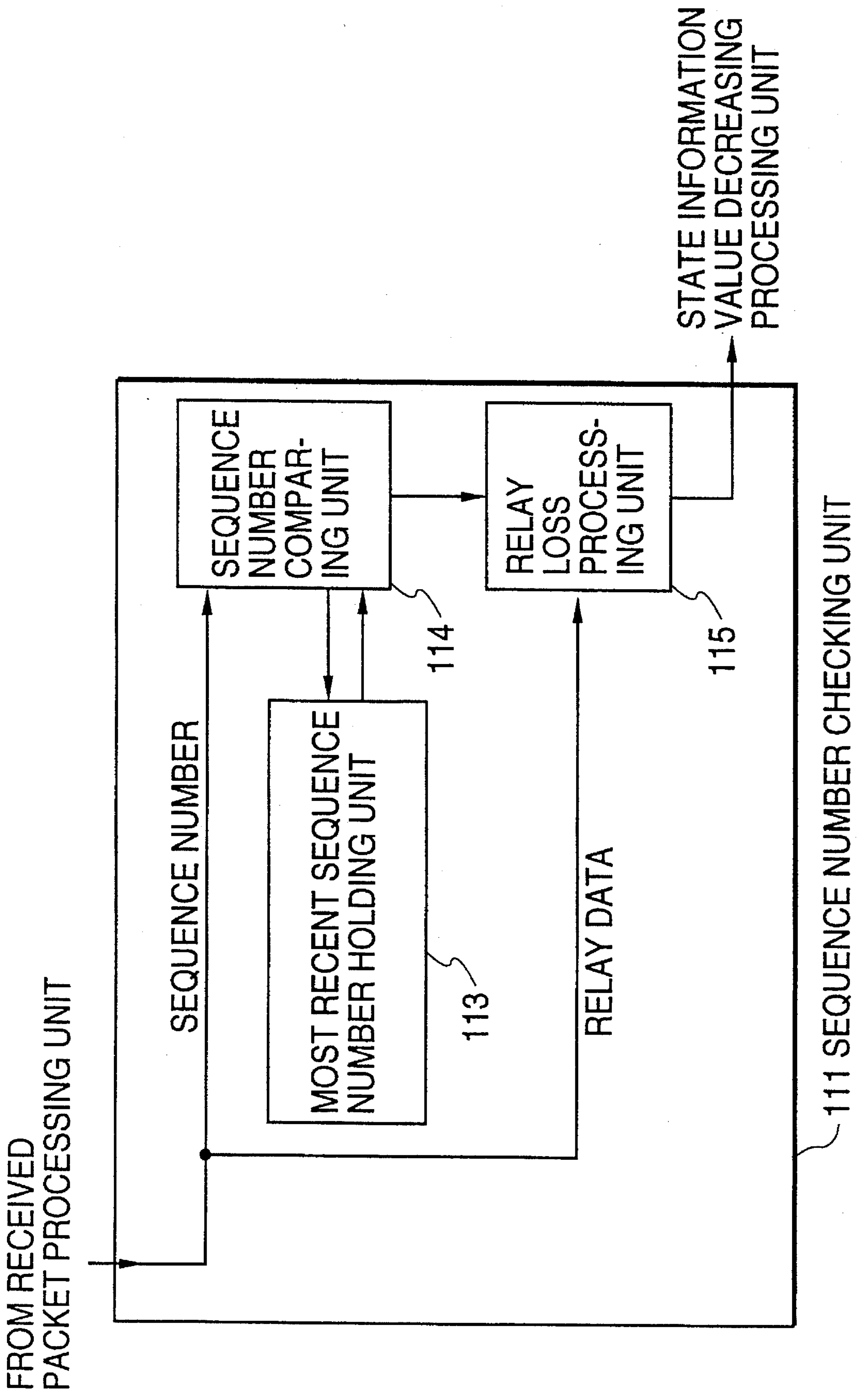
FIG. 21 is a block diagram of a structure of the sequence number checking unit.

FIG. 21 is a block diagram of a structure of the sequence number checking unit 111. In FIG. 21, the sequence number checking unit comprises the most recent sequence number holding unit 113 for holding the number of the packet which is most recently received, sequence number comparing unit 114 for comparing the sequence number of the packet input from the received packet processing unit with the number held in the most recent sequence number holding unit 113, a relay loss processing unit 115 for discarding the received packet when the sequence number of the received packet is less than the most recently received sequence number held in the holding unit 113 and for relaying the received packet to the state information value decreasing processing unit 112 when the sequence number of the received packet is larger than the most recently received sequence number, as a result of the comparison in the sequence number comparing unit 114.

Figure 22:
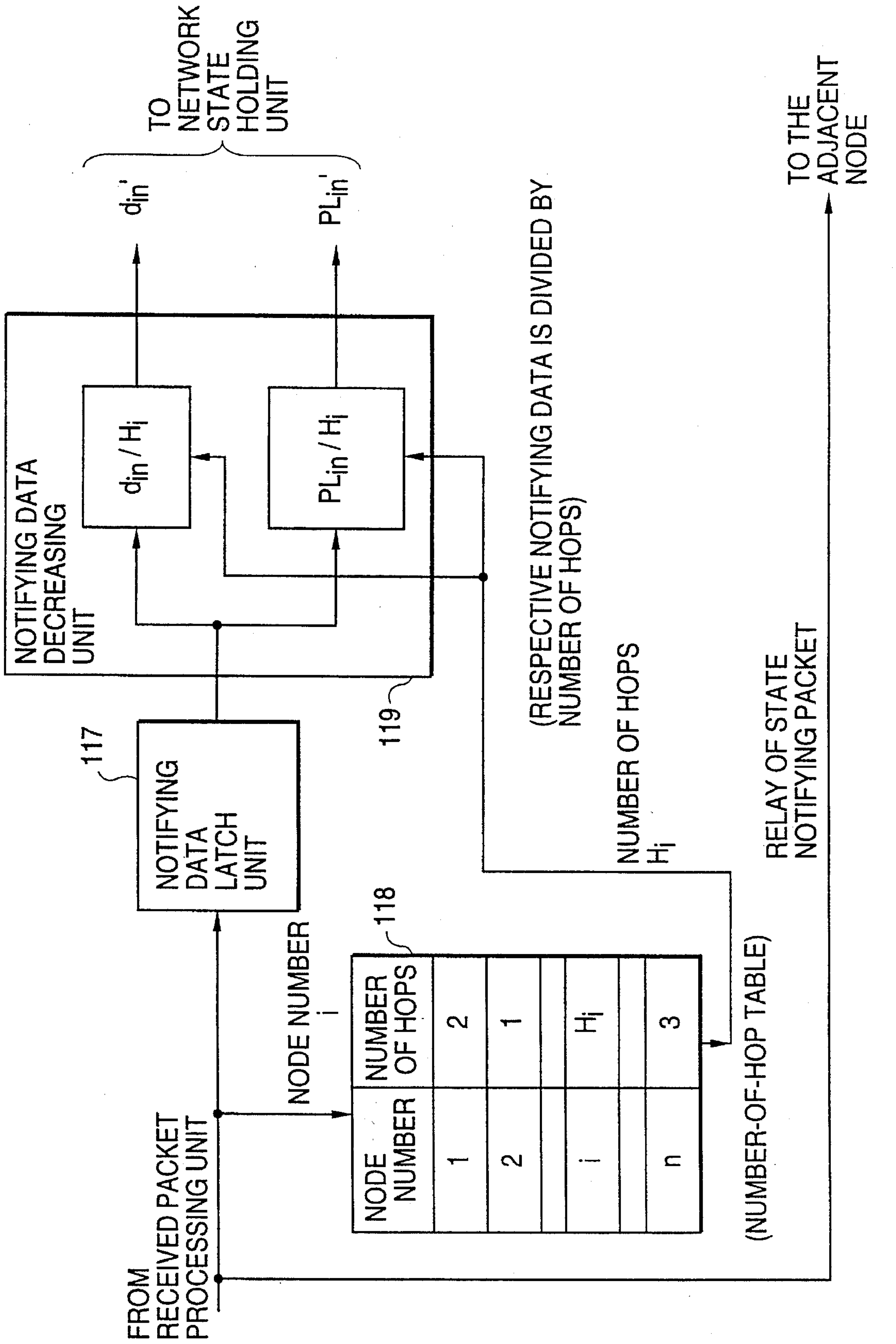
FIG. 22 is a block diagram designating a structure of the state information value decrease processing unit.

FIG. 22 is a block diagram of a structure of the state information value decreasing processing unit using in the third embodiment. In FIG. 22, the state information value decreasing processing unit 112 comprises a notifying data latch unit 117 for latching the notifying data based on the state notifying packet transmitted from the sequence number checking unit 111, a number-of-hop table 118 for holding the number of hops from the self-node to the other node in the network and notifying data decreasing unit 119 for decreasing the notifying data latched in the notifying data latch unit 117.

In FIG. 22, when the state notifying packet is received from the received packet processing unit through the sequence number checking unit 111, the packet is relayed to the adjacent node and the node number having transmitted the packet is obtained from the packet. The number of hops from the self-node to the particular node is detected from the number-of-hop table and the state information stored in the packet, i.e., the notifying data is latched in notifying data latch unit 117.

The notifying data latched in the notifying data latch unit 117, such as the packet delay time d in respective output links in the packet transmitting node and the packet loss ratio PL, is divided by the number-of-hop Hi stored in the number-of-hope table 118 by using the notifying data decreasing unit 119. The result of the division is output to the network state holding unit within the node, namely, block 32 of FIG. 7.

The fourth embodiment of the invention shown in principle in FIG. 4D is explained next. In a manner similar to the third embodiment, the value of the state information from the other node is decreased in accordance with the distance up to the node and simultaneously the notifying range in which the packet is to be notified is held in the state notifying packet in the fourth embodiment. The value of the notifying range is decreased in accordance with the distance, thereby stopping the relay of the state notifying packet when the notifying range becomes "0". As in the fourth invention, only the part which is different from the first and the third embodiments will be explained.

FIG. 23 is a packet format of a third embodiment of the state notifying packet according to the fourth embodiment of the invention. The format shown in FIG. 23 is different from FIG. 11 relating to the first embodiment only in that the number-of-hop H designating the notifying range is stored next to and following the sequence number.

Figure 24:
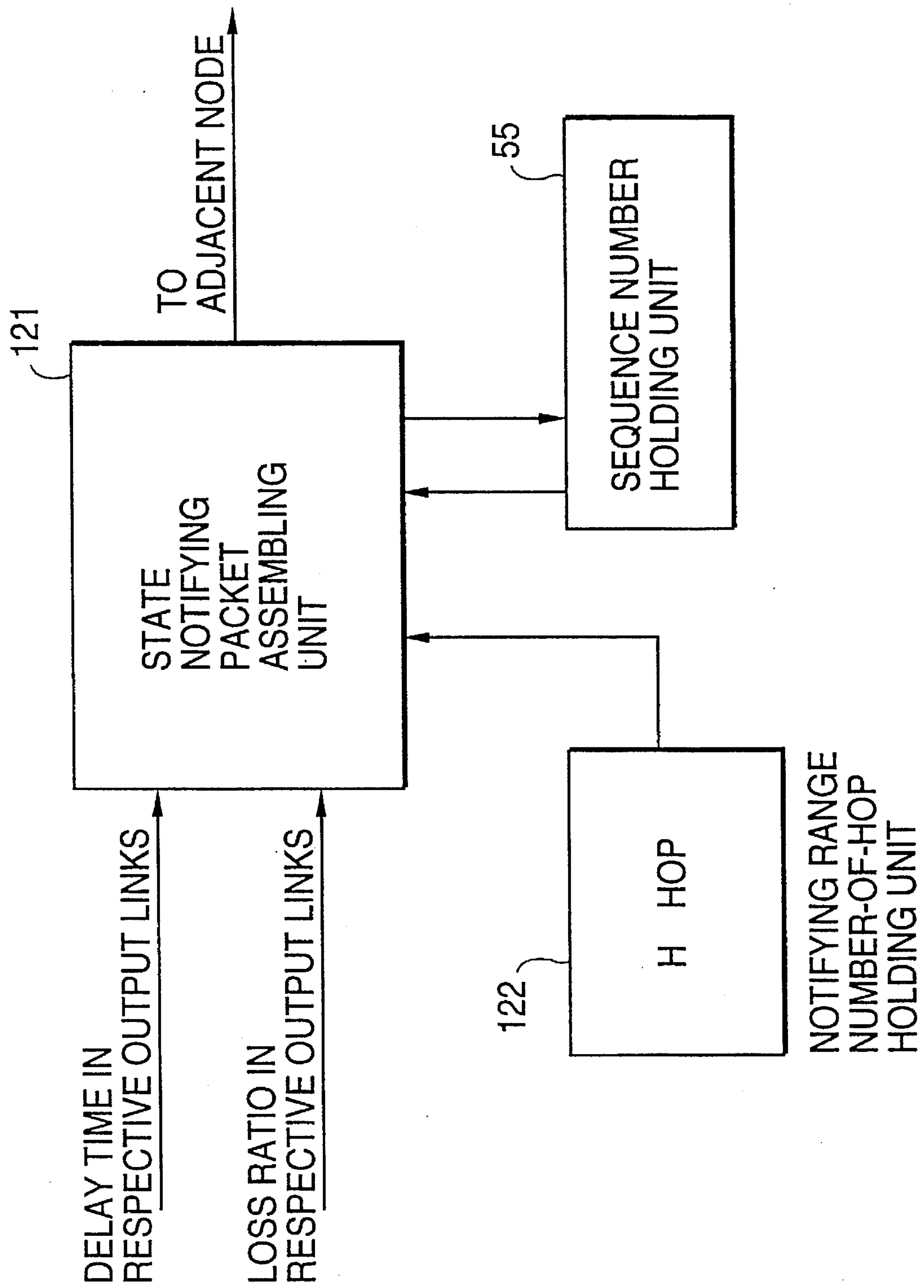
FIG. 24 is a block diagram of a structure of an embodiment of the state notifying packet assembling unit according to the invention.

FIG. 24 is a block diagram of a structure of the state information creation/notifying packet creation unit 38 (FIG. 7) for notifying the state information to other nodes, corresponding to the state notifying packet assembling unit 56 in FIG. 13. In FIG. 24, the state notifying packet assembling unit 121 is connected to the sequence number holding unit 55 as in FIG. 13, and is also connected to the notifying-range number-of-hop holding unit 122. The state notifying packet assembling unit 121 uses the delay time in respective output links and the packet loss ratio, which are input therein, and forms the state notifying packet storing the value H of the notifying range held in the notifying-range number-of-hop holding unit, thereby outputting the packet to the adjacent node.

Figure 25:
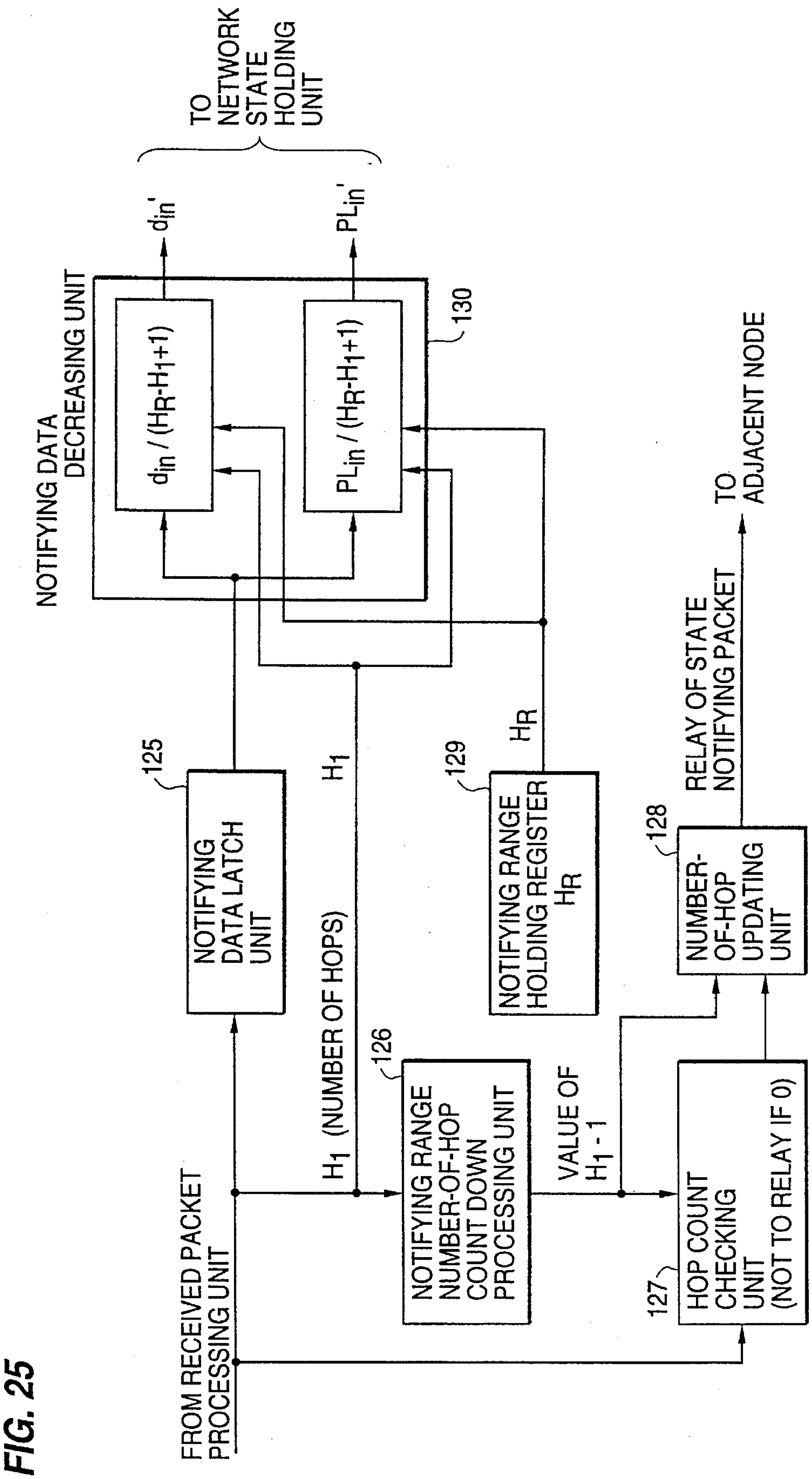
FIG. 25 is a block diagram of a detailed structure of the state information decrease processing unit.

FIG. 25 shows a block diagram of a detailed structure of the state information decreasing processing unit according to the fourth invention. The state information decreasing processing unit is provided to the state notifying packet processing unit as in FIG. 20.

In FIG. 25, the state information value decreasing processing unit comprises a notifying data latch unit 125 for latching the notifying data transmitted from the other node based on the received packet input from the received packet processing unit through the sequence number checking unit, a notifying-range number-of-hop count down processing unit 126 for decreasing the number of hops $H_1$ and for decreasing the scope of the notification stored in the received state notifying packet by 1; a hop count checking unit 127 for checking the output of the notifying-range number-of-hop count down processing unit 126, a number-of-hop updating unit 128 which updates the number of hops in the state notifying packet input through the hop count checking unit 127 if the count down value $H_1-1$ for the notifying range is not 0 as the result of the check by the hop count checking unit 127, and then outputting the state notifying packet to the other node, the notifying range holding register 129 for holding the value $H_R$ of the notifying range of the state notifying packet in the network which is fixed to a constant value by the state of the network for a predetermined time period, and notifying data decreasing unit 130 for decreasing the value of the state information latched in the notifying data latch unit 125.

Notifying data decreasing unit 130 divides the state information of the other node latched in the notifying data latch unit 125, namely, the packet delay time d and packet loss ratio PL by the following value.

$$H_R-H_1+1$$

The result is then output to the network state and requirement condition holding unit. In the above value, $H_R$ designates the number of hops representing the notifying range held in the notifying range holding register 129 and $H_1$ is the notifying-range number-of-hops stored in the received state notifying packet. Where the node notifying the state notifying packet in the network is limited only to the adjacent node, $H_R$ held in the notifying range holding register 129 becomes 1. In the state notifying packet transmitting node, the packet is output with the notifying-range number-set to-hops of 1 which is stored in the packet and thus the number of hops $H_1$ stored in the received packet is 1. As a result notifying data decreasing unit 130 outputs the value of the state information received from the adjacent node to the network state and requirement condition holding unit as it is. This is the same as in FIG. 22 relating to the third embodiment in that the notifying data decreasing unit 119 divides the notifying data from the adjacent node by the number of hops "1" up to the adjacent node, namely, it outputs the value of the state information from the other node without being changed. For example, "5" is held in the notifying range holding register as the value of $H_R$. Where the node for transmitting the state notifying packet transmits the packet by determining the notifying-range number-of-hops H a s "5", in the second node from the transmitting node the value $H_1$ detected from the received packet becomes "4" and, as a result, the value of the received state information is divided by 2 and is used for routing the packet.

Next, the fifth embodiment of the invention shown in principle in FIG. 4E, is explained. As in the fourth embodiment, the present invention designates the notifying range of the state information in the state information notifying packet and transmits the packet. The node receiving the packet decreases the value of notifying range and relays the packet to the adjacent node but does not decrease the value of the state information. A plurality of notifying ranges are provided and the frequency of the notification in the packet changes in accordance with the plurality of notifying ranges. Therefore, the average state value obtained for a long period of time is notified to the node apart from the self-node and the instantaneous state value changing at real time is notified to the near node, thereby preventing an increase in the traffic caused by the state notification, and thereby performing an adaptive routing of the packet suitable for the network state.

Figure 26:
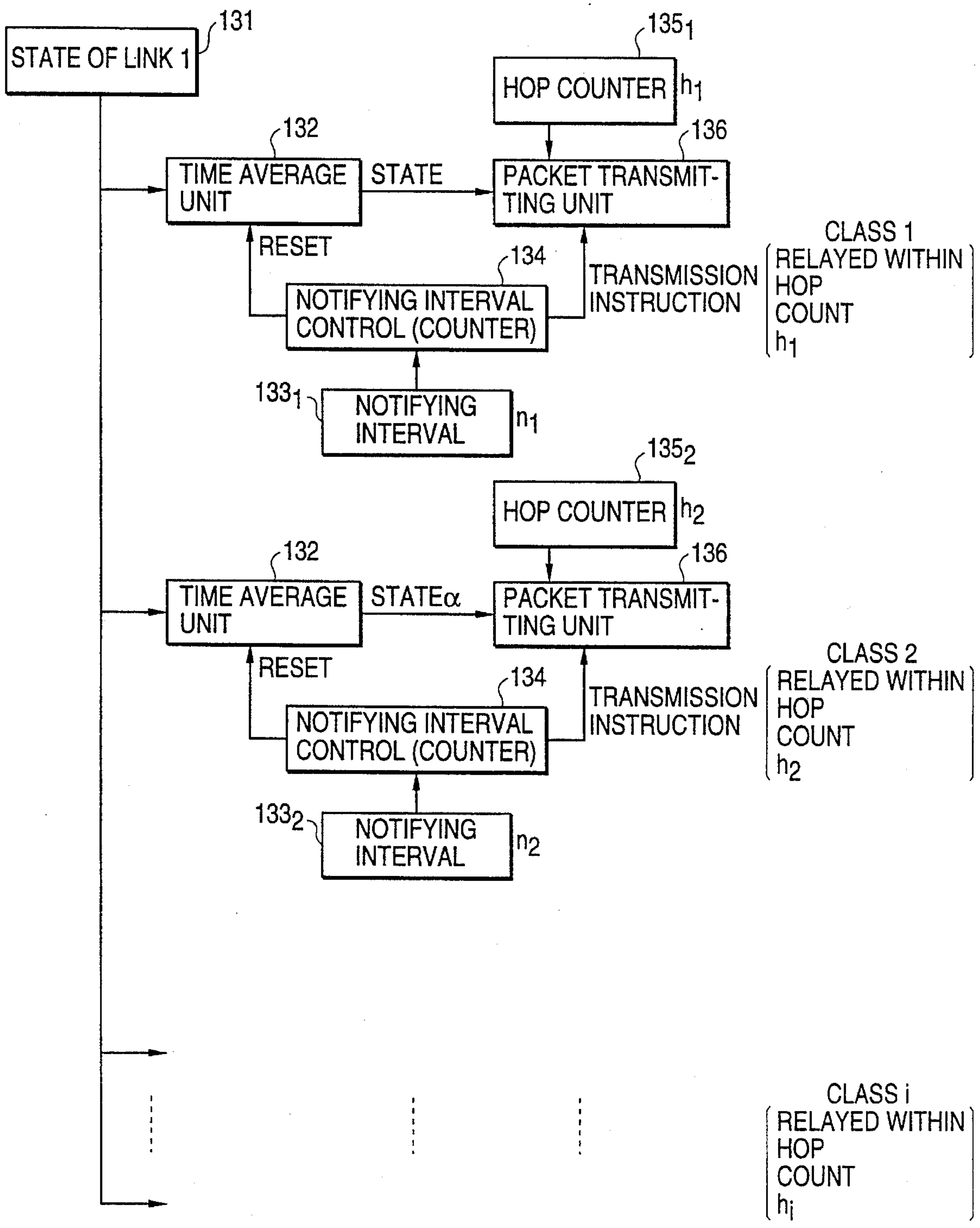
FIG. 26 is an explanatory view of a concept of the fifth embodiment.

FIG. 26 is an explanatory view designating a concept of the fifth embodiment. In the fifth embodiment, the values of the information designating the state of a particular link such as 1 is subjected to an average operation with regard to a plurality of time intervals. The average value whose time interval is short is notified to the node near the self-node and the average whose time interval is long is notified to the node apart from the self-node. The time interval of the state notification and the notifying range have several classifications in this embodiment. An average of the state of the links is obtained with regard to respective classes 1, 2 . . . and the time interval for notifying it and the notifying range are divided into a several stages.

In FIG. 26, with regard to respective classes 1, 2 . . . time average unit 132 is provided for the state 131 of the link l, and notifying interval control 134 is performed in accordance with the notifying intervals $\mathbf{133}_1$, $\mathbf{133}_2$ . . . When it passes the notifying time interval, the state value as an output from time average unit 132 is transmitted to the range designated by hop counters $\mathbf{135}_1$, and $\mathbf{135}_2$ by packet transmitting unit 136 in accordance with the transmission instruction.. The hop counts $h_1$, $h_2$ . . . $h_i$ for the classes 1, 2 . . . i designate the range of the relay of the packet and the state information stored in the packet is not always used in all the relay nodes. This will be explained in more detail by referring to FIG. 27.

Figure 27:
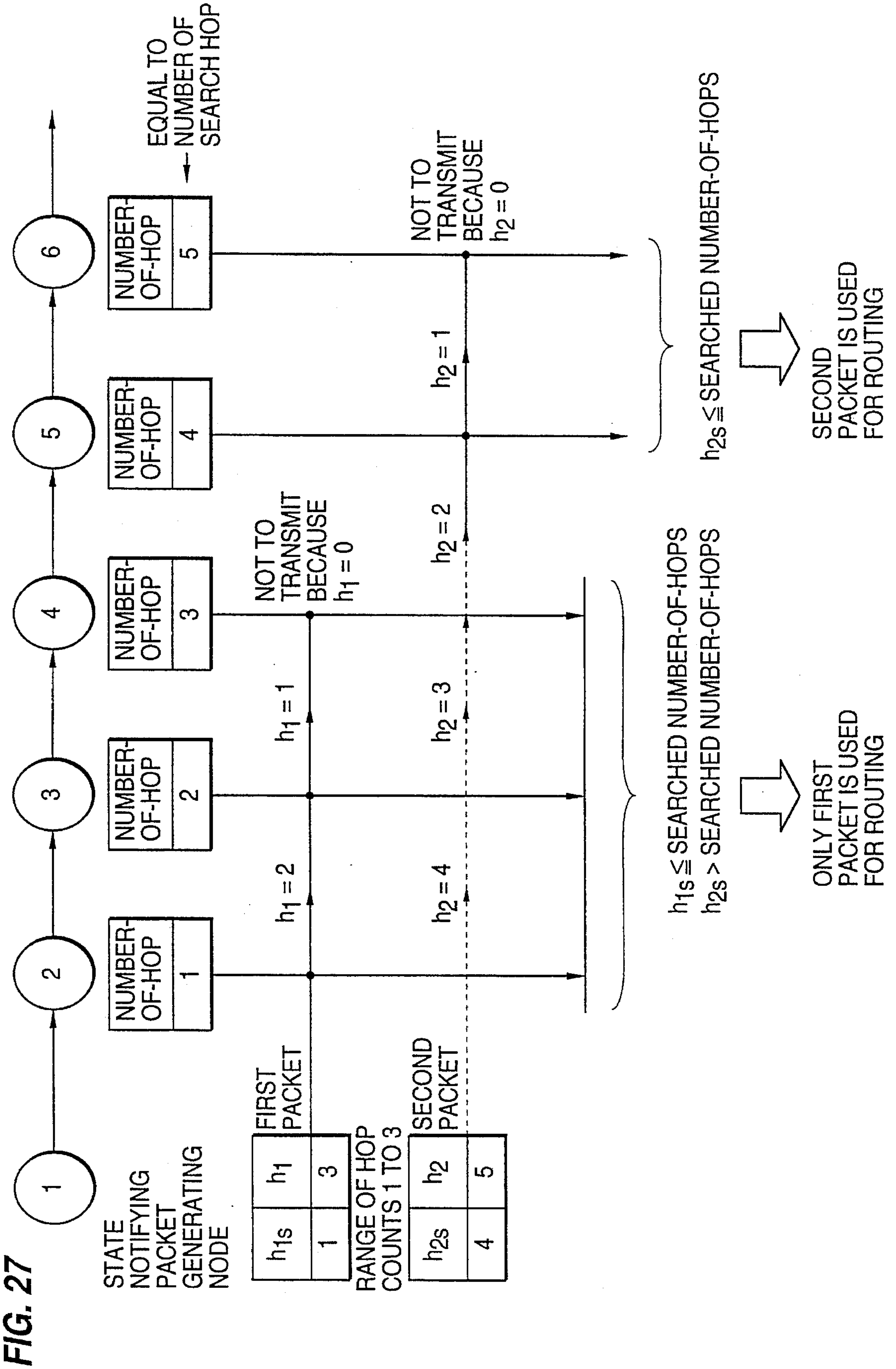
FIG. 27 is an explanatory view of the relay range of the state notifying packet and the use range during the period of the routing.

FIG. 27 is an explanatory view of the relay range of the state notifying packet and the use range for the routing according to the fifth embodiment. As is described later, the state notifying packet stores the number of hops $h_{1s}$, $h_{2s}$ . . . from the node in which the state information stored in the packet is used during the routing in addition to the relay range $h_1$, $h_2$ . . . of the packet with regard to respective classes 1, 2 . . . In FIG. 27, the first packet in the state notifying packet stores 3 as the relay range $h_1$ and 1 as the number of hops $h_{1s}$. The state notifying packet is relayed by decreasing the relay range $h_1$ by 1 every time the state notifying packet reaches the adjacent node. The state notifying packet is used for the routing in the adjacent node 2, the second node 3, and the third node 4 which are viewed from the packet creating node 1. In contrast, the second state notifying packet stores 5 as the relay range $h_2$ and 4 as the number of hops $h_{2s}$. The second notifying packet is relayed by decreasing the relay range $h_2$ by 1 from the packet creating node to node 6 whose number of hops is 5. As the number of hops $h_{2s}$ is 4, the second packet is only relayed from node 2 to node 4 and is not used for the routing. It is used for routing in nodes 5 and 6.

Figure 28:
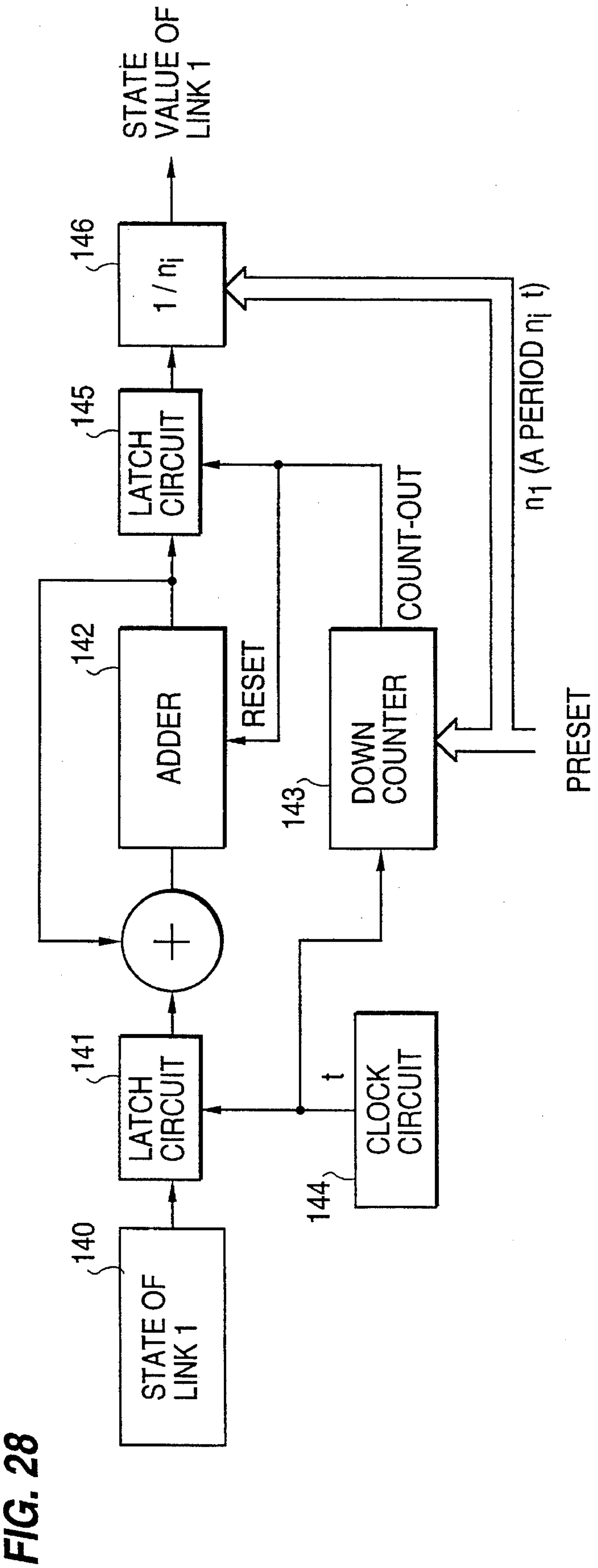
FIG. 28 is a block diagram of a structure of an embodiment of the state calculating circuit.

FIG. 28 shows a block diagram of a structure of an embodiment of a state calculating circuit for the link l in class i in which the time average of the state of the link l is obtained in FIG. 26. In FIG. 28, the state calculating circuit comprises a latch circuit 141 for latching state 140 of link l, an adder 142 for adding the output from the latch circuit 141 at every time period t, a down counter 143 for designating the completion of the addition period, a clock circuit 144 for supplying a clock with a time interval t to the latch circuit 141 and the down counter 143, a latch circuit 145 for latching the output of the adder 142 when the down counter 143 performs a count-out operation, and a dividing circuit 146 for dividing the output of the latch circuit 145 by the number $n_i$ of the notifying interval clocks. The number of clock $n_i$ corresponding to the interval of the notification of the time average and the state value is preset in down counter 143 and dividing circuit 146, thereby providing the notifying time interval as $n_i \times t$. The state calculating circuit is provided so that the number of the state calculating circuit becomes equal to (the number of output links from the self-node)×(the kinds of the values of the network state) with regard to respective classes. Namely, if the network state value comprises two kinds of value, namely, the packet delay time and the packet loss ratio in the respective output links from the self-node and if the number of the output links from the self-node is 3, six state calculating circuits are provided for respective classes.

Figure 29:
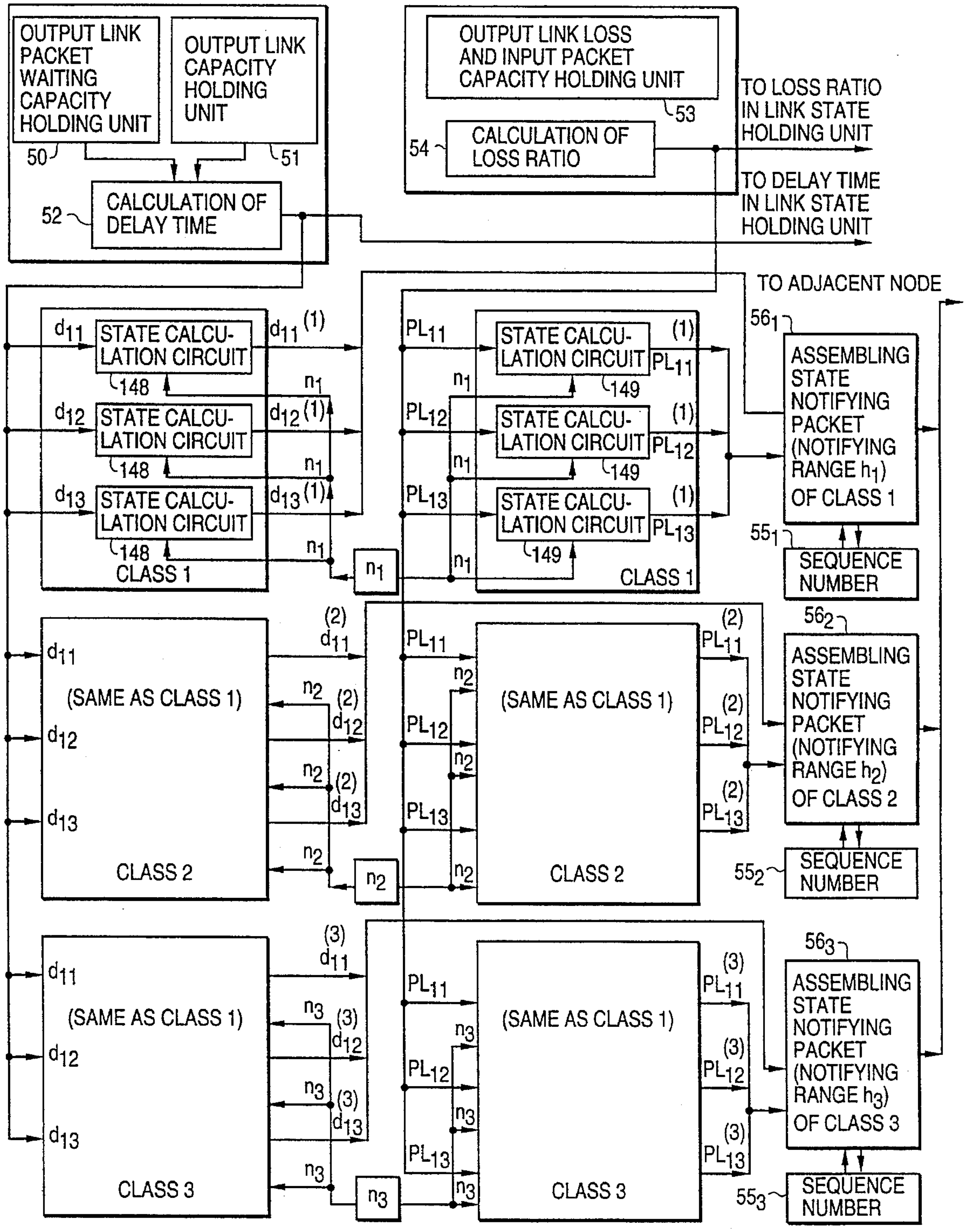
FIG. 29 is a block diagram of a detailed structure of the state information creation notifying packet creation unit according to the invention.

FIG. 29 is a block diagram of a detailed structure of the state information creation/notifying packet creation unit 38 shown in FIG. 7 for the fifth embodiment. FIG. 29 is different from FIG. 13 in that sequence number holding units $\mathbf{55}_1$, $\mathbf{55}_2$, $\mathbf{55}_3$ and state notifying packet assembling units $\mathbf{56}_1$, $\mathbf{56}_2$, and $\mathbf{56}_3$ are respectively provided for the classes, and that the state calculating circuit for calculating the state information of respective links are added. In FIG. 29, the number of output links from the self-node is 3, the case of classes 1 to 3 are designated, a further three state calculation circuit 148 for calculating the average value of the packet delay time d of respective links, and three state calculating circuits 149 for calculating the average value of the packet loss ratio PL are provided for respective classes.

Figure 30:
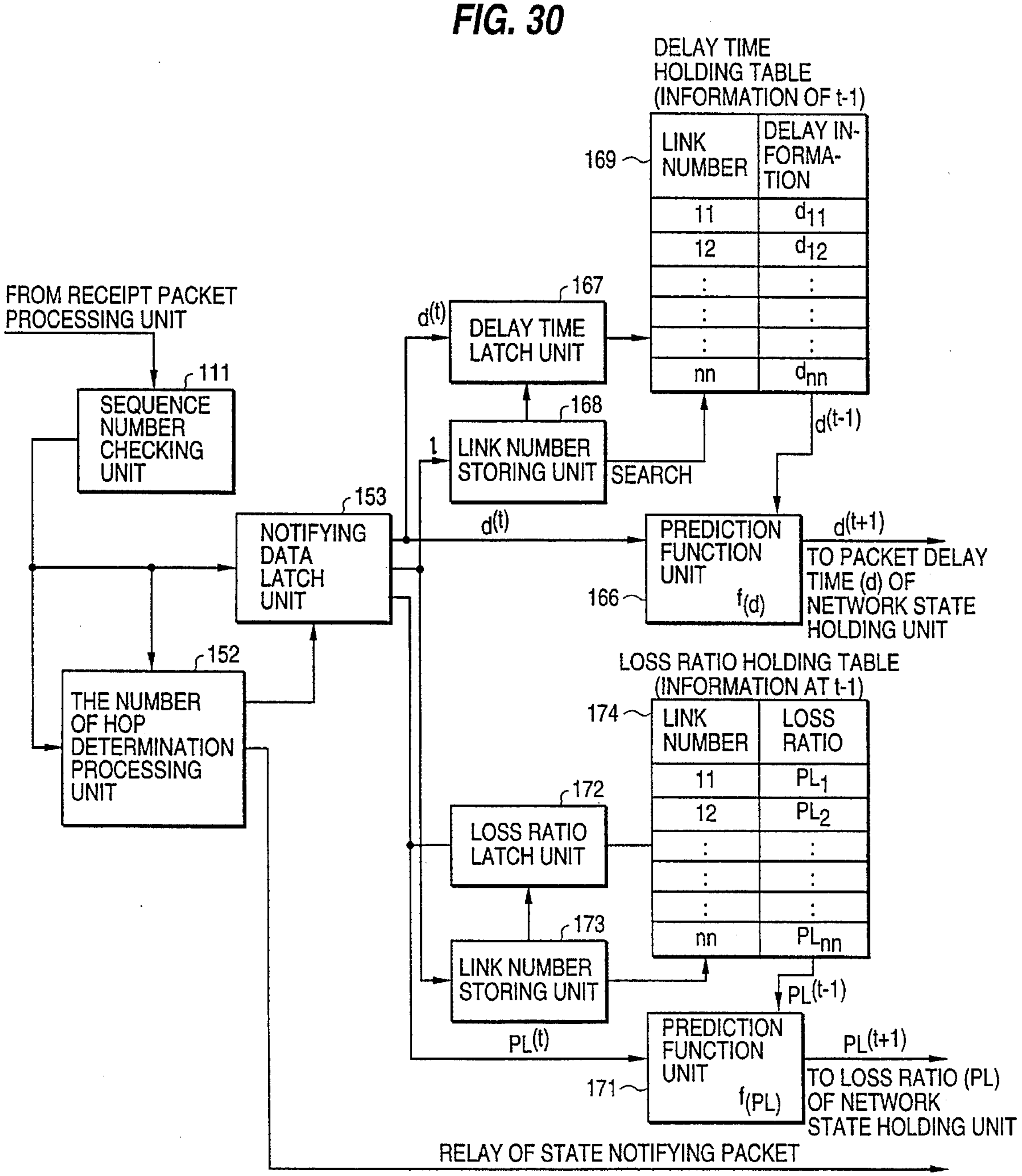
FIG. 30 is a block diagram of a detailed structure of the state notifying packet processing unit.

FIG. 30 is a block diagram of a detailed structure of the state notifying packet processing unit 37 in FIG. 7, according to the fifth embodiment of the invention. In FIG. 30, as in FIG. 20 relating to the third embodiment, the state notifying packet from the received packet processing unit is subjected to the packet processing after the sequence number checking unit 111 checks the sequence number. In processing the packet, first the number-of-hop judgment processing unit 152 performs the judgment processing, described later. When the state information stored in the received packet is used for the routing in the self-node, the state information is stored in the notifying data latch unit 153, and, when the notifying-range number-of-hops is not 0, the state notifying packet is relayed. Where the state information is not used for the routing in the self-node as a result of the judgment by the number-of-hop judgment processing unit 152, the state notifying packet is only relayed if necessary. The process following the output of notifying data latch unit 153 will be explained later.

Figure 31:
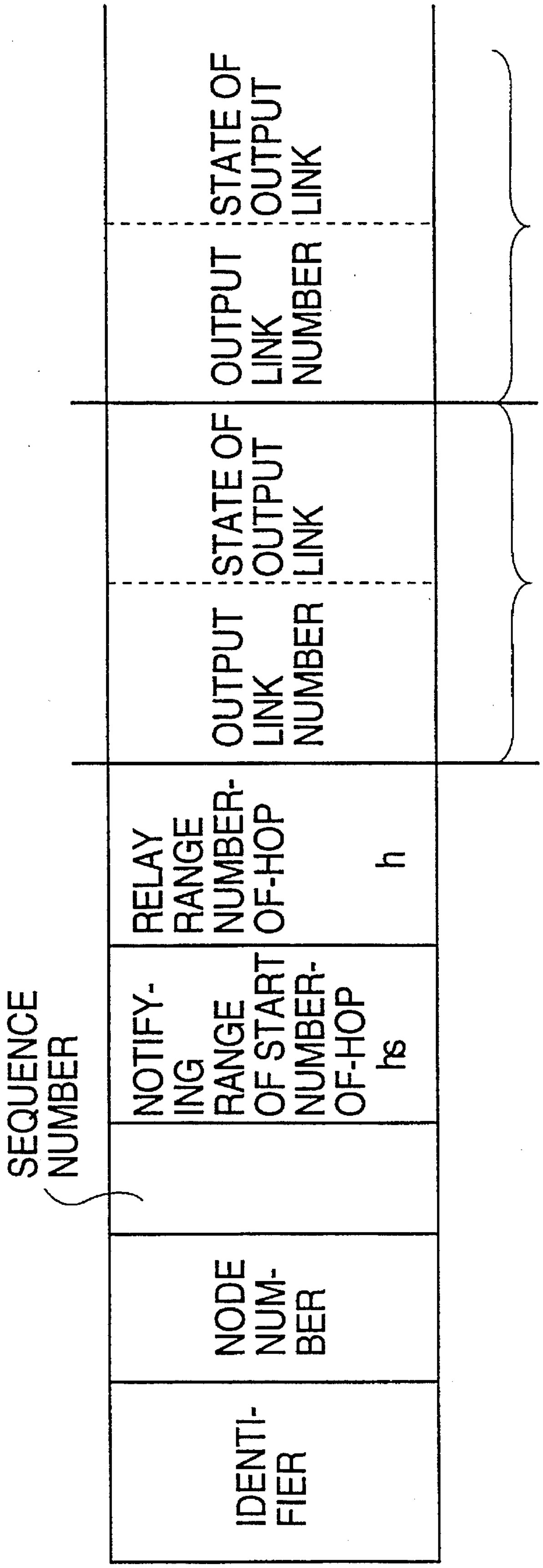
FIG. 31 is a packet format of a fourth embodiment of the state notifying packet according to the invention.

FIG. 31 is a packet format of a fourth embodiment of the state notifying packet which is used in the fifth embodiment. FIG. 31 is different from FIG. 23 relating to the fourth invention in that the number of hops $h_s$ from the node using the state information upon performing the routing is added to FIG. 23. This means no use of the state information from the packet creating node up to the number of $\text{hops}_{hs-1}$.

Figure 32:
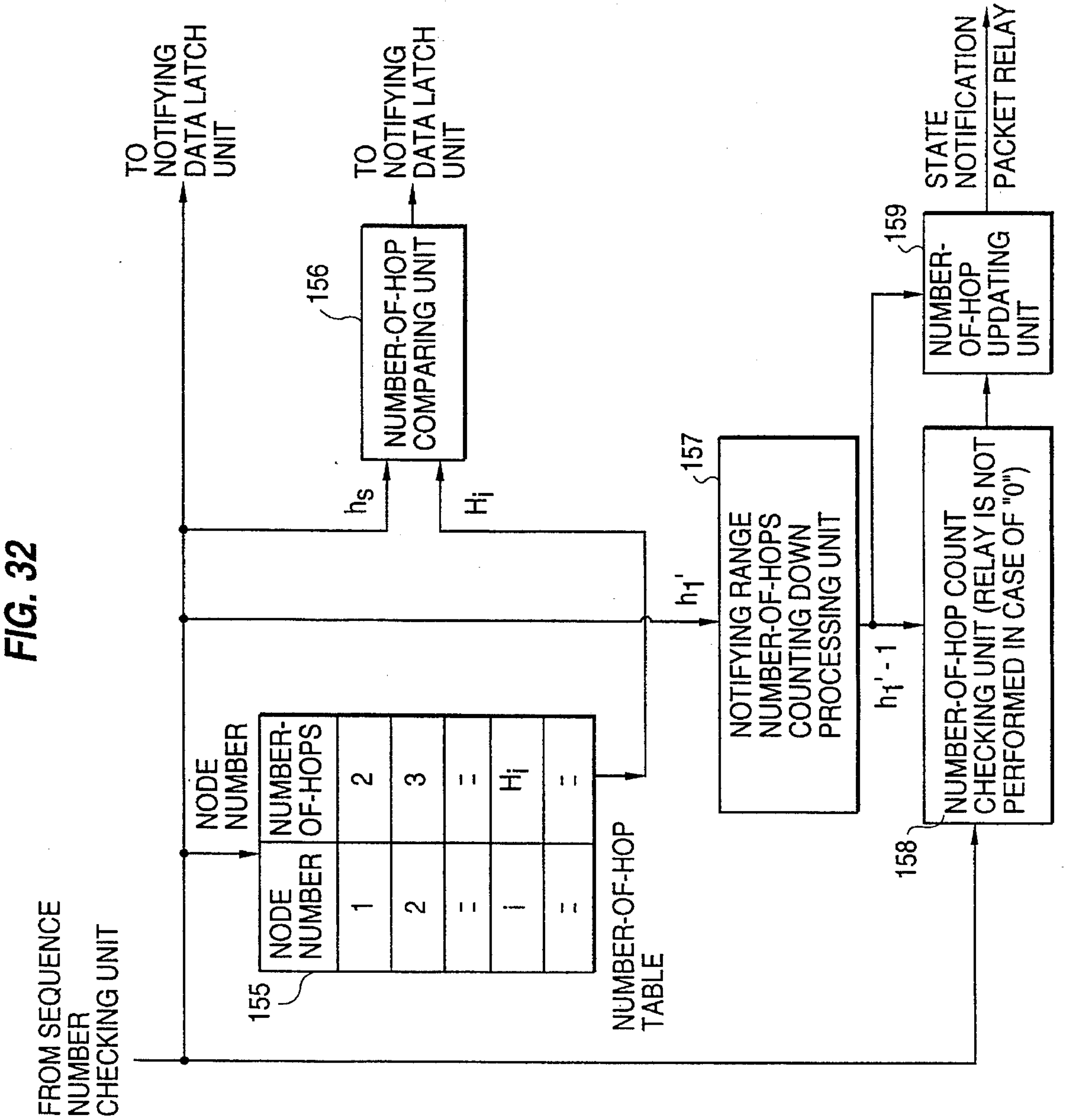
FIG. 32 is a block diagram of a detailed structure of the number-of-hop determination processing unit.

FIG. 32 is detailed block diagram of the number-of-hop judgment processing unit 152 in FIG. 30. In FIG. 32, the number-of-hop judgment processing unit comprises a number-of-hop table 155 for holding the number of hops from the self-node to the respective nodes in the network; a number-of-hop comparing unit 156 for comparing the number of hops $h_s$ from the self-node to the state information using node stored in the received packet with the searched number of hops $h_i$ searched from the number-of-hop table 155; a relay-range number-of-hop count down processing unit 157 for subtracting 1 from the relay range number-of-hop $h_1'$, for example, stored in the received packet; a number-of-hop count checking unit 158 for judging, based on the output of processing unit 157, whether the received state notifying packet is relayed or not; and number-of-hop updating unit 159 for updating the relay-range number-of-hops in the received data packet input through the checking unit 158 and for outputting the state notifying packet to the adjacent node, when the checking unit 158 judges that the state notifying packet should be relayed.

In FIG. 32, the number of hops $h_s$ from the packet creating node to the node in which the state information stored in the packet is used for routing is detected from the received state notifying packet; the number of hop comparing unit 156 compares the number of hops $h_s$ with the searched number of hops $H_i$ provided from the self-node to the packet creating node and stored in the number-of-hop table 155. When the value of the number of the hops $h_s$ stored in the received packet is less than the searched number of hops $H_i$ detected from the number-of-hop table 155, the notifying data latch unit 153 shown in FIG. 30 outputs the notifying data so that the state information stored in the packet is used for the routing. In contrast, when the number of hops $h_s$ is more than the searched number of hops $H_i$ detected from the number-of-hop table, the notifying data is kept held in the notifying data latch unit 153 without using the notifying data for the routing.

Figure 33:
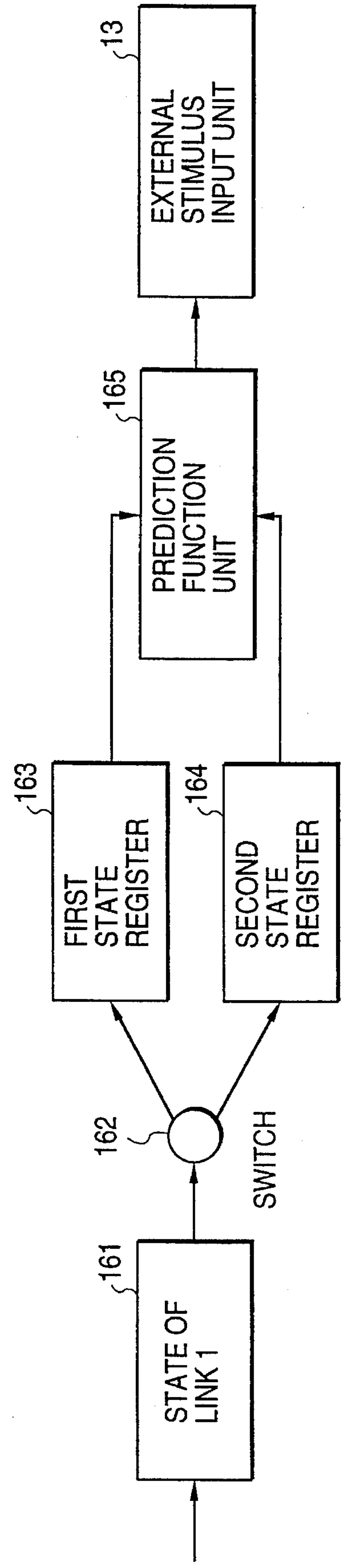
FIG. 33 is an explanatory view of a concept of state information prediction.

According to the fifth embodiment, where the distance from the self-node is large and the notifying interval of the state information is long, the state information is predicted so that the change of the state information value during the period of the notifying interval can be predicted. FIG. 33 is an explanatory view of a concept of the state information prediction. In FIG. 33, state 161 of link l is stored in the first state register 163 or the second state register 164 through the switch 162. When the state value at time t−1 is stored in the first state register 163 and the state value at t is stored in the second state register 164, the state value at t+1 is predicted by prediction function unit 65 by using these two state values at time t−1 and t. The state values are provided to-external stimulus input unit 13 and used for the routing of the packet. The prediction function to be used by prediction function unit 165 is as follows with an example of a linear prediction being performed:

$$F(t+1)=\frac{F(t)-F(t-1)}{t-(t-1)}\,[t-(t-1)]+F(t) \tag{9}$$

In FIG. 30, the packet delay time d in the state information output by notifying data latch unit 153 for use in the routing in the self-node is provided to the prediction function unit 166, the delay time latch unit 167, and the packet loss ratio PL. Such state information is input to prediction function unit 171 and loss ratio latch unit 172. Simultaneously, notifying data latch unit 153 provides the corresponding link number to link number storing units 168 and 173. The data latched in the delay time latch unit 167 and loss ratio latch unit 172 are stored in delay time holding table 169 and loss ratio holding table 174 with a certain time delay. When the state information input to prediction function units 166 and 171 define the state at time t, the state information output from tables 169 and 174 relates to the state at time t−1. By using the values of the state information at these two times, the prediction values of the packet delay time and packet loss ratio at time t+1 are output to the network state holding unit.

Figure 34A:
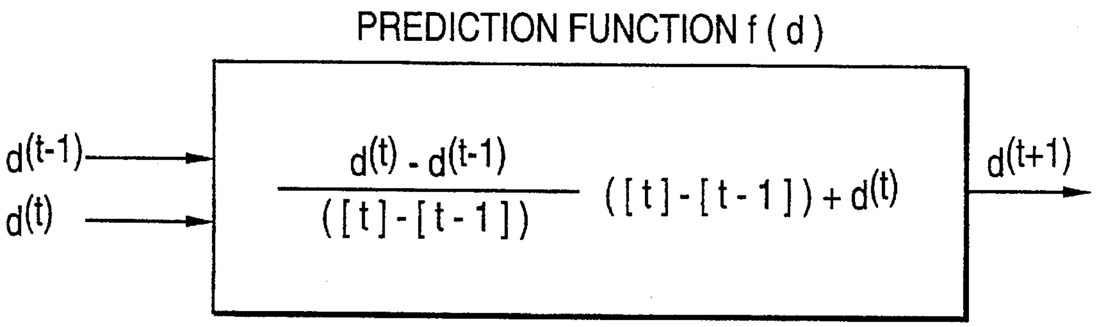
FIGS. 34A and 34B are representations of the prediction function.
Figure 34B:
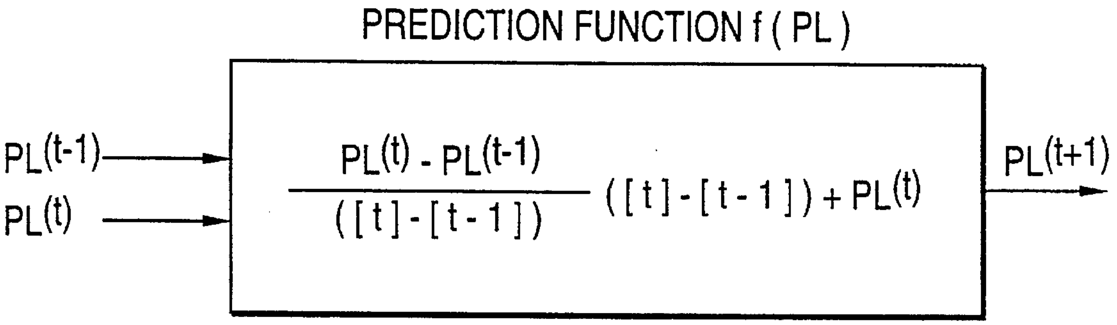

FIGS. 34A and 34B show an embodiment of the prediction function to be used in prediction function units 166 and 171. FIG. 34A represents a prediction function of the packet delay time and FIG. 34B represents a prediction function used for predicting the packet loss ratio. A linear prediction is used in these prediction functions.

Figure 35A:
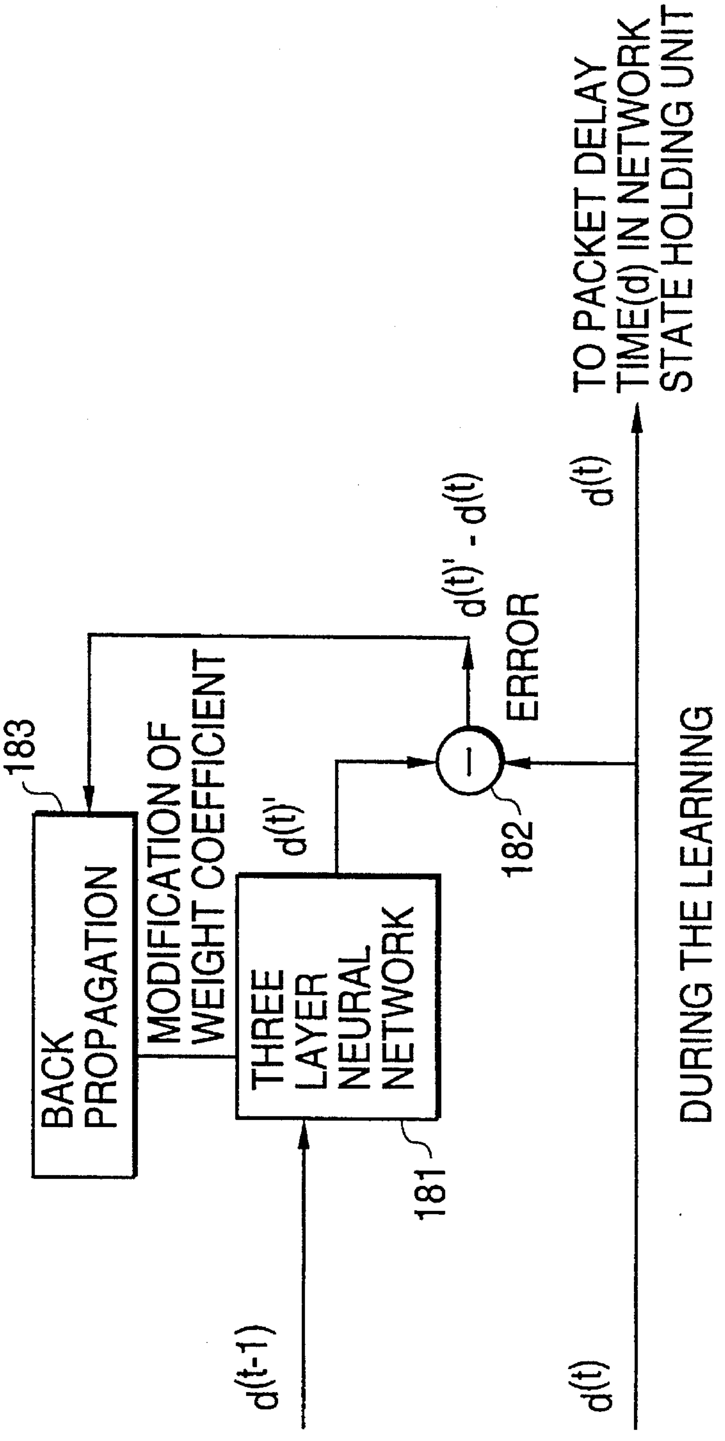
FIGS. 35A and 35B are block diagrams of an embodiment of the neural network for use in the prediction function unit.
Figure 35B:
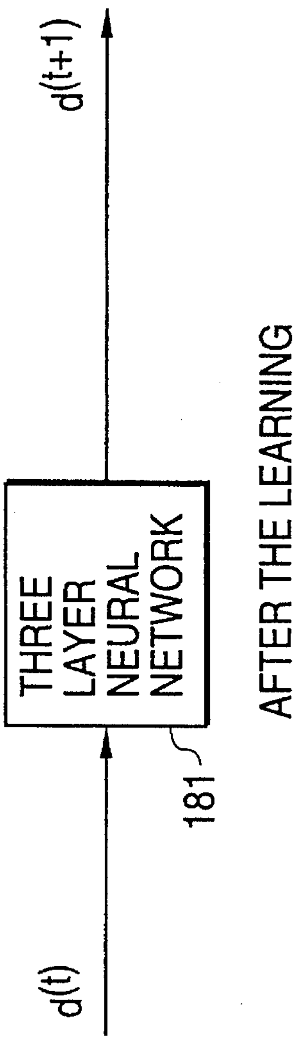

FIGS. 35A and 35B are block diagram so an embodiment of a neural network for use in the prediction function unit. FIG. 35A represents the structure during the learning. The value of the packet delay time d at time t−1 is provided to an input layer unit of three layer neural network 181, and the output layer unit outputs the prediction value at time t. Subtracter 182 obtains the error between the prediction value and the actual value of the packet delay time at time t, and based on this error, the weight coefficient in three layer neural network 181 is updated through back propagation 183. FIG. 35B shows a state after the learning is completed. The packet delay time d at time t is input to three layer neural network 181 and the value of the packet delay time at time t+1 is output from the neural network 181. The prediction function unit can similarly be formed using a three layer neural network with regard to the packet loss ratio.

FIGS. 35A and 35B show a structure in which the packet delay time and the packet loss ratio are separately input to the three layer neural network but it is naturally possible to concurrently input the packet delay time and packet loss ratio to the same three layer neural network.

Figure 36A:
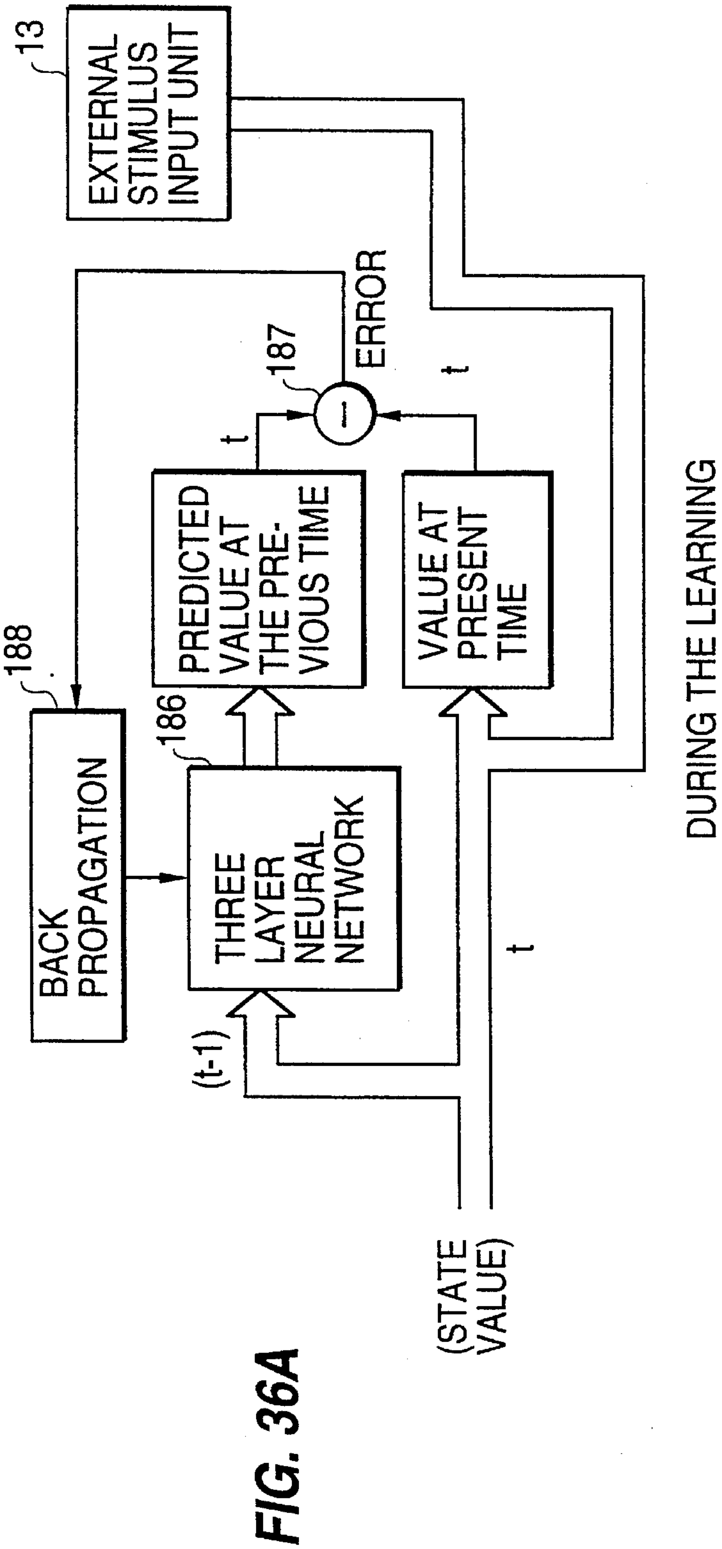
FIGS. 36A and 36B are block diagrams of an embodiment of the prediction function unit where the packet delay time and the packet loss ratio are input to the same three layer neural network.
Figure 36B:
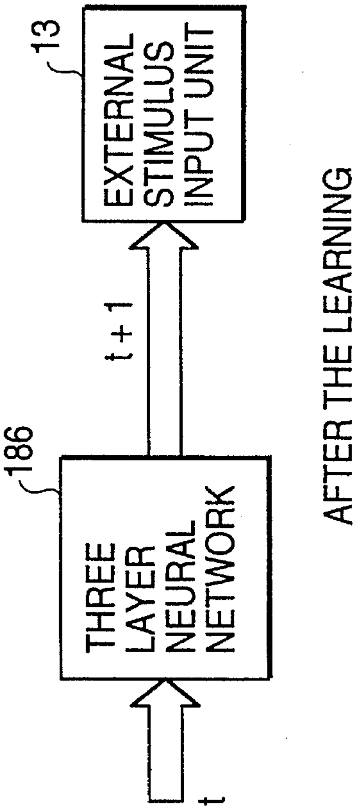

FIGS. 36A and 36B show an embodiment of the prediction function unit in which the packet delay time and the packet loss ratio are input to the same three layer neural network. In FIG. 36A and 36B, three layer neural network 186 comprises an input layer and output layer, each having the units whose number is equal to the number of the output links from the self-node. The packet delay time and packet loss ratio of respective links are input to respective units, thereby enabling their prediction values to be output from the output layer. During the learning period shown in FIG. 36A, subtracter 187 obtains the errors, back propagation 188 updates the weight coefficient using the errors, and the state value at the present time t is output to the external stimulus input unit 13 so that it can be used for the routing of the packet. After the learning is completed as shown in FIG. 36B, three layer neural network 186 receives the present state value at time t and outputs the state value at time t+1 to be provided to external stimulus input unit 13.

A sixth embodiment of the invention will be explained below. The principle block diagram of the sixth embodiment is similar to FIG. 4A representing the first embodiment. The sixth embodiment is applied to the a multimedia integrated network using the virtual call method. The state of the integrated network provided to the external stimulus unit 13 includes capacity of respective links, the frequency band being presently used by respective links, a utilization ratio of respective links and the packet delay time in respective links in the integrated network. The condition required by the media is the frequency band required by the media input from the terminal.

Figure 37:
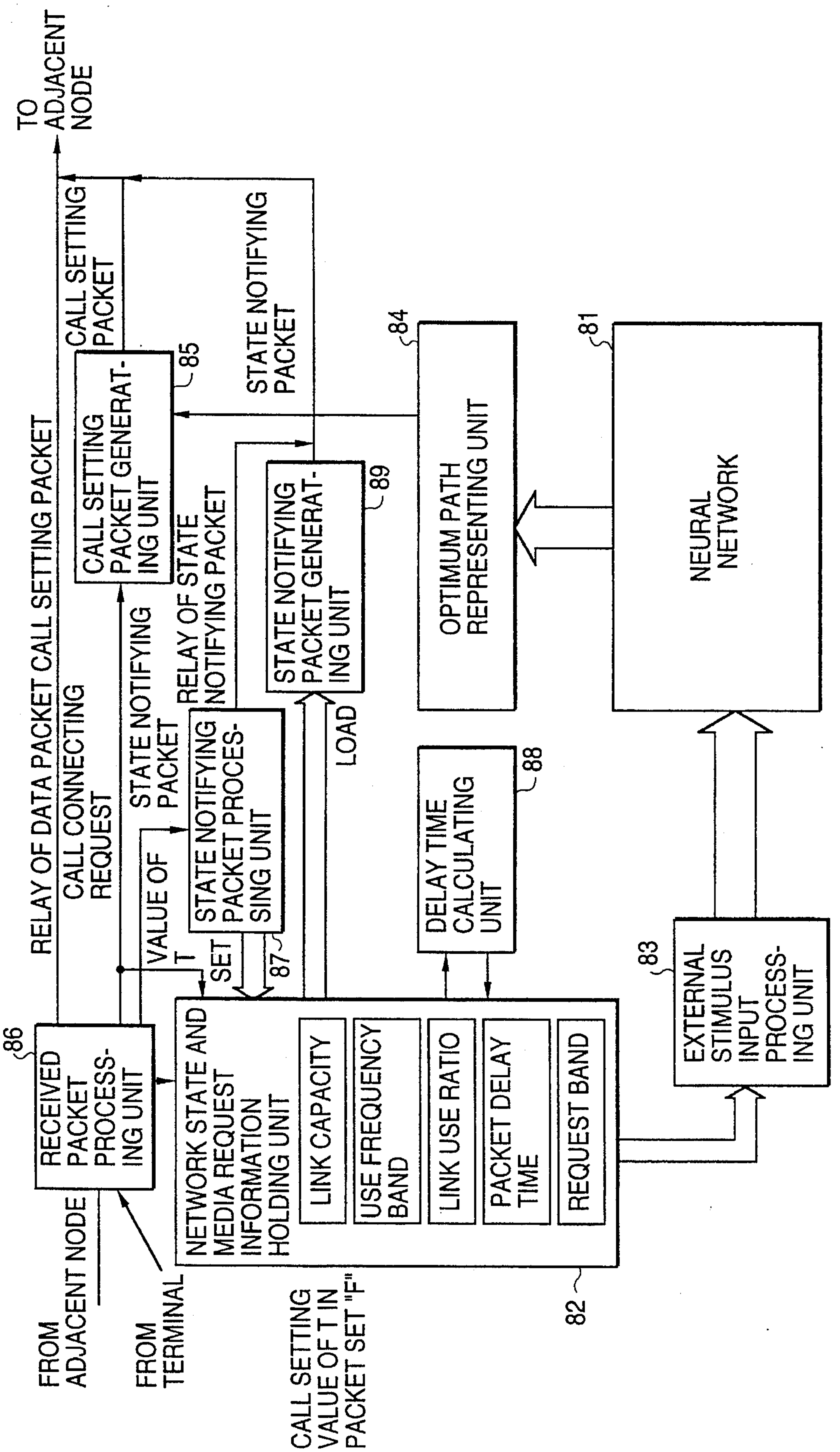
FIG. 37 is a block diagram of a second embodiment of the node according to the sixth embodiment of the invention.

FIG. 37 is a block diagram of a second an embodiment of the node which is used in the sixth embodiment of the invention. FIG. 37 is different from FIG. 7 showing the first embodiment in that the packet output direction determining unit 35 and state information creating/notifying packet creating unit 38 do not exist. Instead call setting packet creating unit 85, delay time calculating unit 88 and state notifying packet creating unit 89 are provided and the capacity of respective links, the frequency band being presently used, utilization ratio of the link, the packet delay time and the frequency band required by the media are stored.

Figure 38:
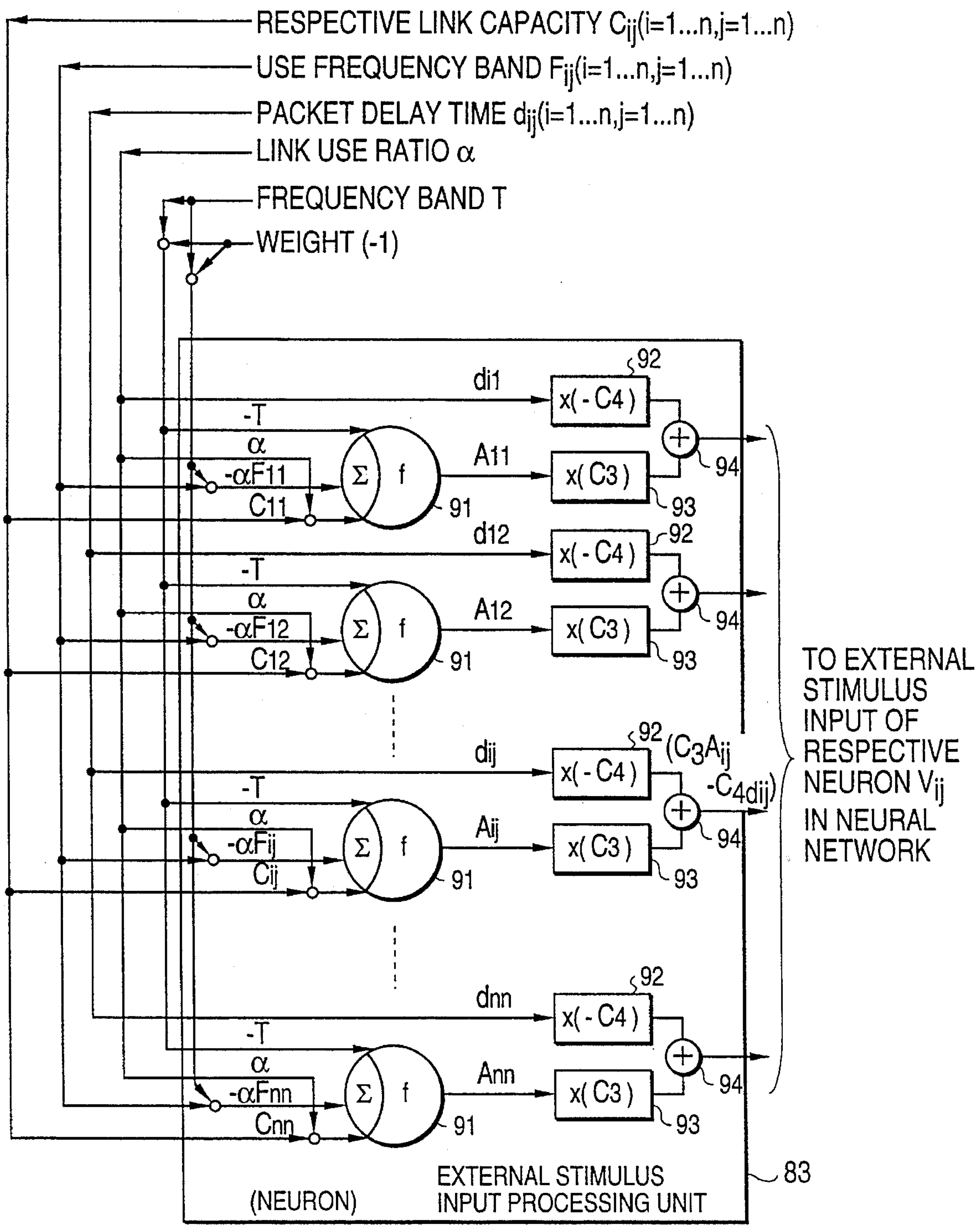
FIG. 38 is a block diagram of a second embodiment of the external stimulus input processing unit according to the invention.

FIG. 38 is a block diagram of a structure of an embodiment of the external stimulus input processing unit according to the sixth embodiment of the invention. In the virtual call method, the variable Aij representing whether the link ij is usable is obtained by the following expression.

$$A_{ij}=f[\alpha(C_{ij}-F_{ij})-T] \tag{7}$$

In equation (7), T represents a frequency band required by the media, Cij represents capacity of the link ij, Fij represents a frequency band being presently used, and α represents the maximum allowable link use ratio.

In FIG. 38, for inputting the external stimulus to the neuron corresponding to the link on a one-to-one basis in the neural network 81 in the node, the capacity Cij of respective links, the use frequency band Fij, the link use ratio α and the frequency band T required by the media are input to the neurons 91 and the value of the variable Aij is calculated in accordance with the expression (7). Coefficient units 92 and 93 and adder 94 obtain the external stimulus of the expression (5) and output it as the external stimulus input to the neuron corresponding the link. FIG. 39 is a table showing an example of contents in the network state holding unit according to the sixth embodiment of the invention. As is similar to FIG. 12 relating to the first embodiment, in FIG. 39 the network state holding unit stores the output links 11 to 14 of the self-node, and the link capacity, used frequency band and packet delay time for the out, put links 21 to 24 of the other nodes.

FIG. 40 is a packet format of the state notifying packet according to the sixth invention. The packet format shown in FIG. 40 is different from FIG. 11 relating to the first embodiment in that the network states stored corresponding to respective output links comprises the capacity, the use frequency band and the packet delay time of the links.

Figure 41:
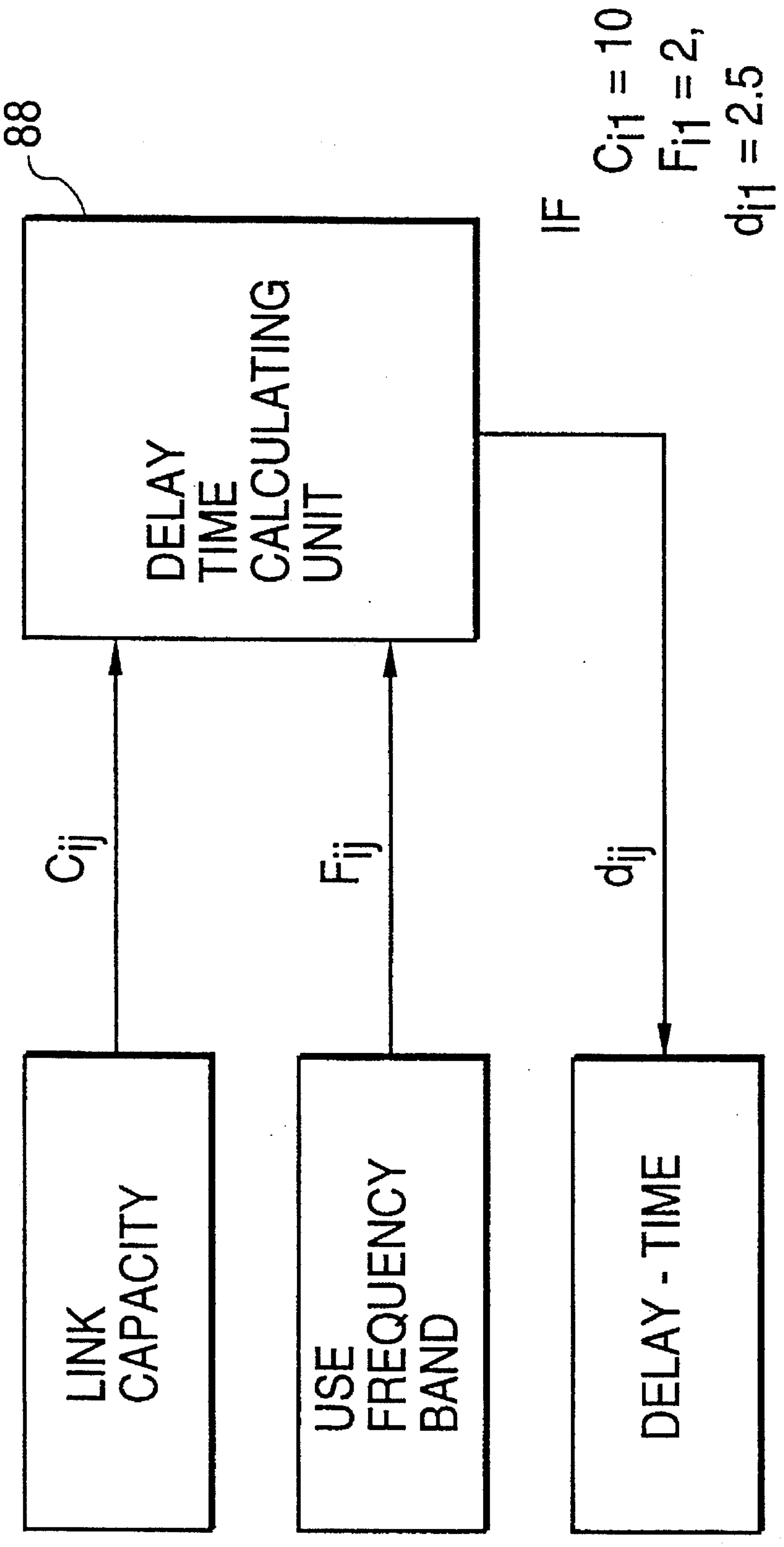
FIG. 41 is an explanatory view of the process by the delay time calculating unit.

FIG. 41 is an explanatory view of the processing performed by the delay time calculating unit. In the virtual call method, the packet delay time Dij of respective links are obtained by the following expression and the respective nodes notify all the other nodes of the values of the packet delay time Dij by using the state notifying packet:

$$d_{ij}=\frac{P}{1-P}\,C_{ij},\ P=\frac{F_{ij}}{C_{ij}} \tag{8}$$

where Cij represents a link capacity and Fij represents a use frequency band.

In FIG. 41, delay time calculating unit 88 calculates the packet delay time Dij in accordance with expression (8) by using the link capacity Cij and use frequency band Fij held in the network state and media requirement information holding unit 82 in the node shown in FIG. 37. It outputs the result of the calculation to the network state and media requirement information holding unit 82.

Figure 42A:
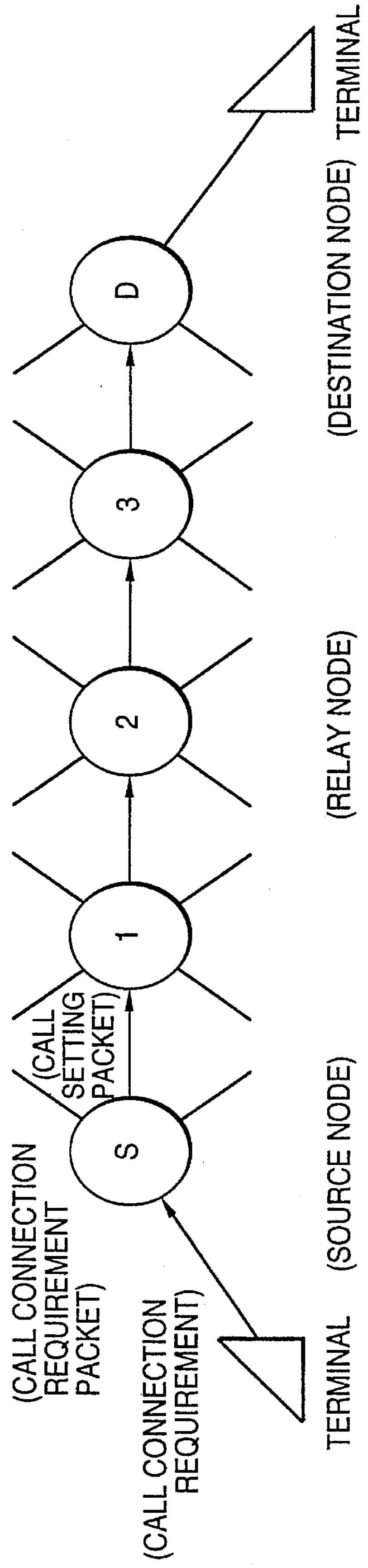
FIG. 42A is a block diagram of a packet communication network according to the invention processing a call setting packet.
Figure 42B:
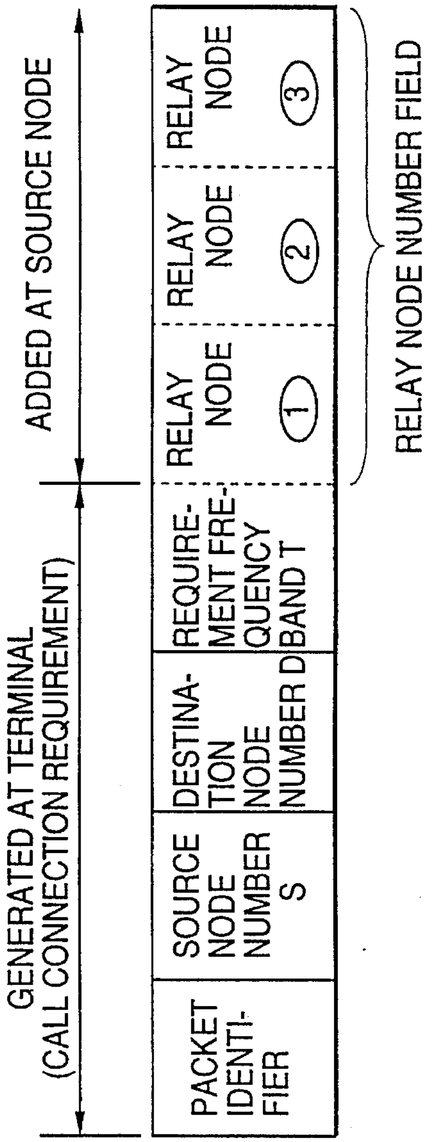
FIG. 42B is a packet format of an embodiment of a call connection requirement and call setting packet.

FIGS. 42A and 42B show an embodiment of the call connection requirement and a packet format of a call setting packet, respectively. The virtual call method transmits the call setting packet from the source node to the destination node in the multimedia integrated network and establishes the connection of the call as a virtual call.

FIG. 42A shows that the source terminal of the packet transmits a call connection requirement packet to the source node, including the terminal. The source node converts the call connection requirement packet into the call setting packet and-then transmits it to the destination node through the relay nodes.

FIG. 42B shows that the source terminal of the packet forms a call connection requirement packet in which an identifier designating a call connection requirement packet the source node number S and destination number D provide packet identification, and the requirement frequency band T provides the condition required by the media. This call connection requirement packet is then transmitted to the source node. The source node adds the relay node number to the following region and converts the packet identifier into an identifier designating, and thereby forming, the call setting packet.

Figure 43:
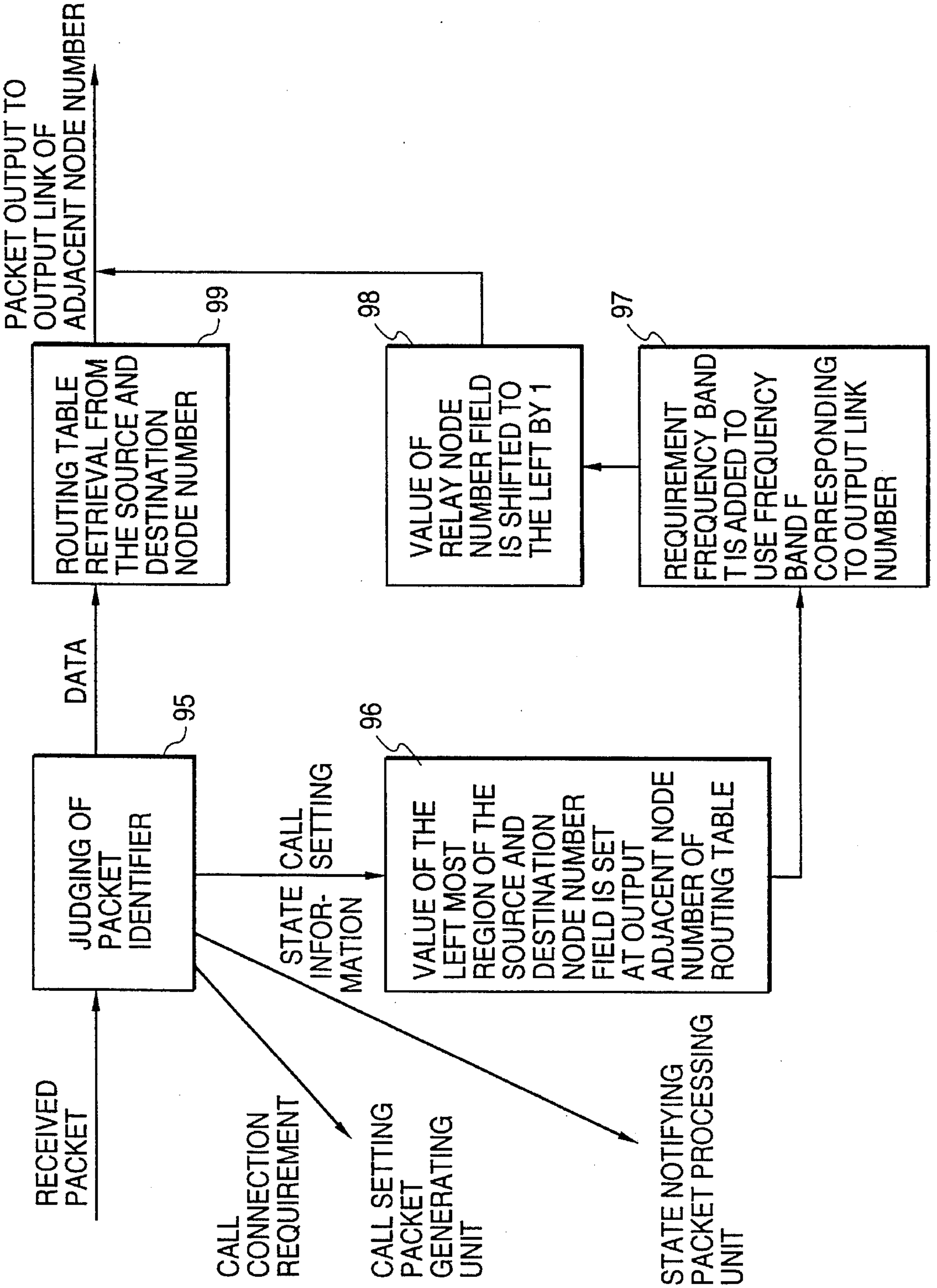
FIG. 43 is an explanatory view of the process by the received packet processing unit.

FIG. 43 is an explanatory view of the process performed by the received packet processing unit 86 within the node shown in FIG. 37. In FIG. 43, the packet identifier judging unit 95 judges the packet identifier with regard to the packet received from the adjacent node or the terminal of the self-node. When the packet identifier designates the call connection requirement packet, the call connection requirement packet is transmitted to the call setting packet creating unit 85, and is converted to the call setting packet which is output to the adjacent node.

When the packet identifier designates the state notifying packet received from the other nodes, the state notifying packet is output to state notifying packet processing unit 87.

Where the packet identifier designates the call setting packet, as shown by numeral 96, the source and destination number and the left end value of the relay node number field stored in the call setting packet are set in the routing table (described later). As shown by numeral 97, the frequency band T required by the media, stored in the call setting packet, is added to the use frequency band F corresponding to the output link number of the packet in the network state holding unit as explained by referring to FIG. 39. As shown by numeral 98, the relay node number stored in the relay node number field in the call setting packet is shifted to the left by 1, and selects the relay node number of the left end. Since the selected number represents the adjacent node number, the call setting packet is output to the output link of the adjacent node number.

Figures 44A, 44B:
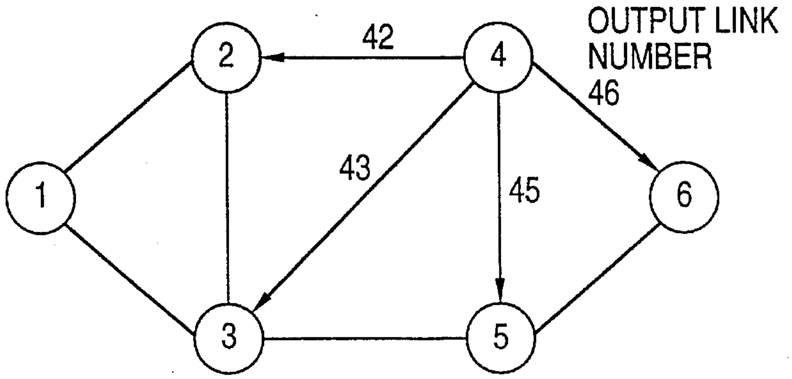
FIG. 44A is table showing an embodiment of the content stored in the routing table.
FIG. 44B is a topology diagram of the network represented in FIG. 44A.

FIGS. 44A and 44B are related to an embodiment of the content stored in the routing table maintained in the received packet processing unit. FIG. 44A represents an example of the routing table held in node 4 in the network with a topology shown in FIG. 44B. For a virtual call with the source node number of 1 and the destination node number of 6, for example, 6 is held as the output adjacent node number and 46 is held as the output link number. By storing such content in the routing table, the data packet is routed in accordance with the content of this routing table after the call setting packet is transmitted.

In FIG. 43, when the packet identifier judging unit 95 in the received packet processing unit judges the received packet as the correct data packet, the source and destination node numbers are detected for the data packet. As shown by numeral 99, by using the results of the detection of the source and destination node number, the routing table is searched and the packet is output to the output link corresponding to the adjacent node number stored in the routing table.

Figure 45:
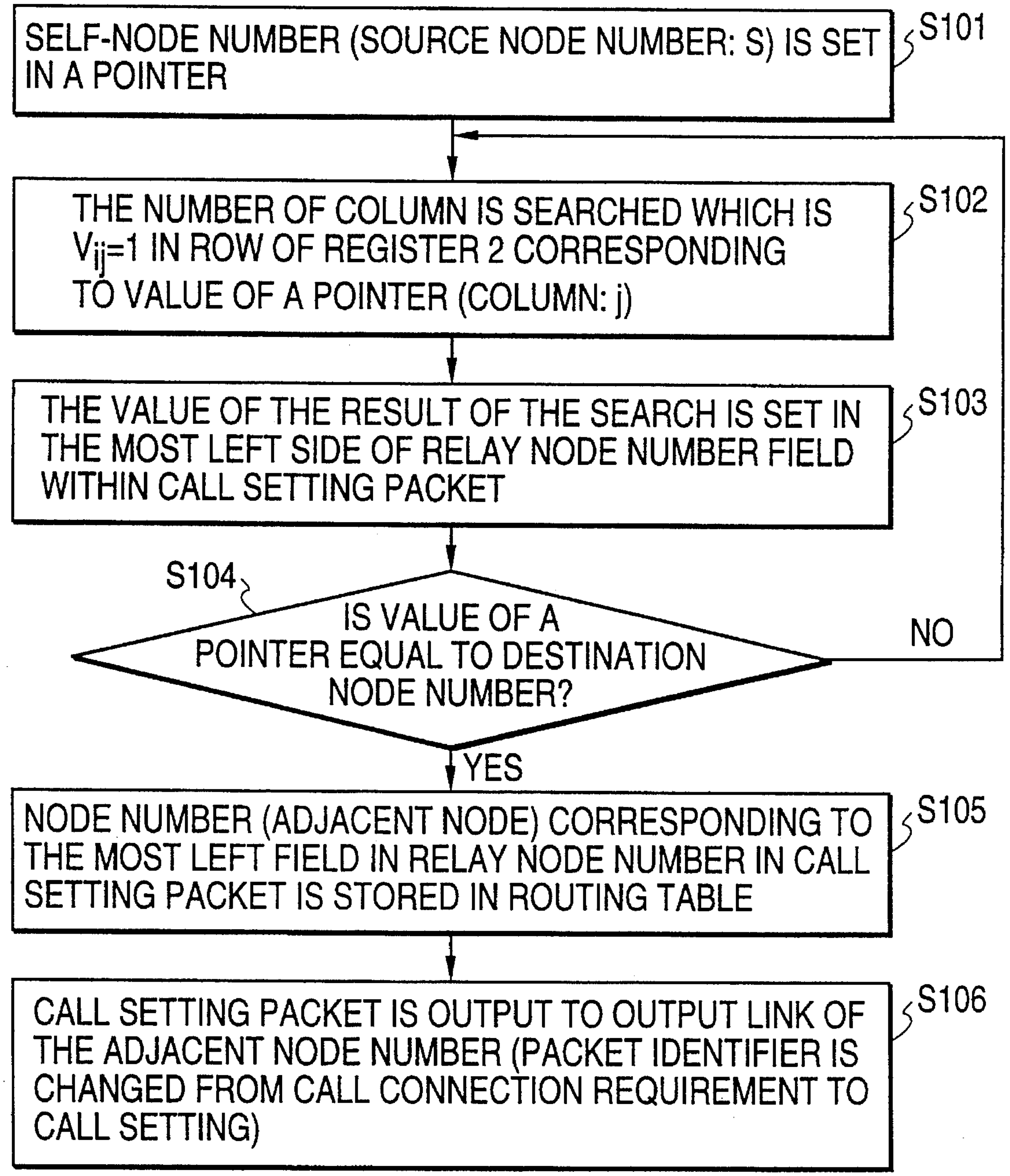
FIG. 45 is a flowchart of a procedure for the call setting packet creation.

FIG. 45 is a flowchart of an embodiment of creating a call setting packet 85 according to the sixth embodiment of the invention.

The content of the representation by the optimum pass representing unit 84 according to the sixth embodiment is the same as that shown in FIG. 14 according to the first embodiment.

In FIG. 45, step S101 sets the self-node number and the source node number S in a pointer in the second register 59 as shown in FIG. 14. Sequentially, step S102 searches the number j of the column Vij of 1 in the row of the second register 59, which corresponds to the value of the pointer; step S103 sets the value of j in the pointer, and simultaneously the value of j is set in the leftmost side of the relay node number field within the call setting packet.

Next, step S104 judges whether or not the value of the pointer is equal to the value of the destination node number. If it is not equal to the value of the destination node number, the process, starting with step S102, is repeated to add the relay node number. However, the second time step S102 is processed, the value of the pointer is the column number searched by the first processing of step S702. The column number designating the neuron whose output is 1, is searched from among the neurons, corresponding to the output links of the adjacent node corresponding to the column number detected by the second processing of step S102. Step S103 sets the value of the result of the search in the second region from the left fields of the relay node numbers.

When, in step S104, the value of the pointer is equal to the value of the destination node number, then in step S105 the leftmost node number in the relay node number field in the call setting packet, namely, the adjacent node number of the source node is held in the routing table. In step S106, a call setting packet is output to the output link corresponding to the adjacent node number. Prior to the output of the call setting packet, the packet identifier is changed from the call connection requirement to the call setting as described above.

Figure 46A:
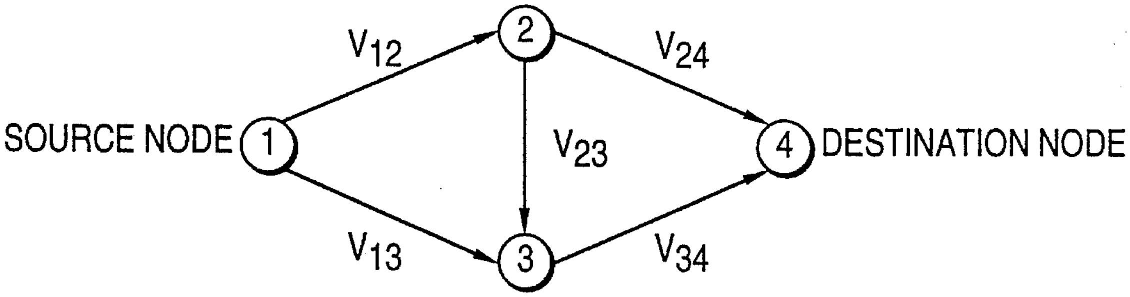
FIGS. 46A to 46C are explanatory views of the example of the call setting packet creation process.
Figure 46B:
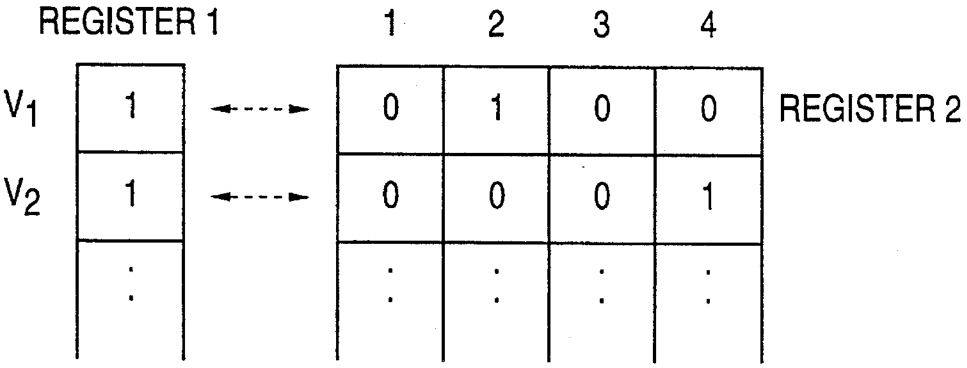
Figure 46C:
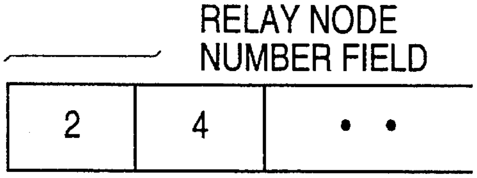

FIGS. 46A, 46B and 46C are explanatory views of a concrete example of the call setting packet creation process. Suppose that the call is sent from the source node 1 to destination nodes 4 through relay node 2 in the network shown in FIG. 46A. First, in step S101 in FIG. 45, the self-node number, namely 1 per this example, is set to the pointer; in step S102, the neuron corresponding to the link and whose output is 1 is searched from the row of the second register and corresponding to node 1 as shown in FIG. 46B, thereby providing 2 as the column number. In step S103, the column number is set in the pointer and as shown in FIG. 46C, is stored in the leftmost region of the relay node number field. In step S104, the value 2 of the pointer is not equal to the value 4 of the source node number; thus the process is again returned to step S102 and the number of the column of the link corresponding to the neuron whose output is 1, out of the second row of the second register and corresponding to the value 2 of the pointer, i.e., the number 4, is detected. In step S103, the column number is set in the pointer and is stored in the second region of the relay node number field. In step S104, the value 4 of the pointer is equal to the value 4 of the destination node number. After performing steps S105 and S106, the process of creating the call setting packet is completed.

Figure 47:
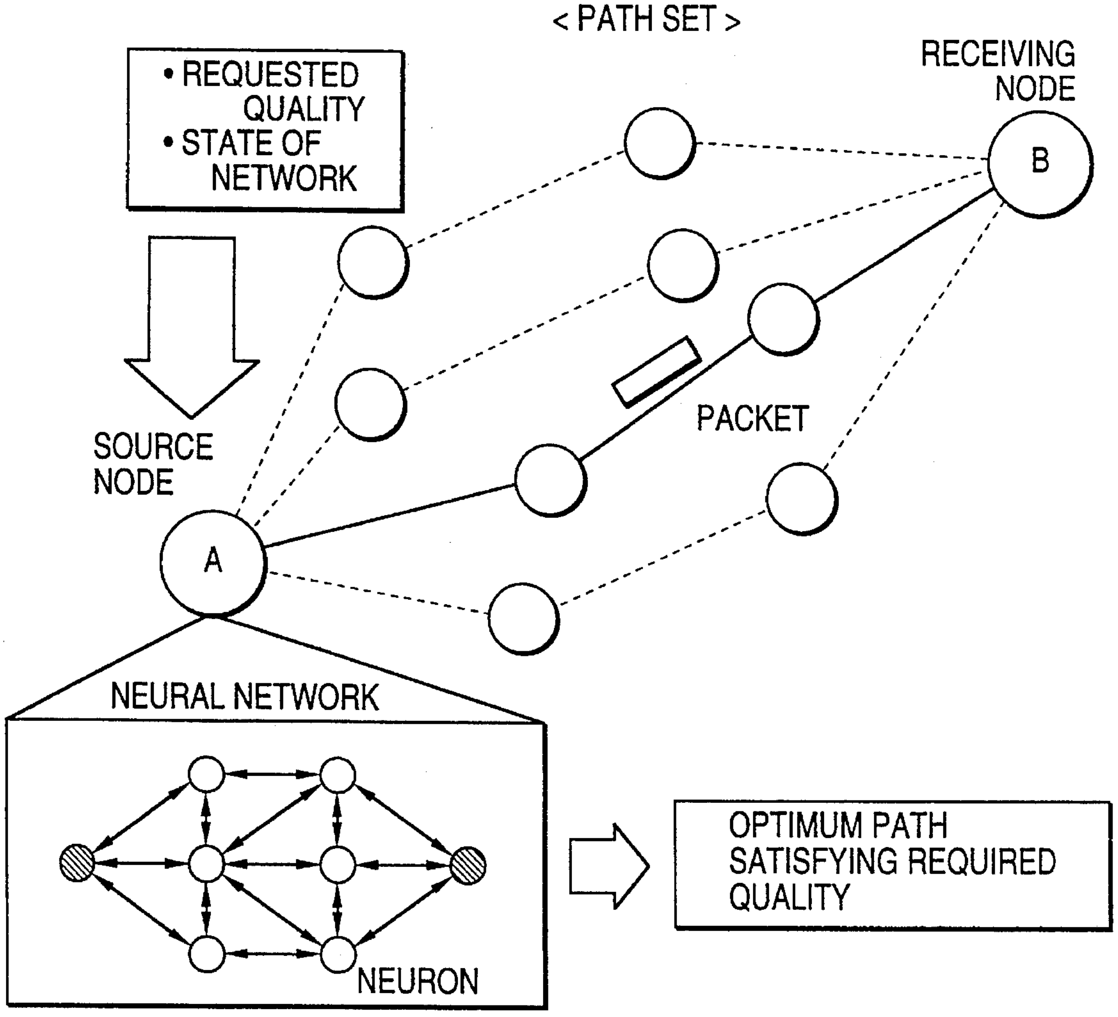
FIG. 47 is an explanatory view of call setting in the virtual call method.

FIG. 47 is an explanatory view for an embodiment of call setting in the virtual call method. Source node A provides the optimum path for producing the required quality by using the neural network in accordance with the quality required by the media and the present state of the network. Hence the optimum path is set as the path in the virtual call.

Figure 48:
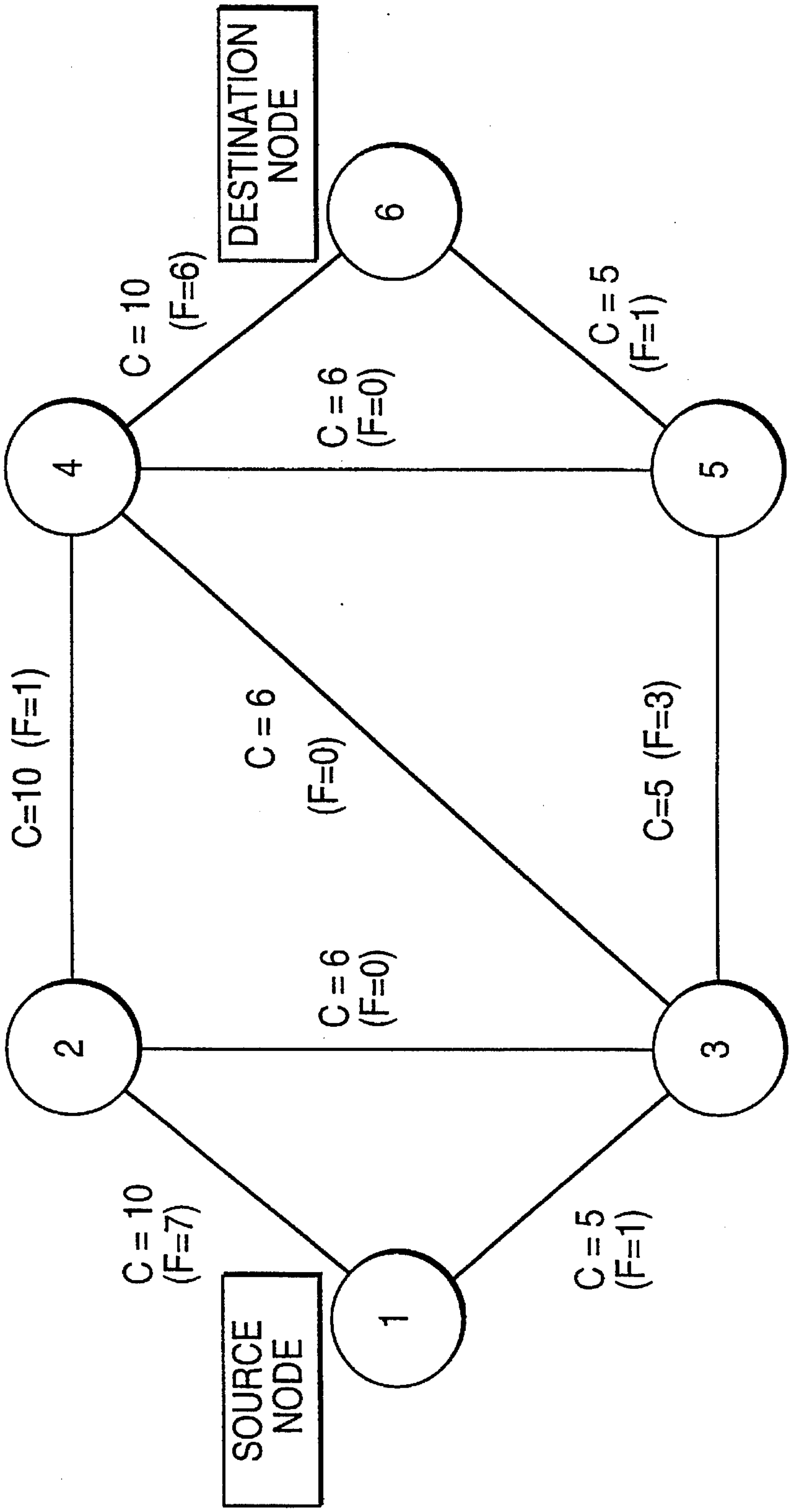
FIG. 48 is an explanatory view of a simulation model of the optimum path setting.

FIG. 48 is an explanatory view for an embodiment of a simulation model in which the optimum path is set in the actual network comprising 6 nodes. In FIG. 48, the path of the virtual call which minimizes the packet delay time in transmission from source node 1 to destination node 6 is obtained by simulation.

Figure 49:
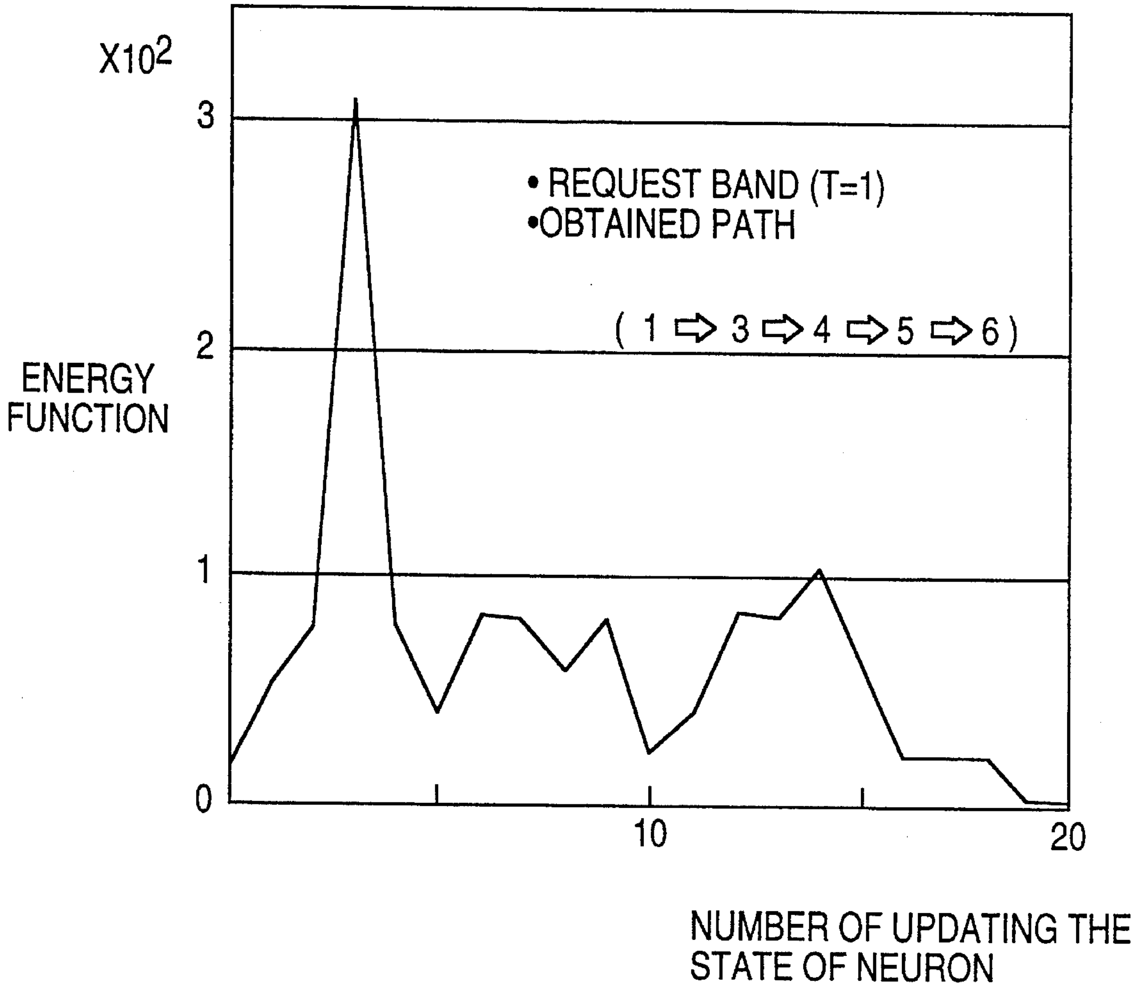
FIG. 49 is a graph of the result of the simulation.

FIG. 49 is a graph of the result of the simulation in FIG. 48. FIG. 49 shows the change of the energy function in response to the number of updates of the state of the neuron until the optimum path is obtained in the neural network shown in FIG. 31. After the updating of the state of the neuron is performed 19 times, the output of the neuron becomes stable and the nodes having the corresponding neurons whose outputs Vi are stabilized at 1 are 3, 4 and 5. The path using these nodes 3, 4 and 5 as the relay node is obtained as the optimum path in which the delay time is minimized.

Generally speaking, the capacity Cij of a link is not equal to the capacity Cji of the link in the reverse direction. However, in FIG. 48 bi-directional communication is considered as the premise and the simulation is performed under the presumption that, if the path is set from the source node to the destination node, the same path is set in the reverse direction.

Figure 50:
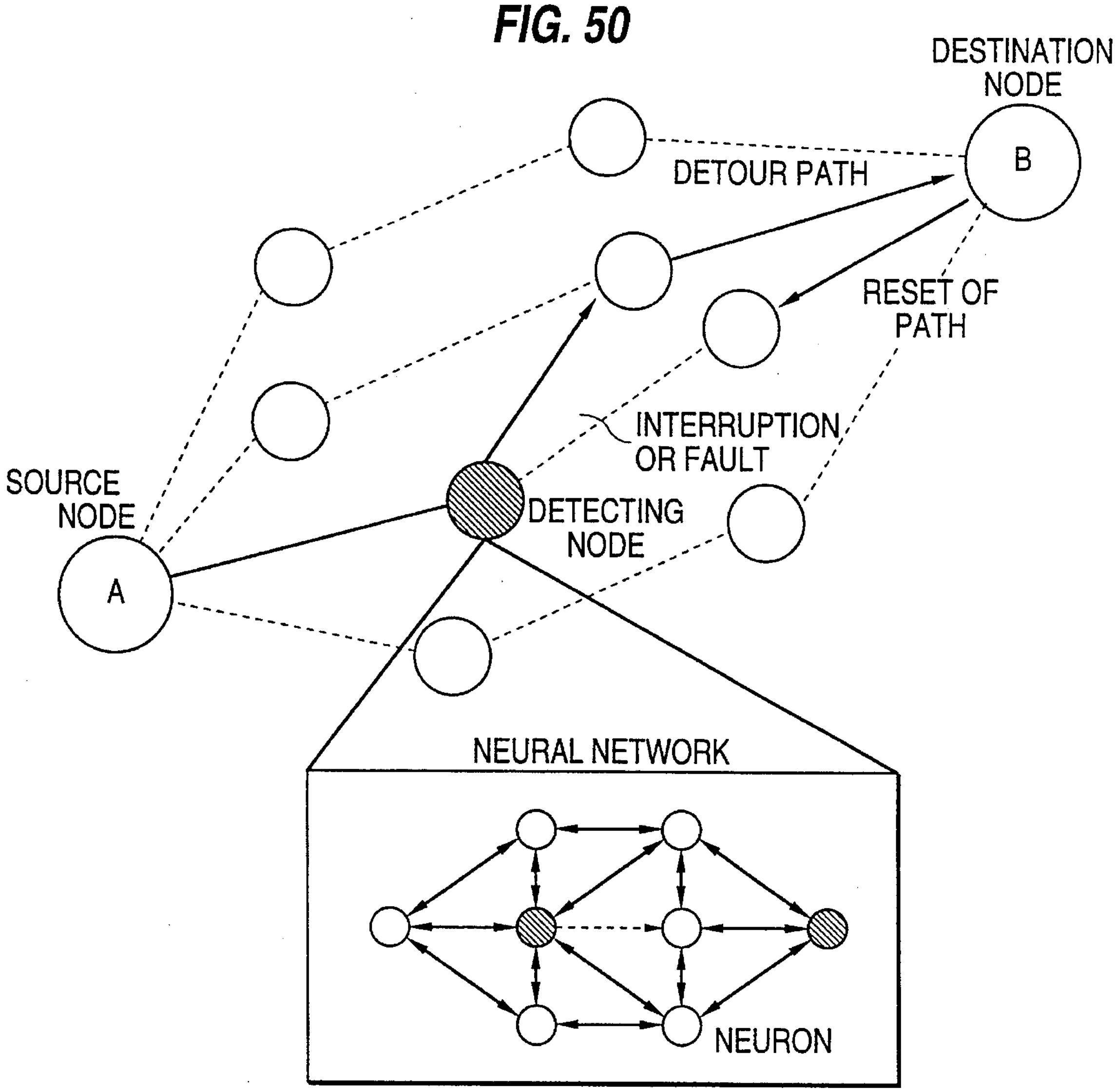
FIG. 50 is an explanatory view of detour path setting upon the occurrence of the link fault.

FIG. 50 is an explanatory view of setting a detour path upon an occurrence of a link fault. In FIG. 50, when a fault occurs in the link utilized for a communication according to the virtual call, the fault detecting node detecting the fault sets a detour path using the neural network provided in the self-node; therefore communication of the virtual call up to destination node B can continue without interruption.

In the sixth embodiment the state of information is also notified. The change of the state is affected only by a call setting and a call release and a time interval of the state variation is relatively long as compared with the datagram method; thus, the notified state always reflects the state at that time. Accordingly, if the state information modified as in the third to fifth embodiments relating to the state notifying is not suitable for the virtual call method.

As described in detail above, this invention makes it possible to realize the determination of the optimum output direction of the packet in the datagram method and the call setting in the virtual call which are adaptive to the state of the network changing with time thus satisfies a condition required by the media in the multimedia integrated network for various media.

Further, by limiting the state information notifying range in the network or decreasing the state information value obtained from the other nodes in accordance with the distance between nodes, the increase of the traffic due to the state notification is prevented and the routing is not affected by the state of the nodes, thereby realizing an adaptive routing and thus contributing to an efficient utilization of the network and the improvement of the reliability of the communication.

This invention can be utilized in packet routing for a multimedia integrated network including various media such as voice, image and data in packet form. This invention also can be applied to, for instance, a computer network in which the data is transmitted in a burst manner as well as to the multimedia integrated network.

What is claimed is:

1. A routing system in a multimedia integrated network having nodes connected by links, the multimedia integrated network providing at least one type of communication in a packet transmitted via the links between the nodes of the multimedia integrated network, where the at least one type of communication requires at least one condition, said routing system comprising in each node:

a neural network of an interconnection type, formed of neurons, for determining a packet output direction of each packet from the node, said neurons comprising node correspondence neurons corresponding to the nodes forming the multimedia integrated network and link correspondence neurons corresponding to the links connecting the nodes; and an external stimulus input unit, operatively connected to said neural network, for outputting an external stimulus to each neuron forming said neural network in accordance with a present state of the multimedia integrated network and the condition required by the communication provided by the multimedia integrated network, to enable the neural network in each node to determine the packet output direction in accordance with the present state of the multimedia integrated network and the condition required by the communication.

2. The routing system according to claim 1, wherein said external stimulus input unit outputs first external stimuli to the link correspondence neurons, wherein each neuron in said neural network adds inputs from other neurons to the external stimulus after an input weighting operation is performed, to produce a result of addition and subjects the result to a threshold process to produce a binary digit for output, and wherein the packet output direction is identified by one of the node correspondence neurons having a stabilized output of 1 and one of the link correspondence neurons having a stabilized output of 1.

3. The routing system according to claim 1, wherein the at least one type of communication includes video communication, audio communication, data communication, and combinations thereof.

4. The routing system according to claim 1, wherein said neural network in respective nodes of the multimedia integrated network receiving a packet, determines the packet output direction as the packet is moved in the multimedia integrated network until the packet reaches a destination node through an optimum path which is, in real time, adaptive to variation of the present state of the multimedia integrated network and satisfies the at least one condition required by the at least one type of communication.

5. The routing system according to claim 1, wherein said routing system in each node in the multimedia integrated network further comprises control data means for obtaining a packet loss ratio and a packet delay time for each link and an allowable packet loss ratio for each packet, wherein said external stimulus input unit is operatively connected to said control data means to receive the packet loss ratio and the packet delay time for each link forming the integrated multimedia network as the state of the integrated network, and receives the allowable packet loss ratio for each packet as the condition required by the communication.

6. The routing system according to claim 5, wherein said external stimulus input unit comprises stimuli neurons corresponding to the link correspondence neurons, each stimuli neuron in said external stimulus input unit receiving the packet loss ratio for a corresponding link and the allowable packet loss ratio for the packet as the at least one condition required by the communication and performing a weighting operation generating 1 if the corresponding link can receive the packet for the communication and generating 0 if the corresponding link cannot receive the packet for the communication, and wherein said external stimulus unit includes means for adding the packet delay time for each link after the weighting operation is performed by each stimuli neuron, to produce the external stimulus for the corresponding link.

7. The routing system according to claim 2, wherein each node is identified by a node identifier, and wherein each node of said routing system further comprises:

packet passing node number detecting and inserting means for detecting the node identifier of a preceding node through which the packet has passed, based on contents of the packet and for sending the packet to a following node after inserting a self-node identifer in the packet; and neuron output fixing means for fixing the output of a preceding neuron corresponding one-to-one to the preceding node to 0.

8. The routing system according to claim 7, wherein said packet passing node number detecting and inserting means in each node detects only the nodes adjacent thereto.

9. The routing system according to claim 7, wherein said packet passing node number detecting and inserting means detects only the node identifier of a source node generating the packet, and wherein said neuron output fixing means fixes the output of a source neuron corresponding one-to-one to the source node, to 0.

10. A routing system in a multimedia integrated network having nodes connected by links, the multimedia integrated network providing at least one type of communication in a packet format transmitted via the links between the nodes of the multimedia integrated network, where the at least one type of communication requires at least one condition, said routing system comprising in each node:

a neural network of an interconnection type, formed of neurons, for determining a packet output direction of each packet from the node;

an external stimulus input unit, operatively connected to said neural network, for outputting an external stimulus to each neuron forming said neural network in accordance with a present state of the multimedia integrated network and the at least one condition required by the communication provided by the multimedia integrated network;

state information notifying means for notifying a state of an output link of the node to all other nodes forming the multimedia integrated network via state information having a value; and other node state information value decreasing means for decreasing the value of the state information notified by the state information notifying means of the other nodes in accordance with a distance from the node to the other nodes, and outputting to said external stimulus input unit a resulting value indicating the present state of the multimedia integrated network, to attenuate influence of the state of the other nodes with an increase of distance therefrom.

11. The routing system according to claim 10, wherein said state information notifying means notifies a packet delay time and a packet loss ratio for each output link from the node as the state information of the node, wherein said other node state information value decreasing means comprises a notifying data decreasing unit to divide a packet delay time and packet loss ratio included in the state information notified from the other nodes for each output link of the other nodes by a number of hops equal to a number of the links from the node to the other nodes, and outputs a division result to said external stimulus input unit.

12. A routing system for use in a multimedia integrated network for performing communication for media in a packet format via links between nodes of the multimedia integrated network, where the media require at least one condition, said routing system comprising in each node:

a neural network of an interconnection type, formed of neurons, for determining a packet output direction of each packet from the node;

an external stimulus input unit, operatively connected to said neural network, for outputting an external stimulus to each neuron forming said neural network in accordance with a present state of the multimedia integrated network and the at least one condition required by the media included in the integrated network;

state information notifying means for notifying all the nodes forming the multimedia integrated network of a state of an output link of the node via state information having a value and a range in which the state is notified within the multimedia integrated network; and other node state information and notifying range value decreasing means for decreasing the value of the state information and the value of the notifying range notified from the state information notifying means of the other nodes in accordance with a distance therefrom, for notifying a result of the decreasing of the values of the state information and the notifying range to an adjacent node, for outputting the result of the decreasing to said external stimulus input unit when the result of the decreasing of the notifying range is not 0, for outputting the result of the decreasing of both values to said external stimulus input unit without notifying the result of the decreasing to the adjacent node when the result of the decreasing of the notifying range is 0, to decrease influence of the state of the other nodes with an increase of the distance from the node and enabling a direction most suitable for the present state of the multimedia integrated network and the at least one condition required by the media to be used as the packet output direction.

13. A routing system for use in a multimedia integrated network having nodes connected by links, the multimedia integrated network providing at least one type of communication in a packet format transmitted via the links between the nodes of the multimedia integrated network, where the at least one type of communication requires at least one condition, said routing system comprising in each node:

a direction neural network of an interconnection type, formed of neurons, for determining a packet output direction of each packet from the node;

an external stimulus input unit, operatively connected to said direction neural network, for outputting an external stimulus to each neuron forming said direction neural network in accordance with a present state of the multimedia integrated network and the at least one condition required by the communication provided by the multimedia integrated network;

state information averaging and notifying means for performing an averaging operation of values indicating states of the links of the node used for output during cycles of various lengths, to obtain an averaging result and for notifying each node forming the multimedia integrated network of a value of a relay range in said direction neural network where the average result is relayed each cycle, a notification range for designating a range of the node, and the average result for the cycles of various lengths; and other node state information receiving processing means for decreasing the value of the relay range received from said state information averaging and notifying means by one to produce a decremented value, for outputting the decremented value, the notification range, and the average result to all adjacent nodes when the decremented value is not zero and for outputting the average result to said external stimulus input means when the node is located within the notification range, to prevent an increase in traffic due to state notification and to enable the packet output direction to be most suitable for the present state of the multimedia integrated network and the at least one condition required by the communication.

14. The routing system according to claim 13, wherein said state information averaging and notifying means comprises a prediction function unit, operatively connected to said other node state information receiving processing means and said external stimulus input means, to predict a predicted value of a state of another node at a discretional time based on state information previously received during one cycle period of a receiving interval when the receiving interval in which said state information receiving processing means in the other node receives the state information is long based on predetermined criteria and for outputting the predicted value to said external stimulus input unit.

15. The routing system according to claim 14, wherein said prediction function unit includes a prediction neural network, operatively connected to said other node state information receiving processing means and said external stimulus input means, having a learning function.

16. A routing system for use in a multimedia integrated network providing at least one type of communication requiring at least one condition, the communication provided using links between nodes of a virtual call system, said routing system comprising in each node:

a neural network of an interconnection type, formed of neurons, for determining a packet output direction of each packet from the node by at least one of the neurons having a stabilized output of 1; and an external stimulus input means, operatively connected to said neural network, for applying an external stimulus to each neuron forming said neural network in accordance with a present state of the multimedia integrated network and the at least one condition required by the communication provided by the multimedia integrated network, to enable the node to determine the packet output direction by the node detecting the at least one of the neurons having the stabilized output of 1 in accordance with the present state of the multimedia integrated network and the at least one condition required by the communication.

17. The routing system according to claim 16, wherein the at least one type of communication includes audio communication, sound communication, image communication, data communication and combinations thereof.

18. The routing system according to claim 16, wherein said neural network is formed of two kinds of neurons, node correspondence neurons in one-to-one correspondence with the nodes forming the multimedia integrated network and link correspondence neurons in one-to-one correspondence with the links connecting the nodes, wherein said external stimulus input means applies an external stimulus to the link correspondence neurons, wherein each of the neurons in said neural network repeatedly adds inputs from other neurons to the external stimulus to produce a sum and performs a threshold process on the sum to determine 0 or 1 for output, and further comprising means for detecting one of the node correspondence neurons with an output stabilized at 1 to determine a packet output direction node, and for detecting one of the link correspondence neurons having an output stabilized at 1 to determine a packet output direction link corresponding thereto.

19. The routing system according to claim 16, wherein upon setting a virtual call, said external stimulus input means in a source node of the virtual call applies an external stimulus to said neural network depending on the at least one condition required by the at least one type of communication performed by the virtual call and the present state of the multimedia integrated network.

20. The routing system using the neural network according to claim 16, further comprising state information means for obtaining a capacity of each link between the nodes forming the multimedia integrated network, a frequency band in use, a frequency band required by the at least one type of communication, an allowable usage rate of each link and a packet delay time, and wherein to obtain a path for a virtual call adaptive in real time to the present state of the multimedia integrated network, said external stimulus input means receives from said state information means the capacity of each link between the nodes forming the multimedia integrated network, the frequency band in use, the allowable usage rate of each link and the packet delay time as the present state of the integrated network, and receives the frequency band required by the at least one type of communication as the at least one condition required by the at least one type of communication performed by the virtual call.

21. The routing system according to claim 18, wherein each of the link correspondence neurons has a corresponding link, wherein said external stimulus input means includes external stimulus neurons corresponding one-to-one to the link correspondence neurons in said neural network, wherein each of said external stimulus neurons receives a capacity, a frequency band in use and an allowable usage rate of the corresponding link, and a frequency band required by the at least one type of communication performed by a virtual call, outputs 1 to the corresponding link when the virtual call, including the frequency band required by the at least one type of communication, is acceptable and outputs 0 to the corresponding link when the virtual call is unacceptable due to at least one of the frequency band required by the at least one type of communication, the capacity of the corresponding link, the frequency band in use and the allowable rate, and wherein said external stimulus means outputs, as the external stimulus, outputs of the external stimulus neurons and the packet delay time to the link correspondence neurons corresponding thereto.

22. The routing system according to claim 16, wherein said external stimulus input means applies the external stimulus to the neurons according to a frequency band required by the at least one type of communication for a virtual call, and wherein said neural network obtains a path minimizing a packet delay time from a source node to a destination node of the virtual call.

23. The routing system according to claim 18, wherein each node further comprises call setting packet generating means for determining a relay node, corresponding to one of the node correspondence neurons having an output stabilized at 1 in said neural network, forming a path of a virtual call, and for generating a call setting packet storing a number of the relay node, and wherein the multimedia integrated network transmits the call setting packet to a destination node of the virtual call to set the virtual call.

24. The routing system according to claim 18, wherein when a fault occurs in one of the links and nodes during communication by a virtual call, a node detecting the fault becomes a pseudo-source node and obtains a whole detour path from the pseudo-source node to a destination node of the virtual call by using said neural network provided in the pseudo-source node with a fault neuron, corresponding to the one of the links and nodes determined to have a fault, having an output set to 0, and said external stimulus input means in the pseudo-source node, and wherein a call setting packet is transmitted from the pseudo-source node to the destination node through relay nodes along the whole detour path, to set the whole detour path without causing communication of the virtual call to stop.

25. A routing system for a packet switching network formed of nodes coupled by links, the packet switching network performing at least one type of communication requiring at least one condition, said routing system processing communication data in a packet form and comprising in each node:

a neural network of an interconnection type, formed of neurons corresponding to the nodes forming the packet switching network, for determining a packet output direction of each packet from the node; and external stimulus input means for outputting an external stimulus to the neurons forming said neural network in accordance with a present state of the packet switching network and the at least one condition required by the at least one type of communication performed by the packet switching network to enable the node to determine the packet output direction from the present state of the packet switching network and the at least one condition required by the at least one type of communication.

26. A routing system for use in a packet switching network, formed of nodes connected by links, for performing communication via packets of media requiring at least one condition, said routing system comprising in each node:

a neural network of an interconnection type, formed of neurons, for determining a packet output direction of each packet from the node;

an external stimulus input unit, operatively connected to said neural network, for outputting an external stimulus to each neuron forming said neural network in accordance with a present state of the packet switching network and the at least one condition required by the media communicated by the packet switching network;

state information notifying means for notifying a state of an output link of the node to all other nodes forming the packet switching network; and other node state information value decreasing means for decreasing the value of the state information notified by the state information notifying means of the other nodes in accordance with a distance from the node to the other nodes, and outputting to said external stimulus input unit a resulting value indicating the present state of the packet switching network, to attenuate influence of the state of the other nodes with an increase of distance therefrom.

27. A routing system for use in a packet switching network, formed of nodes connected by links, for performing communication via packets for media having at least one condition of use, said routing system comprising in each node:

a neural network of an interconnection type, formed of neurons, for determining a packet output direction of each packet from the node;

an external stimulus input unit, operatively connected to said neural network, for outputting an external stimulus to each neuron forming said neural network in accordance with a present state of the packet switching network and the at least one condition required by a medium included in the media communicated by the packet switching network;

state information notifying means for notifying all the nodes forming the switching network of a state of output links of the node via state information having a value and a range in which the state is notified within the packet switching network; and other node state information and notifying range value decreasing means for decreasing the value of the state information and the value of the notifying range notified from the state information notifying means of the other nodes in accordance with a distance therefrom, for notifying a result of the decreasing of both values to an adjacent node, for outputting the result of the decreasing to said external stimulus input unit when the result of the decreasing of the notifying range is not 0, for outputting the result of the decreasing of both values to the external stimulus input unit without notifying the result of the decreasing to the adjacent node when the result of the decreasing of the notifying range is 0, to decrease influence of the state of the other nodes with an increase of the distance from the node and enabling a direction most suitable for the present state of the packet switching network and the at least one condition required by the medium to be used as the packet output direction.

28. A routing system for use in a packet switching network formed of nodes coupled by links, the packet switching network performing at least one type of communication requiring at least one condition and using a virtual call system, said routing system comprising in each node:

a neural network of an interconnection type, formed of neurons, for determining a packet output direction of each packet from the node by at least one of the neurons having a stabilized output of 1; and an external stimulus input unit for applying an external stimulus to each neuron forming said neural network in accordance with a present state of the packet switching network and the at least one condition required by the at least one communication performed by the packet switching network, to enable the node to determine the packet output direction by the node detecting at least one of the neurons having a stabilized output of 1 in accordance with the present state of the packet switching network and the at least one condition required by the at least one communication.

29. A node in a multimedia integrated network for performing communication for various media requiring at least one condition, via packets transmitted over links between nodes of the multimedia integrated network, said node comprising:

a neural network of an internal connection type for determining a packet output direction of each packet from the nodes, said neural network including node correspondence neurons corresponding to the nodes forming the multimedia integrated network, link correspondence neurons corresponding to the links connecting the nodes, and connection means for connecting said node and link correspondence neurons; and an external stimulus input unit, operatively connected to said neural network, for outputting an external stimulus to each neuron forming said neural network in accordance with a present state of the multimedia integrated network and the at least one condition required by the media of the multimedia integrated network, to enable said neural network in said node to determine the packet output direction in accordance with the present state of the multimedia integrated network and the at least one condition required by the media.

30. The node according to claim 29, wherein said external stimulus input unit outputs first external stimuli to the link correspondence neurons;

wherein each neuron in said neural network adds inputs from other neurons to the external stimulus after an input weighing operation is performed to produce a result of addition and subjects the result to a threshold process to produce a binary digit for output; and wherein the packet output direction is identified by one of the node correspondence neurons having a stabilized output of 1 and one of the link correspondence neurons having a stabilized output of 1.

31. The node according to claim 29, wherein the media comprise voice, image and data.

32. The node according to claim 29, wherein said neural network, upon receiving a packet, determines the packet output direction as the packet is moved in the multimedia integrated network until the packet reaches a destination node through an optimum path which is, in real time, adaptive to variation of the present state of the multimedia integrated network and satisfies a condition required by the media.

33. The node according to claim 29, further comprising control data means for obtaining a packet loss ratio and a packet delay time for each link and an allowable packet loss ratio for each packet, and wherein said external stimulus input unit is operatively connected to said control data means to receive the packet loss ratio and the packet delay time for each link forming the multimedia integrated network as the state of the multimedia integrated network, and receives the allowable packet loss ratio for each packet as the condition required by the media.

34. The node according to claim 33, wherein said external stimulus input unit comprises stimuli neurons corresponding one-to-one to the link correspondence neurons, each stimuli neuron in said external stimulus input unit receiving the packet loss ratio for a corresponding link and an allowable packet loss ratio designated by the media and producing an output having a value equal to 1 if the corresponding link can receive the packet from the media and equal to 0 if the corresponding link cannot receive the packet from the media, the output from said external stimulus means for the corresponding link being added to the packet delay time for the corresponding link after the input weighing operation is performed, thereby providing the external stimulus for the corresponding link.

35. The node according to claim 30, further comprising:

packet passing node number detecting and inserting means for detecting the node identifier, for identifying each node in the multimedia integrated network, of a preceding node through which the packet has passed, based on contents of the packet and for sending the packet to a following node after inserting a self-node identifier in the packet; and neuron output fixing means for fixing the output of a preceding neuron, corresponding one-to-one to the preceding node, to 0.

36. The node according to claim 35, wherein said packet passing node number detecting and inserting means detects only the nodes adjacent thereto.

37. The node according to claim 35, wherein said packet passing node number detecting and inserting means detects only the node identifier of a source node generating the packet, and wherein said neuron output fixing means fixes the output of a source neuron, corresponding one-to-one to the source node, to 0.

* * * * *

UNITED STATES PATENT AND TRADEMARK OFFICE
CERTIFICATE OF CORRECTION

PATENT NO. : 5,577,028 Page 1 of 2
DATED : November 19, 1996
INVENTOR(S) : Akira CHUGO, et al.

It is certified that error appears in the above-indentified patent and that said Letters Patent is hereby corrected as shown below:

Cover Page,

Item [56], Under "OTHER PUBLICATIONS", please add --European Search Report, The Hague, Dec. 1, 1993--;

Item [57], "ABSTRACT", line 13, after "links", delete ",".

Col. 7, line 40, change "stake" to --state--; and

Col. 9, line 40, delete "of an"; and
line 41, delete "first".
Col. 10, line 1, change "t-he" to --the--;
line 6, change "$PI_{ij}$" to --$PL_{ij}$--;
line 45, change "finks" to --links--; and
line 52, after "buffer" insert --(not shown).
Col. 11, line 54, after "0" insert --,--;
line 62, delete "first" (second occurrence); and Col. 12, line 27, after "comparator" insert --68--.

UNITED STATES PATENT AND TRADEMARK OFFICE

CERTIFICATE OF CORRECTION

PATENT NO. : 5,577,028

DATED : November 19, 1996

INVENTOR(S) : Akira CHUGO, et al.

It is certified that error appears in the above-indentified patent and that said Letters Patent is hereby corrected as shown below:

| | | |
|---|---|---|
| Col. 13, | line 37, | change "input" to --output--; |
| | line 60, | |
| Col. 14, | line 25, | change "using" to --used--; and |
| | line 48, | change "number-of-hope" to --number-of-hop--. |
| Col. 15, | line 18, | change "invention" to --embodiment--; |
| | line 61, | change "of" to --set to--. |
| Col. 16, | line 7, | change "a s" to --as--. |
| Col. 18, | line 4, | change "invention" to --embodiment--; and |
| | line 57, | change "to-external" to --to external--. |
| Col. 19, | line 21, | change "diagram so" to --diagrams of--. |
| Col. 20, | line 5, | delete "an"; |
| | line 42, | change "out, put" to --output--; and |
| Col. 21, | line 11, | change "and-then" to --and then--. |

Signed and Sealed this

Twentieth Day of May, 1997

*Attest:*

Bruce Lehman

BRUCE LEHMAN

*Attesting Officer*

*Commissioner of Patents and Trademarks*